(12) United States Patent
Yasui

(10) Patent No.: US 8,233,370 B2
(45) Date of Patent: Jul. 31, 2012

(54) OBJECTIVE LENS, OPTICAL PICKUP AND OPTICAL DISC APPARATUS

(75) Inventor: Toshifumi Yasui, Tokyo (JP)

(73) Assignee: Sony Corporation, Tokyo (JP)

( * ) Notice: Subject to any disclaimer, the term of this patent is extended or adjusted under 35 U.S.C. 154(b) by 101 days.

(21) Appl. No.: 12/797,750

(22) Filed: Jun. 10, 2010

(65) Prior Publication Data

US 2010/0322060 A1 Dec. 23, 2010

(30) Foreign Application Priority Data

Jun. 18, 2009 (JP) .................................. 2009-145725
Dec. 9, 2009 (JP) .................................. 2009-279557
Dec. 22, 2009 (JP) .................................. 2009-290431

(51) Int. Cl.
*G11B 7/00* (2006.01)
(52) U.S. Cl. ......... 369/112.03; 369/112.07; 369/112.12; 369/112.23; 359/571; 359/558
(58) Field of Classification Search ............. 369/112.03, 369/112.07, 112.12, 112.23; 359/558, 571
See application file for complete search history.

(56) References Cited

U.S. PATENT DOCUMENTS

| | | | | |
|---|---|---|---|---|
| 7,248,409 | B2 * | 7/2007 | Komma et al. | 359/569 |
| 7,382,709 | B2 * | 6/2008 | Kimura et al. | 369/112.12 |
| 2004/0047269 | A1 * | 3/2004 | Ikenaka et al. | 369/112.08 |
| 2005/0105183 | A1 * | 5/2005 | Hayashi | 359/571 |
| 2009/0034398 | A1 * | 2/2009 | Kaneda et al. | 369/112.03 |

FOREIGN PATENT DOCUMENTS

| | | |
|---|---|---|
| JP | 2004-265573 | 9/2004 |
| JP | 2009-076163 | 4/2009 |

* cited by examiner

*Primary Examiner* — Wayne Young
*Assistant Examiner* — Brenda Bernardi
(74) *Attorney, Agent, or Firm* — Wolf, Greenfield & Sacks, P.C.

(57) ABSTRACT

Provided is an objective lens used in an optical pickup that performs recording and/or reproducing of information signals on three different types of optical discs using different wavelengths. The objective lens is configured to collect light beams with the at least three wavelengths $\lambda 1$, $\lambda 2$, and $\lambda 3$, which satisfy a relationship of $\lambda 1 < \lambda 2 < \lambda 3$, on signal recording surfaces of compatible optical discs corresponding to the respective wavelengths. The objective lens includes: a diffractive portion that has a predetermined diffraction structure formed on an incident side surface. The diffractive portion has a first region that is provided in an innermost peripheral portion so as to diffract the light beams, a second region that is provided outside the first region so as to diffract the light beams, and a third region that is provided outside the second region.

11 Claims, 39 Drawing Sheets

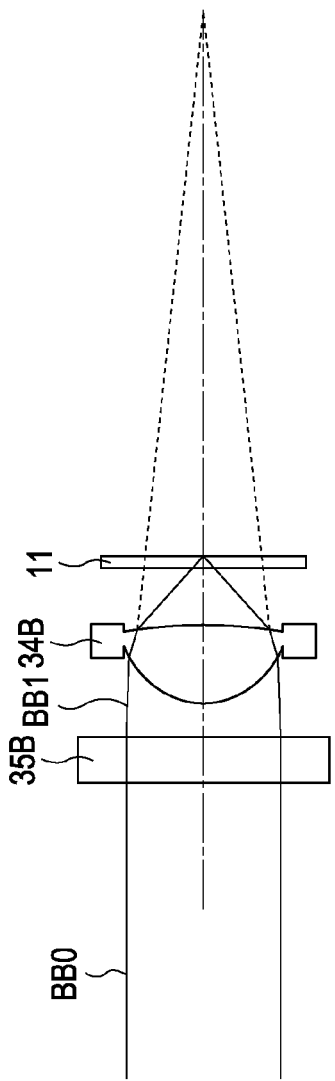
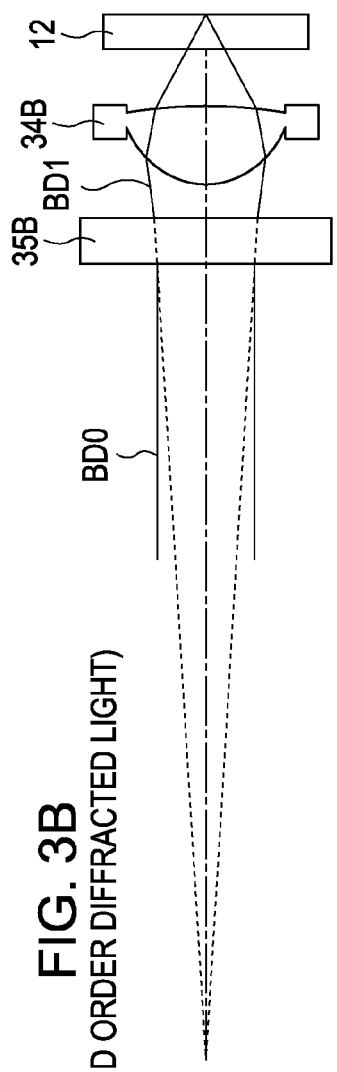
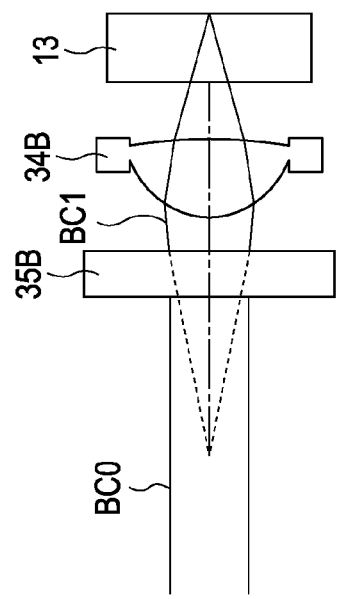
FIG. 3A (+1ST ORDER DIFFRACTED LIGHT)
FIG. 3B (−2ND ORDER DIFFRACTED LIGHT)
FIG. 3C (−3RD ORDER DIFFRACTED LIGHT)

(S = 2)

(S = ∞)

+

$\delta_s$

+

$\delta_b$

=

+

=

+

=

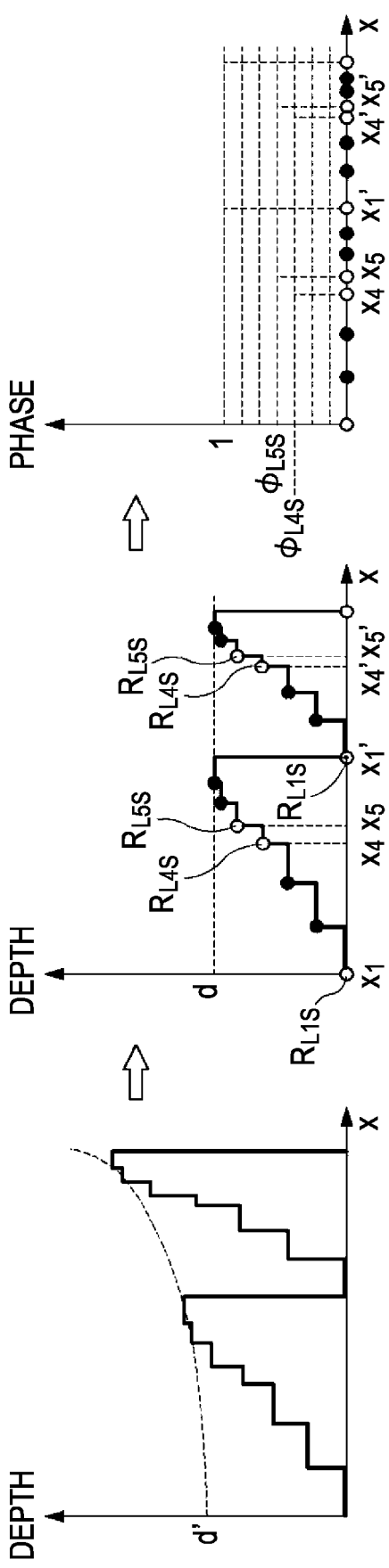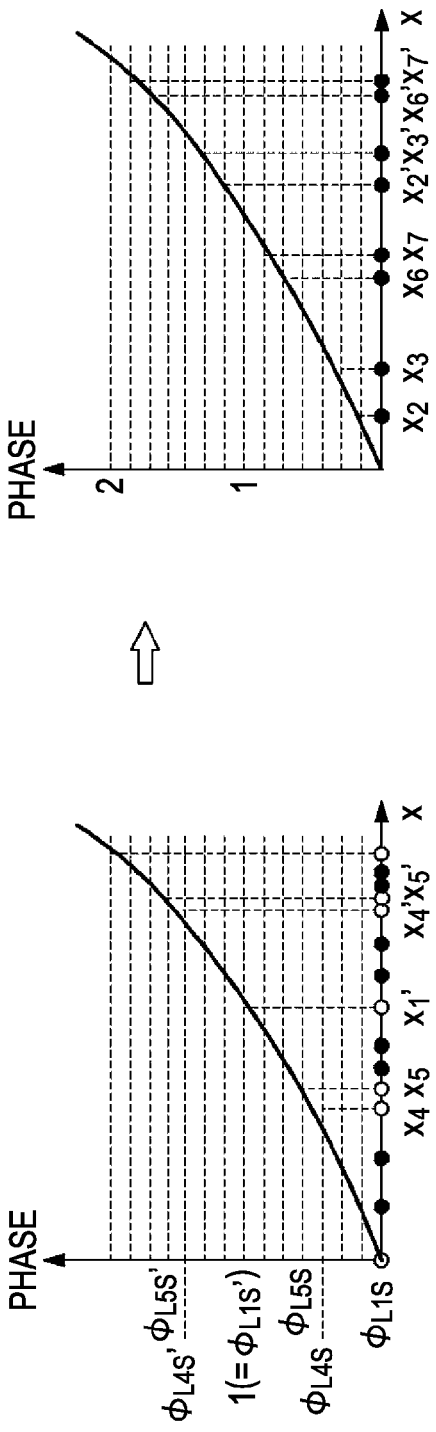

OBJECTIVE LENS, OPTICAL PICKUP AND OPTICAL DISC APPARATUS

BACKGROUND OF THE INVENTION

1. Field of the Invention

The present invention relates to an objective lens used in an optical pickup that performs recording and/or reproducing of information signals on three different types of optical discs, the optical pickup, and an optical disc apparatus using the optical pickup.

2. Description of the Related Art

In recent years, there have been proposed, as a next-generation optical disc format, optical discs capable of high density recording, where signals are recorded and reproduced using a light beam of a blue-violet semiconductor laser beam having a wavelength around 405 nm (hereafter referred to as "high density recording optical disc"). High density recording optical discs are being proposed with a structure in which the cover layer for protecting the signal recording layer is thin, 0.1 mm for example.

When providing an optical pickup compatible with such high density recording optical discs, it is preferable that the optical pickup should be compatible with optical discs used in the related art. Specifically, it is preferable to have compatibility with CDs (Compact Discs) using a wavelength around 785 nm and DVDs (Digital Versatile Discs) using a wavelength around 655 nm, which have different formats, in the related art. That is to say, there is demand for an optical pickup and optical disc apparatus having compatibility among optical discs of multiple formats with different disc structures and accordingly different laser specifications.

In the related art, there has been a method of performing recording or reproducing of information signals on three types of optical discs of different formats by using two types of objective lenses. Specifically, there are optical pickups in which the two types of the objective lenses and two types of optical systems for DVD/CD and high density recording optical discs are provided and the respective objective lenses are switched in accordance with a wavelength used therein.

However, such optical pickups according to the related art have the following problems. First, since two objective lenses are used in the optical pickup, the attachment angle of the actuator of the objective lenses to the lens holders may be unsuitable. Thereby, it is difficult to set an optimal slope of the objective lens with respect to an optical disc, and this causes a problem of deterioration in quality of reproduced signals. Second, in such optical pickups, the number of components which should be placed along the optical path of each of the two optical systems increases. Accordingly, there are problems of an increase in cost and an increase in the size of the optical pickup. Moreover, in the above-mentioned optical pickups, it is necessary for the two objective lenses to be mounted on the actuator for driving the objective lenses. Hence, the weight of the actuator increases, and this causes a problem of deterioration in sensitivity.

As opposed to the above-mentioned configuration, in order to solve the above-mentioned problems and further simplify optical components, there has been studied an optical pickup that has a single common objective lens for a plurality of types of optical discs and three used wavelengths. A basic principle for providing an objective lens for three-wavelength light beams is to provide a diffractive portion in the optical path and thereby diffract the light beams in a divergent direction or in a convergent direction, thereby correcting spherical aberration caused by the combination of the used wavelengths and the media.

However, in the optical pickup, which has been studied in the related art, capable of achieving three-wavelength compatibility by using a single objective lens, it has not been considered that unwanted diffracted light caused by the diffraction structure is increased by change in temperature and wavelength. That is, such unwanted light may form an image on the light sensing element similarly to regular light. Hence, in particular, at the time of reading a double layer optical disc, a signal generated from another layer interferes with a focus servo signal, and thus a problem arises in that it is difficult to perform a stable focus servo.

Japanese Unexamined Patent Application Publication No. 2004-265573 is an example of the related art.

SUMMARY OF THE INVENTION

It is desirable to provide an objective lens used in an optical pickup capable of performing recording and/or reproducing of information signals on three different types of optical discs using respective wavelength beams different from each other by allowing a single common objective lens to collect the light beams on a signal recording surface without complicating a configuration thereof, and simultaneously achieving favorable recording and reproducing characteristics regardless of change in temperature and wavelength. In addition, it is also desirable to provide an optical pickup and an optical disc apparatus using the objective lens.

According to a first embodiment of the invention, an objective lens is configured to collect light beams with the at least three wavelengths $\lambda 1$, $\lambda 2$, and $\lambda 3$, which satisfy a relationship of $\lambda 1 < \lambda 2 < \lambda 3$, on signal recording surfaces of compatible optical discs corresponding to the respective wavelengths. The objective lens includes: a diffractive portion that has a predetermined diffraction structure formed on an incident side surface. The diffractive portion has a first region that is provided in an innermost peripheral portion so as to diffract the light beams, a second region that is provided outside the first region so as to diffract the light beams, and a third region that is provided outside the second region. The first to third regions are formed to have diameters of apertures allowing the light beam with the wavelength $\lambda 1$ to correspond to the first to third regions, the light beam with the wavelength $\lambda 2$ to correspond to the first and second regions, and the light beam with the wavelength $\lambda 3$ to correspond to the first region. In the first region, a diffraction structure is formed in an orbicular zone shape with a predetermined height. The diffraction structure of the first region is a periodic structure in which structures having a unit period are successively formed in a radial direction of the orbicular zone, and a structure in which a blazed structure with a height h is overlapped with a multi-step diffraction structure. A slope direction of the blazed structure is an increasing direction opposite to a direction of increasing heights of steps of the multi-step diffraction structure. The height h satisfies a relational expression of $h < (\lambda 1/(n1-1))$, where n1 is a refractive index of a constituent material of the corresponding objective lens at the wavelength $\lambda 1$. The multi-step diffraction structure is a non-equidistant multi-step diffraction structure that is different from an equidistant multi-step diffraction structure, in which widths of the steps in the period are equivalent and heights of the steps in the period are equivalent, in that the widths thereof are changed.

Further, according to second embodiment of the invention, an optical pickup includes: an objective lens to which light beams with the at least three wavelengths $\lambda 1$, $\lambda 2$, and $\lambda 3$ satisfying a relationship of $\lambda 1 < \lambda 2 < \lambda 3$ are incident; and a diffractive portion that is provided on one side of an optical element or the objective lens disposed in optical paths of the light beams with the three wavelengths λ1, λ2, and λ3 so as to collect the light beams with the three wavelengths λ1, λ2, and λ3 through the objective lens on signal recording surfaces of compatible optical discs corresponding to the respective wavelengths. The diffractive portion has a first region that is provided in an innermost peripheral portion so as to diffract the light beams, a second region that is provided outside the first region so as to diffract the light beams, and a third region that is provided outside the second region. The first to third regions are formed to have diameters of apertures allowing the light beam with the wavelength λ1 to correspond to the first to third regions, the light beam with the wavelength λ2 to correspond to the first and second regions, and the light beam with the wavelength λ3 to correspond to the first region. In the first region, a diffraction structure is formed in an orbicular zone shape with a predetermined height. The diffraction structure of the first region is a periodic structure in which structures having a unit period are successively formed in a radial direction of the orbicular zone, and a structure in which a blazed structure with a height h is overlapped with a multi-step diffraction structure. A slope direction of the blazed structure is an increasing direction opposite to a direction of increasing heights of steps of the multi-step diffraction structure. The height h satisfies a relational expression of $h<(\lambda 1/(n1-1))$, where n1 is a refractive index of a constituent material of the corresponding objective lens at the wavelength λ1. The multi-step diffraction structure is a non-equidistant multi-step diffraction structure that is different from an equidistant multi-step diffraction structure, in which widths of the steps in the period are equivalent and heights of the steps in the period are equivalent, in that the widths thereof are changed.

Further, according to a third embodiment of the invention, an optical disc apparatus includes: an optical pickup that records and/or reproduces an information signal by selectively illuminating a plurality of light beams with the different wavelengths on a plurality of types of optical discs which are driven to be rotated. The optical pickup according to the second embodiment may be used in the optical disc apparatus.

According to the embodiment of the invention, it is possible to collect appropriately the light beams corresponding to the three types of the optical discs on the respective signal recording surfaces through the diffractive portion by using the single common objective lens. Further, according to the embodiment of the invention, the servo is prevented from becoming unstable due to an increase of the unwanted diffracted light, which is generated from the diffractive portion, caused by the change in temperature and wavelength. With such a configuration, the embodiment of the invention prevents recording and reproducing characteristics from being deteriorated, thereby obtaining favorable recording and reproducing characteristics.

BRIEF DESCRIPTION OF THE DRAWINGS

FIGS. 3A to 3C are diagrams illustrating functions of a diffractive portion constituting the optical pickup shown in FIG. 2, the diagrams illustrating functions of the diffractive optical element having a diffractive function and an objective lens having a refractive function in an exemplary case where the diffractive portion is provided on an optical element separate from the objective lens, where FIG. 3A is a diagram illustrating light beam tracing in an exemplary case where +1st order diffracted light of a light beam with a first wavelength is generated for a first optical disc, FIG. 3B is a diagram illustrating light beam tracing in an exemplary case where −2nd order diffracted light of a light beam with a second wavelength is generated for a second optical disc, and FIG. 3C is a diagram illustrating light beam tracing in an exemplary case where −3nd order diffracted light of a light beam with a third wavelength is generated for a third optical disc;

FIG. 4A is a top plan view of the objective lens, and FIG. 4B is a sectional view of the objective lens;

FIG. 5A is a top plan view of the objective lens, and FIG. 5B is a sectional view of the objective lens;

FIG. 6A is a side view illustrating an exemplary light collecting optical device constituted by the objective lens in which a diffractive portion is integrally formed on the incident side surface thereof, and FIG. 6B is a side view illustrating an exemplary light collecting optical device constituted by an objective lens and a diffractive optical element which has a diffractive portion on the incident side surface thereof;

FIG. 7A is a side view illustrating an exemplary light collecting optical device constituted by the objective lens in which a diffractive portion is integrally formed on the incident side surface thereof, and FIG. 7B is a side view illustrating an exemplary light collecting optical device constituted by an objective lens and a diffractive optical element which has a diffractive portion on the incident side surface thereof;

FIG. 8A is a sectional view illustrating a shape of an example of a first region, which is a diffraction region provided as an inner orbicular zone of the diffractive portion, relative to a reference surface, FIG. 8B is a sectional view illustrating a shape of a non-equidistant multi-step structure, to which a blazed structure for obtaining the diffraction structure shown in FIG. 8A is not applied, relative to the reference shape, and FIG. 8C is a sectional view illustrating an equidistant multi-step structure to be compared with the non-equidistant multi-step structure shown in FIG. 8B;

FIG. 10A is a sectional view illustrating a shape of an example of a second region, which is a diffraction region provided as an intermediate orbicular zone of the diffractive portion, relative to the reference surface, and FIG. 10B is a sectional view illustrating a shape of an example of a third region, which is a diffraction region provided as an outer orbicular zone of the diffractive portion, relative to the reference surface;

FIG. 16A is a diagram illustrating a relationship between the height of a grating and the radial position of a 6-step 7-level diffraction structure, which is formed in an equidistant multi-step shape, during a single period in a general configuration before the reduction, FIGS. 16B to 16D are diagrams illustrating the amounts of phases applied to the diffracted light beams, which have diffraction orders selected for the respective first to third wavelengths $\lambda 1$, $\lambda 2$, and $\lambda 3$, by the general configuration shown in FIG. 16A, FIG. 16E is a diagram illustrating a relationship between the height of the grating and the radial position thereof during the single period in an improved configuration, which is modified by an improved step-width method, comparing with the general configuration shown in FIG. 16A, and FIGS. 16F to 16H are diagrams illustrating the amounts of phases applied to the diffracted light beams, which have diffraction orders selected for the respective first to third wavelengths $\lambda 1$, $\lambda 2$, and $\lambda 3$, by the improved configuration shown in FIG. 16E;

FIG. 23A is a diagram illustrating a diffraction structure to which a slope is applied, FIG. 23B is a diagram illustrating an example of a step structure to which a slope is applied, and FIG. 23C is a diagram illustrating a blazed structure representing the applied slope;

FIG. 24A is a diagram illustrating a relationship between the height of the grating and the radial position of the diffraction structure during the single period in an improved configuration which is changed by applying the improved slope-applied method to the improved step-width configuration shown in FIG. 16E, and FIGS. 24B to 24D are diagrams illustrating the amounts of phases applied to the diffracted light beams, which have the diffraction orders selected for the respective first to third wavelengths $\lambda 1$, $\lambda 2$, and $\lambda 3$, by the improved configuration shown in FIG. 24A;

FIGS. 25A and 25B are diagrams illustrating the amounts of phase ϕ-kx of light with the orders, which are changed into the first unwanted light and the second unwanted light by the diffraction structure shown in FIG. 16E, for each radial position, and FIGS. 25C and 25D are diagrams illustrating the amounts of phase ϕ-kx of light with the orders, which are changed into the first unwanted light and the second unwanted light by the diffraction structure shown in FIG. 24A, for each radial position;

FIG. 37A is a diagram illustrating an example of the multi-step structure to which a slope is applied, FIG. 37B is a diagram illustrating a blazed structure representing the applied slope, FIG. 37C is a diagram illustrating a binary structure further overlapped therewith, and FIG. 37D is a diagram illustrating the double-slope-applied diffraction structure which can be obtained by overlapping the structures shown in FIGS. 37A to 37C.

FIG. 38A is a diagram illustrating an example of the multi-step structure to which a slope is applied, FIG. 38B is a diagram illustrating a double-period blazed structure representing the applied slope, and FIG. 38C is a diagram illustrating a multi-period slope-applied diffraction structure which can be obtained by overlapping the structure shown in FIGS. 38A and 38B;

FIG. 39A is a diffraction structure to which the single blazed structure is already applied as shown in FIG. 38C, FIG. 39B is a diagram illustrating a blazed structure having the same period as the multi-step diffraction structure representing the further applied slope, and FIG. 39C is a diagram illustrating a slope-combination-applied diffraction structure which can be obtained by overlapping the structure shown in FIGS. 39A and 39B;

FIGS. 43A to 43E are diagrams illustrating a phase estimation method based on the lens shape and a verification method of the improved configuration;

DESCRIPTION OF THE PREFERRED EMBODIMENTS

Hereinafter, the preferred embodiments of the invention will be described in order of the following items.

1. Entire Configuration of Optical Disk Apparatus
2. Entire Configuration of Optical Pickup
3. Regarding Objective Lens According to Embodiment of Invention
4. Regarding Another Example of Objective Lens According to Embodiment of Invention
5. Regarding Method of Preventing Unwanted Diffracted Light from Increasing due to Change in Temperature and Wavelength
6. Regarding Example of Diffractive Portion Used in Optical Pickup According to Embodiment of Invention (Modified Example 3)
7. Regarding Another Example of Diffractive Portion Used in Optical Pickup According to Embodiment of Invention (Modified Example 4)
8. Regarding Optical Pickup According to Embodiment of Invention 9. Regarding Another Optical Pickup According to Embodiment of Invention 1. Entire Configuration of Optical Disk Apparatus Hereinafter, an optical disc apparatus using an optical pickup according to an embodiment of the invention will be described with reference to the accompanying drawings.

Figure 1:
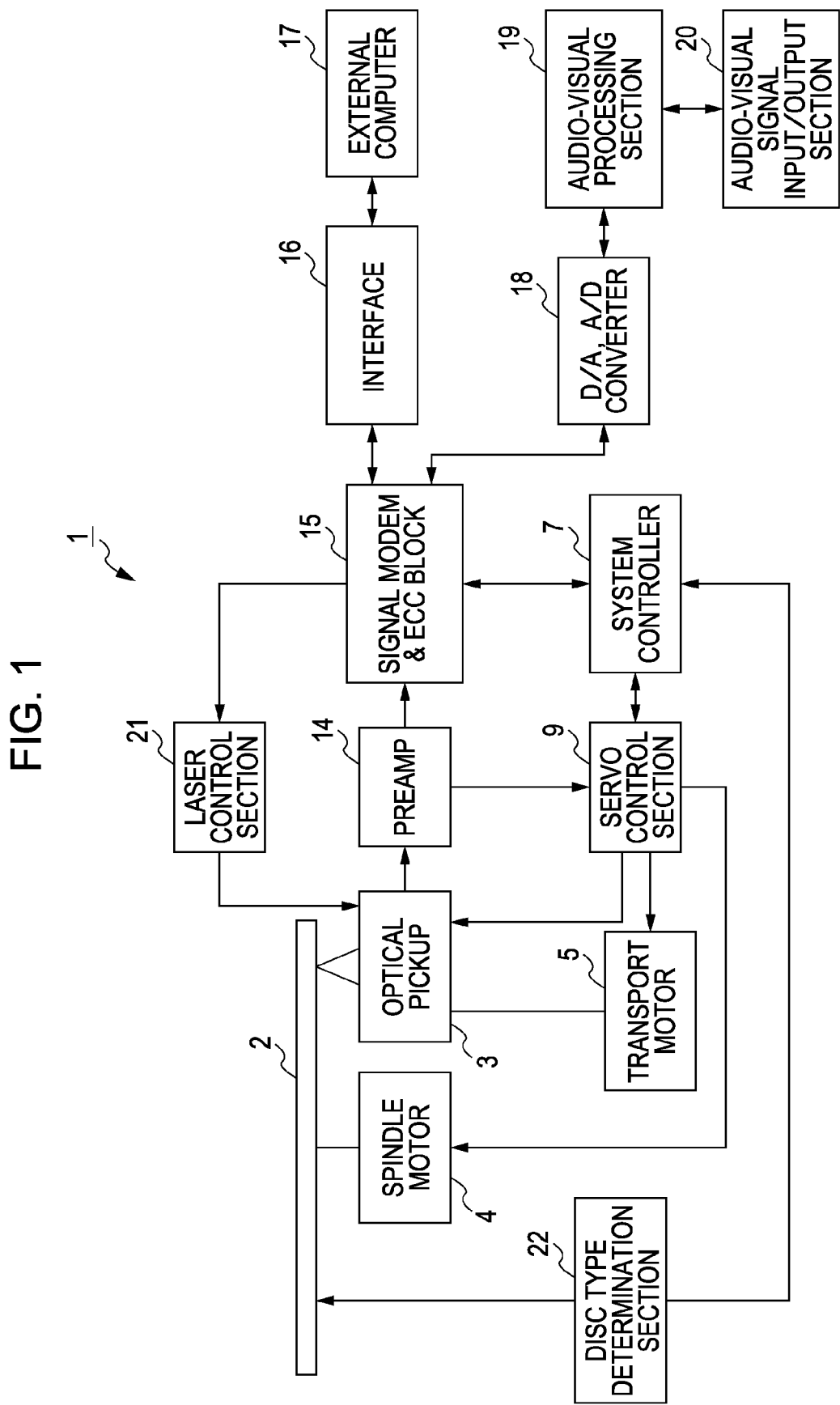
FIG. 1 is a block circuit diagram illustrating an optical disc apparatus according to an embodiment of the invention.

As shown in FIG. 1, an optical disc apparatus 1 according to an embodiment of the invention includes an optical pickup 3 that performs recording and reproducing of information on an optical disc 2, a spindle motor 4 that functions as a rotation-drive section for rotating the optical disc 2. Further, the optical disc apparatus 1 includes a transport motor 5 that moves the optical pickup 3 in the radial direction of the optical disc 2. The optical disc apparatus 1 has compatibility among three different standards for performing recording and/or reproducing of information on three types of optical discs having three different formats and optical discs having laminated recording layers.

The optical disc used here is, for example, an optical disc such as a CD (Compact Disc), a CD-R (Recordable), or a CD-RW (ReWritable) using a semiconductor laser with an emission wavelength of around 785 nm as a light source. Further, the optical disc used here is, for example, an optical disc such as a DVD (Digital Versatile Disc), a DVD-R (Recordable), a DVD-RW (ReWritable), or a DVD+RW (ReWritable) using a semiconductor laser with an emission wavelength of around 655 nm as a light source. Furthermore, the optical disc used here is, for example, an optical disc of a high-density recordable type, such as a BD (Blu-ray Disc (registered trademark)), that allows high-density recording using a semiconductor laser with a short emission wavelength of around 405 nm (blue-violet) as a light source.

In particular, description will be hereinafter given under the assumption that the following first to third optical discs 11, 12, and 13 are used as the three types of optical discs 2 on which the optical disc apparatus 1 performs reproducing or recording of information. The first optical disc 11 is an optical disc such as BD, mentioned above, capable of high density recording, which has a protective layer formed to have a first thickness of around 0.1 mm and uses a light beam with a wavelength around 405 nm as the recording and reproducing beam. Generally, in the first optical disc 11, an optical disc (cover layer thickness: 100 μm) having a single recording layer and a so-called double layer optical disc having two recording layers can be used. However, an optical disc having a plurality of recording layers may be used. In the case of the double layer optical disc, a thickness of a cover layer of a recording layer L0 is set to around 100 μm, and a thickness of a cover layer of a recording layer L1 is set to around 75 μm. The second optical disc 12 is an optical disc such as a DVD which has a protective layer formed to have a second thickness of around 0.6 mm and uses a light beam with a wavelength around 655 nm as the recording and reproducing beam. In addition, the optical disc may also be provided with a plurality of recording layers. The third optical disc 13 is an optical disc such as a CD which has a protective layer formed to a third thickness of around 1.1 mm and uses a light beam with a wavelength around 785 nm as the recording and reproducing beam.

Driving of the spindle motor 4 and transport motor 5 of the optical disc apparatus 1 is controlled by a servo control section 9 controlled on the basis of instructions from a system controller 7 also serving as a disc type determination unit, in accordance with the type of disc. The spindle motor 4 and transport motor 5 are driven at a predetermined revolution in accordance with, for example, the first optical disc 11, second optical disc 12, and third optical disc 13.

The optical pickup 3 includes a three-wavelength compatible optical system. The optical pickup 3 emits light beams having different wavelengths from the protective layer to the recording layer of the optical discs conforming to different standards and detects the reflected light beams from the recording layer. The optical pickup 3 outputs signals corresponding to each of the light beams, from the detected reflected light.

The optical disc apparatus 1 includes a preamp 14 that generates a focus error signal, a tracking error signal, an RF signal on the signal output from the optical pickup 3. Further, the optical disc apparatus 1 includes signal modem and error correction code block 15 (hereinafter, referred to as a signal modem & ECC block) that demodulates the signals received from the preamp 14 or modulates signals received from an external computer 17. Further, the optical disc apparatus 1 includes an intersurface 16, a D/A, A/D converter 18, an audio-visual processing section 19, and an audio-visual signal input output section 20.

The preamp 14 generates the focus error signal in an astigmatism method and the tracking error signal in a 3-beam method, a DPD method, and a DPP method, on the basis of the output from the optical detector. Further, the preamp 14 generates the RF signal, and outputs the RF signal to the signal modem & ECC block 15. Further, the preamp 14 outputs the focus error signal and the tracking error signal to the servo control section 9.

The signal modem & ECC block 15 performs the following processes on digital signals input from the intersurface 16 or the D/A, A/D converter 18 when data is recorded on the first optical disc. That is, at the time of recording data on the first optical disc 11, the signal modem & ECC block 15 performs error correction processing in an error correction method such as an LDC-ECC, a BIS, or the like on the input digital signals. Then, the signal modem & ECC block 15 performs modulation processing such as a 1-7PP method or the like. Further, at the time of recording data on the second optical disc 12, the signal modem & ECC block 15 performs error correction processing in an error correction method such as a PC (Product Code) or the like, and then performs modulation processing such as 8-16 modulation or the like. At the time of recording data on the third optical disc 13, the signal modem & ECC block 15 performs error correction processing in an error correction method such as a CIRC or the like, and then performs modulation processing such as 8-14 modulation or the like. The signal modem & ECC block 15 then outputs the modulated data to a laser control section 21. Further, at the time of reproducing each of the optical discs, the signal modem & ECC block 15 performs demodulation processing according to the modulation methods on the basis of the RF signals input from the preamp 14. Further, the signal modem & ECC block 15 performs error correction processing, and outputs the data to the intersurface 16 or the D/A, A/D converter 18.

In addition, when compressing and recording data, a compression/decompression section may be provided between the signal modem & ECC block 15 and the intersurface 16 or D/A, A/D converter 18. In this case, the data is compressed with a method such as MPEG2 or MPEG4.

The servo control section 9 receives input of the focus error signals and the tracking error signals from the preamp 14. The servo control section 9 generates focus servo signals and tracking servo signals so that the focus error signals and tracking error signals become 0, and drives to control an objective lens drive section, such as a biaxial actuator or the like for driving the objective lens, on the basis of the servo signals. Also, the servo control section 9 detects a synchronizing signal and the like from the output from the preamp 14, and controls the spindle motor in a method of a CLV (Constant Linear Velocity), a CAV (Constant Angular Velocity), a combination thereof, or the like.

The laser control section 21 controls the laser light source of the optical pickup 3. Particularly, in this specific example, the laser control section 21 performs control so as to make the output powers of the laser light source different between the recording mode and the reproducing mode. The laser control section 21 performs control so as to make the output power of the laser light source different in accordance with the type of the optical disc 2. The laser control section 21 switches the laser light source of the optical pickup 3 in accordance with the type of the optical disc 2 detected by a disc type determining section 22.

The disc type determining section 22 is able to detect the different formats of the optical disc 2 by detecting change in the amount of reflected light on the basis of the surface reflectance between the first to third optical discs 11, 12, and 13, differences in shape and outward shape, and the like.

The respective blocks constituting the optical disc apparatus 1 are configured to be able to perform signal processing based on the specification of the optical disc 2 which is mounted thereon, in accordance with the detection results of the disc type determining section 22.

The system controller 7 controls the entire device in accordance with the type of the optical disc 2 determined by the disc type determining section 22. Further, the system controller 7 controls the respective sections on the basis of address information or table of contents (TOC) recorded in a premastered pit, a groove, or the like provided on the innermost periphery of the optical disc, in accordance with the operation input from a user. That is, the system controller 7 specifies the recording position or reproducing position of the optical disc to be recorded or reproduced on the basis of the above-mentioned information, and controls the respective sections on the basis of the specified position.

The optical disc apparatus 1 configured as described above operates to rotate the optical disc 2 by the spindle motor 4. Then, the optical disc apparatus 1 controls the transport motor 5 in accordance with the control signal from the servo control section 9, and moves the optical pickup 3 to the position corresponding to a desired recording track of the optical disc 2, thereby performing recording and reproducing of information on the optical disc 2.

Specifically, when the optical disc apparatus 1 performs recording and reproducing, the servo control section 9 rotates the optical disc 2 in a method of the CAV, the CLV or the combination thereof. The optical pickup 3 illuminates a light beam from the light source to detect the returning light beam from the optical disc 2 by detector, thereby generating the focus error signal and the tracking error signal. Further, the optical pickup 3 drives the objective lens by an objective lens drive section on the basis of these focus error signal and tracking error signal, thereby performing focus servo and tracking servo.

When the optical disc apparatus 1 performs recording, signals from an external computer 17 are input to the signal modem & ECC block 15 via the intersurface 16. The signal modem & ECC block 15 adds the above-mentioned predetermined error correction code to the digital data which is input from the intersurface 16 or the D/A, A/D converter 18, performs predetermined modulation processing, and subsequently generates a recording signal. The laser control section 21 controls the laser light source of the optical pickup 3 on the basis of the recording signal which is generated by the signal modem & ECC block 15, and records on a predetermined optical disc.

When the optical disc apparatus 1 reproduces the information recorded on the optical disc 2, the signal modem & ECC block 15 performs the demodulation processing on a signal which is detected by the optical detector. When the recording signal demodulated by the signal modem & ECC block 15 is for data storage of the computer, the recording signal is output to the external computer 17 through the intersurface 16. Thereby, the external computer 17 is able to operate on the basis of the signal which is recorded on the optical disc 2. Further, when the recording signal demodulated by the signal modem & ECC block 15 is for audio visual, the recording signal is subjected to digital-to-analog conversion by the D/A, A/D converter 18, and is supplied to the audio-visual processing section 19. Subsequently, the recording signal is subjected to audio-visual processing by the audio-visual processing section 19, and is output to an external speaker or monitor, which is not shown in the drawing, through the audio-visual signal input output section 20.

Here, the optical pickup 3 and the like, which are used in the above-mentioned optical disc apparatus 1, for performing recording and reproducing will be described in detail.

2. Entire Configuration of Optical Pickup

Next, the optical pickup 3, which is used in the above-mentioned optical disc apparatus 1, according to the invention is described. The optical pickup 3, as described above, selectively illuminates a plurality of light beams with the different wavelengths on the voluntarily selected optical disc of the three types of the first to third optical discs 11, 12, and 13 having different formats such as thickness of the protective layer. In addition, the optical pickup 3 has compatibility among three wavelengths used to perform recording and/or reproducing of the information signal on the three types of optical discs. In addition, the optical pickup 3 is configured to increase the light use efficiency, reduce incidence of the unwanted light, appropriately set the operation distance and the focal length, and be advantageous in view of manufacture.

Figure 2:
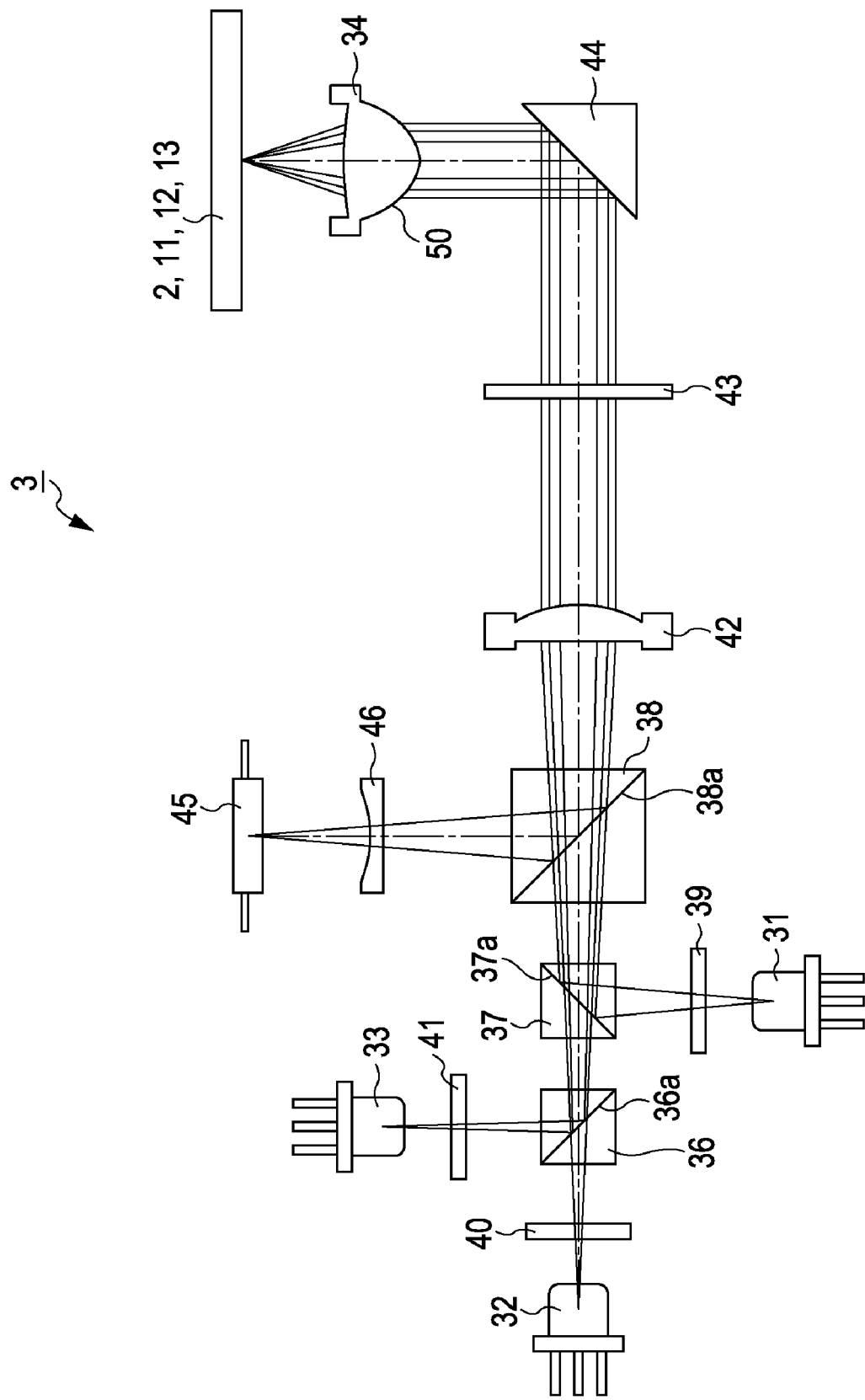
FIG. 2 is a ray-tracing diagram illustrating an optical system of an optical pickup according to the embodiment of the invention.

As shown in FIG. 2, the optical pickup 3 according to the embodiment of the invention includes a first light source section 31 having a first emission portion for emitting a light beam with a first wavelength. Further, the optical pickup 3 includes a second light source section 32 having a second emission portion for emitting a light beam with a second wavelength longer than the first wavelength. Further, the optical pickup 3 includes a third light source section 33 having a third emission portion for emitting a light beam with a third wavelength longer than the second wavelength. The optical pickup 3 also includes an objective lens 34 functioning as a light collecting optical device for collecting light beams, which is emitted from the first to third emission portions, onto the signal recording surface of an optical disc 2.

Further, the optical pickup 3 includes a first beam splitter 36 provided between the second and third emission portions and the objective lens 34. The first beam splitter 36 functions as an optical path synthesizing section for synthesizing the optical paths of the light beam with the second wavelength that is emitted from the second emission portion and the light beam with the third wavelength that is emitted from the third emission portion. Furthermore, the optical pickup 3 includes a second beam splitter 37 provided between the first beam splitter 36 and the objective lens 34. The second beam splitter 37 functions as an optical path synthesizing section for synthesizing the optical path of the light beams with the second and third wavelengths of which the optical paths have been synthesized by the first beam splitter 36 and the light beam with the first wavelength that is emitted from the first emission portion. Further, the optical pickup 3 includes a third beam splitter 38 provided between the second beam splitter 37 and the objective lens 34. The third beam splitter 38 functions as an optical path splitting section for splitting the outgoing optical path of the light beams with the first to third wavelengths synthesized by the second beam splitter 37 from the returning optical path of the light beam of the first to third wavelengths reflected off the optical disc (hereinafter also referred to as "returning path").

Moreover, the optical pickup 3 has a first grating 39 provided between the first emission portion of the first light source section 31 and the second beam splitter 37. The first grating 39 diffracts the light beam with first wavelength that is emitted from the first emission portion into three beams, for detection of tracking error signals and the like. Further, the optical pickup 3 has a second grating 40 provided between the second emission portion of the second light source section 32 and the first beam splitter 36. The second grating 40 diffracts the light beam with second wavelength that is emitted from the second emission portion into three beams, in order to detect tracking error signals and the like. Furthermore, the optical pickup 3 has a third grating 41 provided between the third emission portion of the third light source section 33 and the first beam splitter 36. The third grating 41 diffracts the light beam with third wavelength that is emitted from the third emission portion into three beams, for detection of tracking error signals and the like.

Further, the optical pickup 3 has a collimator lens 42 provided between the third beam splitter 38 and the objective lens 34. The collimator lens 42 functions as a angle of divergence conversion section for converting the angle of divergence of the light beams with first to third wavelengths of which the optical paths are synthesized by the third beam splitter 38 so as to be adjusted into a state of substantially parallel light or a divergent or convergent state relative to substantially parallel light. The optical pickup 3 has a ¼ wave plate 43 provided between the collimator lens 42 and the objective lens 34 so as to give ¼ wave phase difference to the light beams with first to third wavelengths of which the angle of divergence is adjusted by the collimator lens 42. The optical pickup 3 has a redirecting mirror 44 provided between the objective lens 34 and the ¼ wave plate 43. The redirecting mirror 44 redirects the light beam, which has passed through the above-mentioned optical parts within a plane substantially orthogonal to the optical axis of the objective lens 34, by reflecting the light beam, thereby emitting the light beam in the direction toward the optical axis of the objective lens 34.

Moreover, the optical pickup 3 includes an optical detector 45 for receiving and detecting the light beams with first to third wavelengths split at the third beam splitter 38 on the returning path from the light beam of the first to third wavelengths on the outgoing path. Further, the optical pickup 3 includes a multi lens 46 provided between the third beam splitter 38 and the optical detector 45. The multi lens 46 collects light beams with first to third wavelengths on the returning path split at the third beam splitter 38 onto the light sensing surface of a photodetector or the like of the optical detector 45, and simultaneously providing astigmatism for detecting focus error signals or the like.

The first light source section 31 has a first emission portion for emitting a light beam with a first wavelength around 405 nm onto the first optical disc 11. The second light source section 32 has a second emission portion for emitting a light beam with a second wavelength around 655 nm onto the second optical disc 12. The third light source section 33 has a third emission portion for emitting a light beam with a third wavelength around 785 nm onto the third optical disc 13. Further, here, the first to third emission portions are configured to be disposed on individual light source sections 31, 32, and 33, but the invention is not limited to this. For example, the light source section, which has two emission portions of the first to third emission portions, and the light source section, which has the remaining emission portion, may be disposed on different positions. Moreover, for example, the first to third emission portions may be disposed so as to form a light source section at substantially the same position.

The objective lens 34 collects the input light beams with the first to third wavelengths onto the signal recording surface of the optical disc 2. The objective lens 34 is movably held by an objective lens driving mechanism such as an unshown biaxial actuator or the like. The objective lens 34 is operated to be moved by a biaxial actuator or the like on the basis of the tracking error signals and focus error signals generated from the RF signals of the returning light from the optical disc 2 that is detected at the optical detector 45. Thereby the objective lens 34 is moved along two axes, one in the direction toward/away from the optical disc 2, and the other in the radial direction of the optical disc 2. The objective lens 34 collects light beams emitted from the first to third emission portions so that the light beams are focused on the signal recording surface of optical disc 2, and causes the focused light beam to track a recording track formed on the signal recording surface of the optical disc 2. In addition, as will be described later, a diffractive portion 50 may be provided on an optical element (the diffractive optical element 35B) separate from the objective lens (refer to FIG. 6). In this case, the later-described diffractive optical element 35B is held by a lens holder of the objective lens driving mechanism, in which the objective lens 34B is held, so as to be formed integrally with the objective lens 34B. With such a configuration, it is possible to exhibit appropriately the later-described advantages of the diffractive portion 50 which is provided on the diffractive optical element 35B even at the time of field shift such as movement in the tracking direction of the objective lens 34B.

The objective lens 34 is provided with the diffractive portion 50 including a plurality of diffraction regions formed on one surface of the lens such as the incident side surface. By using the diffractive portion 50, the objective lens 34 diffracts the respective light beams with the first to third wavelengths transmitted through the respective plurality of diffraction regions so that the beams have predetermined diffraction orders. As described above, the diffractive portion 50 of the objective lens 34 allows the light beams to have a predetermined angle of divergence in the divergent state or the convergent state and to be incident to the objective lens 34. Specifically, by using a single objective lens 34, the diffractive portion 50 is able to collect appropriately the light beams with the first to third wavelengths on the signal recording surfaces of the corresponding three type optical discs so as not to cause spherical aberration. The objective lens 34 having the diffractive portion 50 has a diffraction structure, which is configured to generate a diffractive power, formed on the basis of the lens surface shape which is configured to generate a refractive power as a reference. With such a configuration, the objective lens 34 having the diffractive portion 50 functions as a light collecting optical device that appropriately collects the light beams with the three different wavelengths on the signal recording surfaces of the optical discs corresponding thereto without causing spherical aberration. Further, as described above, the objective lens 34 has a function of a refraction element in combination with a function of a diffraction element. That is, the objective lens 34 has a refractive function resulting from a curved surface of the lens in combination with a diffractive function resulting from the diffractive portion 50 provided on one surface thereof.

Described herein is, in order to describe the diffractive function of the diffractive portion 50 conceptually, an exemplary case (refer to FIGS. 6A and 6B) where the diffractive portion 50 is provided on the diffractive optical element 35B separate from the objective lens 34B having the refractive power as described later. For example as shown in FIG. 3A, the diffractive optical element 35B, which is used together with the objective lens 34B having only the refractive function, diffracts the light beam with the first wavelength BB0, which is transmitted through the diffractive portion 50, into +1st order diffracted light BB1, and allows the beams to be incident to the objective lens 34B. That is, the diffractive optical element 35B having the diffractive portion 50 allows the light beams to have a predetermined angle of divergence in a divergent state and to be incident to the objective lens 34B, thereby collecting the light beam appropriately on the signal recording surface of the first optical disc 11. As shown in FIG. 3B, the diffractive optical element 35B diffracts the light beam with the second wavelength BD0, which is transmitted through the diffractive portion 50, into −2nd order diffracted light BD1, and allows the beams to be incident to the objective lens 34B. That is, the diffractive optical element 35B having the diffractive portion 50 allows the light beams to have a predetermined angle of divergence in a convergent state and to be incident to the objective lens 34B, thereby collecting the light beam appropriately on the signal recording surface of the second optical disc 12. As shown in FIG. 3C, the diffractive optical element 35B diffracts the light beam with the third wavelength BC0, which is transmitted through the diffractive portion 50, into −3rd order diffracted light BC1, and allows the beams to be incident to the objective lens 34B. That is, diffractive optical element 35B having the diffractive portion 50 allows the light beams to have a predetermined angle of divergence in a convergent state and to be incident to the objective lens 34B, thereby collecting the light beam appropriately on the signal recording surface of the third optical disc 13. As described above, the diffractive optical element 35B of the diffractive portion 50 is able to collect light beams appropriately on the signal recording surfaces of the three type optical discs without causing spherical aberration by using the single objective lens 34B. Furthermore, here, a description was made of an example, in which the light beams with the same wavelength are changed into diffracted light beams with the same diffraction order in a plurality of diffraction regions of the diffractive portion 50, with reference to FIGS. 3A to 3C, but the invention is not limited to this. That is, the diffractive portion 50 constituting the optical pickup 3 according to the embodiment of the invention is, as described later, able to set diffraction orders corresponding to the respective wavelengths for each area, perform appropriate aperture restriction, and reduce spherical aberration. In the above embodiment, the case where the diffractive portion 50 is provided on the optical element separate from the objective lens is exemplified for explanation. However, the diffractive portion 50 integrally provided on the one surface of the objective lens 34 described herein also has the same function by applying a diffractive power thereto in accordance with the diffraction structure. In addition, it is possible to collect the light beams with the respective wavelength appropriately on the signal recording surfaces of the corresponding optical discs so as not to cause spherical aberration by a diffractive power of the diffractive portion 50 and a refractive power resulting from the curved lens surface as a reference surface of the objective lens 34.

Regarding the above-mentioned and the following descriptions of the diffraction order, the diffraction order of the incident light beam, which is diffracted in a direction approaching the optical axis side as it propagates in an advance direction, is defined as a positive diffraction order, and the diffraction order of the incident light beam, which is diffracted in a direction diverging from the optical axis side as it propagates in an advance direction, is defined as a negative diffraction order. In other words, the diffraction order of the incident light beam, which is diffracted toward the direction of the optical axis, is defined as a positive diffraction order.

Figure 4A:
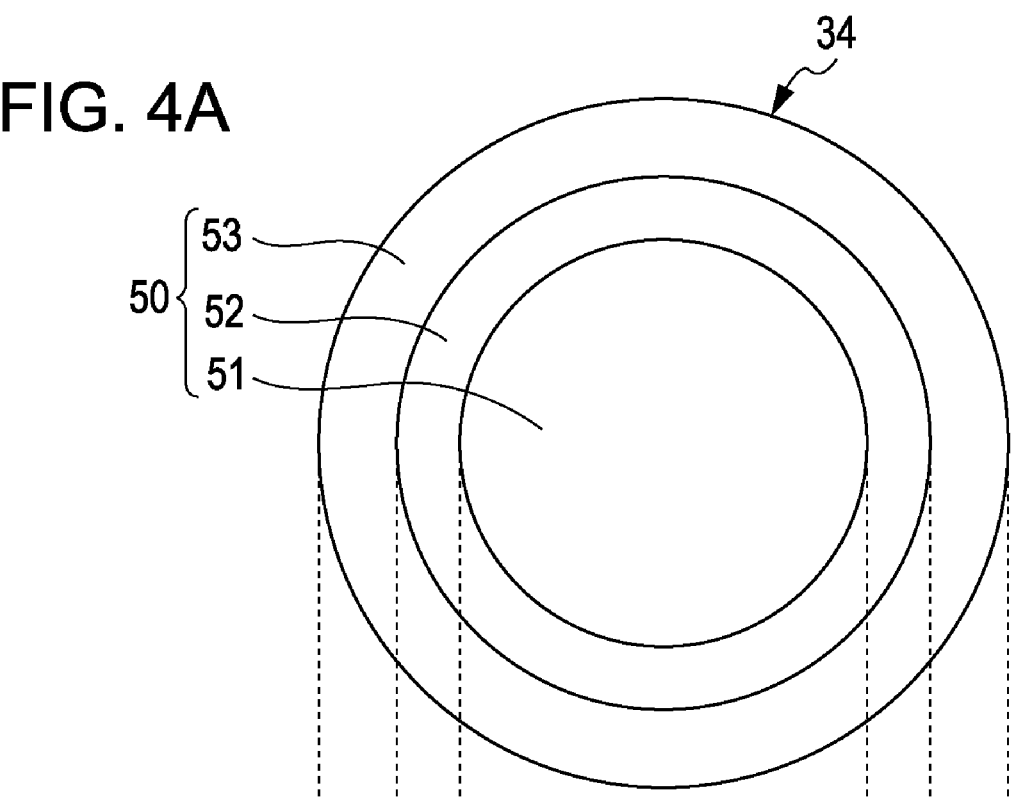
FIGS. 4A and 4B are diagrams illustrating an example of an objective lens constituting the optical pickup shown in FIG. 2 and having an exemplary configuration in which an outer orbicular zone thereof is formed as a diffractive region, where
Figure 4B:
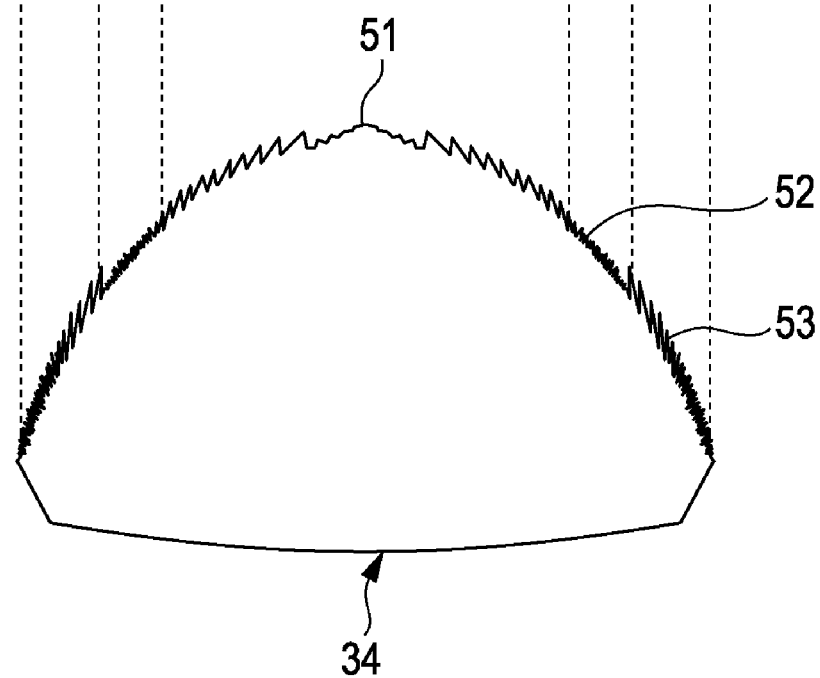

Furthermore, the objective lens and diffractive portion provided in the optical pickup 3 according to the embodiment of the invention are not limited to the objective lens 34 and the diffractive portion 50 shown in FIGS. 4A and 4B, and examples of other configurations of those are shown in FIGS. 5A to 7B. Each specific configuration will be described in detail in the following Sections 3 to 7.

The collimator lens 42 provided between the objective lens 34 and the third beam splitter 38 converts the respective angles of divergence of the first to third wavelength light beams of which the optical paths are synthesized by the second beam splitter 37 and passed through the third beam splitter 38. By converting angles of divergence of the light beams with respective wavelengths, the collimator lens 42 emits the beams to the ¼ wave plate 43 and objective lens 34 side, for example, in a substantially parallel light state. For example, the collimator lens 42 allows the light beam with the first wavelength to be incident to the above-mentioned objective lens 34 with the angle of divergence thereof in the state of substantially parallel light. In addition, the collimator lens 42 allows the light beams with the second and third wavelengths to be incident to the objective lens 34 in a divergent angle state which is slightly diverged or converged relative to parallel light (hereinafter also referred to as "finite system state"). With such a configuration, the collimator lens 42 is able to achieve three-wavelength compatibility while reducing aberrations by reducing spherical aberration at the time of collecting the light beams with the second and the third wavelengths on the signal recording surfaces of the second and third optical discs through the objective lens 34. Here, due to the positional relation between the second light source section 32 and the collimator lens 42 and/or the positional relation between the third light source section 33 and the collimator lens 42, it is possible to allow the light beam to be incident to the objective lens 34 in the predetermined divergent angle state. As another configuration, for example, in a case where the plurality of emission portions are positioned on a common light source section, this may be realized by providing an element which converts only the angle of divergence of the light beam with second and/or third wavelength. Alternatively, by providing a mechanism to drive the collimator lens 42, the beams may be made to be incident to the objective lens 34 in the predetermined divergent angle state. Further, depending on the situation, either the light beam with the second wavelength or the light beam with the third wavelength may be configured to be incident to the objective lens 34 in the finite system state so as to further reduce aberrations. Further, by allowing the light beams with the second and third wavelengths to be incident to the finite system in the divergent state, it is possible to adjust the magnification at the time of the returning of the light beams. In addition, in this case, there is also an advantage of achieving further favorable compatibility between optical systems in a desirable state in which the focusing ranges are made to be appropriate to the formats by adjusting the magnification at the time of the returning.

The multi-lens 46 is, for example, a wavelength-selective multi-lens. The returning light beams with first to third wavelengths are reflected on the signal recording surface of the respective optical disc, are passed through the objective lens 34, collimator lens 42, and the like, are reflected by the third beam splitter 38 so as to be separated from the outgoing light beams, and are incident to the multi-lens 46. The multi-lens 46 appropriately collects the light beams on the light sensing surface of the photodetector or the like of the optical detector 45. At this time, the multi-lens 46 provides the returning light beam with astigmatism for detection of focus error signals or the like.

The optical detector 45 receives the returning light beam collected at the multi-lens 46, and detects, along with information signals, various types of detection signals such as focus error signals, tracking error signals, and the like.

In the optical pickup 3 configured as described above, the objective lens 34 is driven to move on the basis of the focus error signals and tracking error signals obtained by the optical detector 45. Through the driving movement of the objective lens 34, the optical pickup 3 moves the objective lens 34 to a focal position on the signal recording surface of the optical disc 2 so as to focus the light beam onto the signal recording surface of the optical disc 2, thereby performing recording or reproducing of information on the optical disc 2.

3. Regarding Objective Lens According to Embodiment of Invention

Next, the objective lens 34 used in the above-mentioned optical pickup 3 according to the embodiment of the invention and the diffractive portion 50 provided on the objective lens 34 will be described in detail.

Specifically, as shown in FIGS. 4A and 4B, the diffractive portion 50 provided on the incident side surface of the objective lens 34 has a first region (hereinafter, referred to as an "inner orbicular zone" or a "first diffraction region") 51 which is provided in the innermost peripheral portion and has a substantially circular shape. Further, the diffractive portion 50 is provided outside the first region 51, and has a second region (hereinafter, referred to as an "intermediate orbicular zone" or a "second diffraction region") 52 which has an orbicular zone shape. Further, the diffractive portion 50 is provided outside the second region 52, and has a third region (hereinafter, referred to as an "outer orbicular zone" or a "third diffraction region") 53 having an orbicular zone shape.

The first region 51 as the inner orbicular zone has a first diffraction structure which has an orbicular zone shape and has a predetermined depth. The first region 51 is configured to diffract light so that the diffracted light with the diffraction order, which is collected through the objective lens 34 to form an appropriate spot on the signal recording surface of the first optical disc, of the light beam with the first wavelength transmitted therethrough is dominant. Consequently, the first region 51 makes the diffraction order have the maximum diffraction efficiency relative to the diffracted light with other diffraction orders.

Further, by using the first diffraction structure, the first region 51 is configured to diffract light so that the diffracted light with the diffraction order, which is collected through the objective lens 34 to form an appropriate spot on the signal recording surface of the second optical disc, of the light beam with the second wavelength transmitted therethrough is dominant. Consequently, the first region 51 makes the diffraction order have the maximum diffraction efficiency relative to the diffracted light with other diffraction orders.

Further, by using the first diffraction structure, the first region 51 is configured to diffract light so that the diffracted light with the diffraction order, which is collected through the objective lens 34 to form an appropriate spot on the signal recording surface of the third optical disc, of the light beam with the third wavelength transmitted therethrough is dominant. Consequently, the first region 51 makes the diffraction order have the maximum diffraction efficiency relative to the diffracted light with other diffraction orders.

As described above, the first region 51 has a diffraction structure that is suitable for the diffracted light with the above-mentioned predetermined diffraction order to be dominant to the light beams of the respective wavelengths. Thereby, the first region 51 is able to correct and reduce spherical aberration caused when the light beams with the respective wavelengths, which are transmitted through the first region 51 and are changed into the diffracted light with the predetermined diffraction order, are collected by the objective lens 34 on the signal recording surfaces of the respective optical discs. Furthermore, in the first region 51 and the second and third regions 52 and 53 to be described later in detail, the diffracted light with the predetermined diffraction orders is selected so as to be dominant to the light beams with the respective wavelengths including the transmitted light, that is, 0th order light as described above and later.

Further, the first diffraction structure formed on the first region 51 has the orbicular zone shape, and is a periodic structure in which unitary periodic structures having a concave and convex shape, which is formed by combining the inclined portion with a plurality of steps relative to the reference surface, are successively formed in a radial direction of the orbicular zone. Here, the first diffraction structure is formed with a pitch which is constant or changed continuously, in which heights of the respective steps relative to the reference surface in the direction of the optical axis and ratios of widths of the respective steps to the width of one period are formed to be periodic. The first diffraction structure formed as the periodic structure is a structure in which a blazed structure having a height h is overlapped with the multi-step diffraction structure serving as a basis. The direction of the slope of the blazed structure is an increasing direction opposite to a direction of increasing heights of steps of the multi-step diffraction structure. Further, this configuration is made so that the height h satisfies the relational expression of $h<(\lambda 1/(n1-1))$. Here, n1 is the refractive index of a constituent material of the diffractive portion 50, that is, the refractive index of a constituent material of the objective lens 34 in this embodiment, at the first wavelength $\lambda 1$. The multi-step diffraction structure as an overlapping target, with which the blazed structure is overlapped, may be an equidistant multi-step diffraction structure, in which widths of the steps in the period are equivalent and heights of the steps in the period are equivalent. Alternatively, the multi-step diffraction structure may be a non-equidistant multi-step diffraction structure that is different from an equidistant multi-step diffraction structure in that the widths thereof are changed. Consequently, it is possible to obtain the effect of the blazed structure overlapped as described later, that is, it is possible to reduce the effect of the unwanted light. Further, in the embodiment described herein, an example is described in which non-equidistant multi-step diffraction structure is employed in order to adopt an advantageous configuration for change in temperature and wavelength. The blaze overlapping configuration is especially advantageous by being used together with the non-equidistant multi-step diffraction structure. In addition, the configuration shown in FIG. 8A is able to obtain the effect of the blaze overlapping configuration and the effect of the non-equidistant configuration.

Figure 8A:
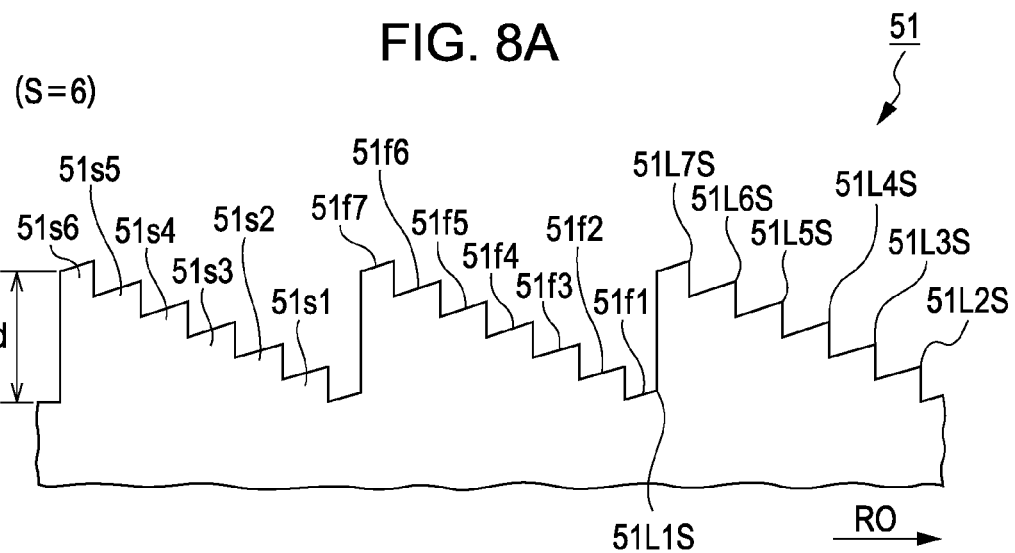
FIGS. 8A to 8C are diagrams illustrating a configuration of the diffractive portion provided on one side of the objective lens shown in FIGS. 4A, 4B, 5A, and 5B, where

Specifically, the first diffraction structure, which is described herein, provided on the first region 51 is configured, as shown in FIGS. 4A, 4B, and 8A, so that the diffraction structure having the orbicular zone shape centered on the optical axis is provided on the reference surface. That is, the first diffraction structure is formed as a slope-applied multi-step diffraction structure, and thus is formed as a structure in which the direction of the slope is an increasing direction opposite to the direction of increasing the heights of the steps. The first diffraction structure shown in FIG. 8A is described in detail with reference to FIGS. 8B and 8C.

Figure 8B:
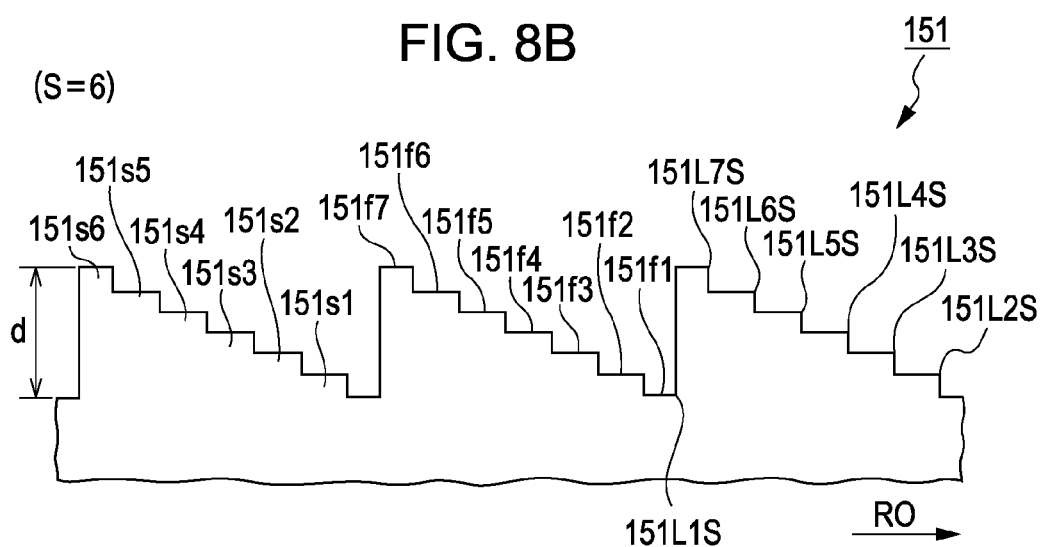
Figure 8C:
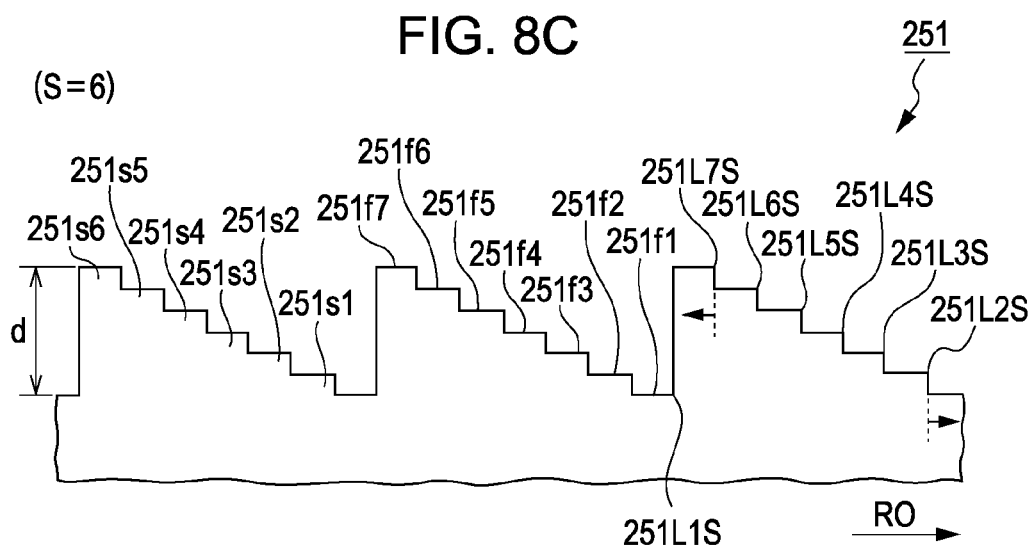

That is, the first diffraction structure is formed as the slope-applied multi-step diffraction structure shown in FIG. 8A. However, this is the same as a configuration in which a slope structure is added to the multi-step diffraction structure as a basis shown in FIG. 8B. The multi-step diffraction structure shown in FIG. 8B is different from the equidistant multi-step diffraction structure as a basis shown in FIG. 8C in that, in order to exhibit favorable characteristics regardless of the change in temperature and wavelength (hereinafter referred to as an "environmental change"), at least a part of the widths thereof is changed to be non-equidistant. Here, the diffraction structure shown in FIGS. 8B and 8C is formed so that staircase shapes (hereinafter referred to as a "multi-step shape") having the predetermined number of steps S (S is a positive integer) at the predetermined depth d (hereinafter referred to as a "groove depth") are successively formed in the radial direction. Further, the diffraction structure shown in FIG. 8C is the equidistant multi-step diffraction structure in which the widths and heights of the steps during a period are equivalent. Furthermore, in the diffraction structure shown in FIG. 8B, there are formed multi-step shapes in which, in order to exhibit favorable characteristics regardless of the environmental change (the change in temperature and wavelength), the steps are not equally spaced as described later. Here, the sectional shape of the orbicular zone in the above-mentioned diffraction structure means a sectional shape of the surface including the radial direction of the orbicular zone, that is, the surface orthogonal to the tangential direction of the orbicular zone. By overlapping the predetermined blazed structure with the diffraction structure shown in FIG. 8B, the slope-applied multi-step diffraction structure shown in FIG. 8A is formed, and thus it is possible to obtain the following effects. The detailed description of the blaze overlap structure will be given below.

Figure 10A:
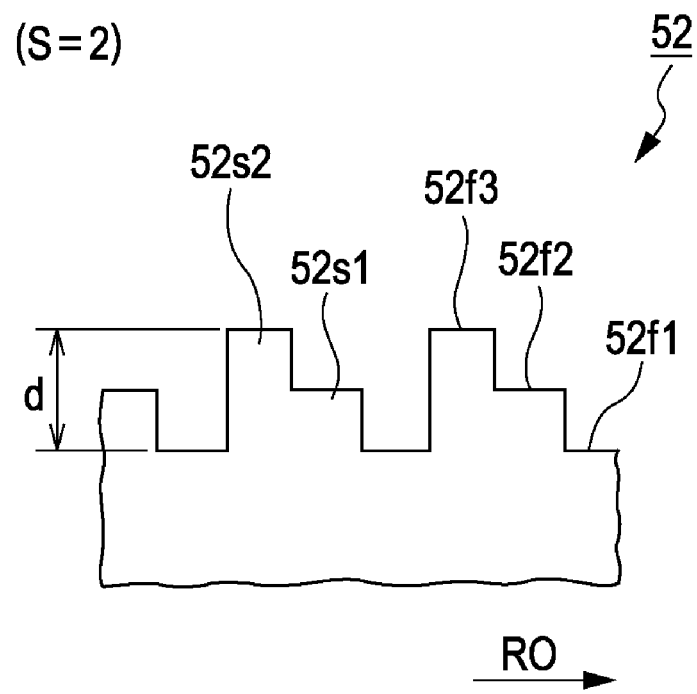
FIGS. 10A and 10B are diagrams illustrating a configuration of the diffractive portion provided on one side of the objective lens shown in FIGS. 4A, 4B, 5A, and 5B, where
Figure 10B:
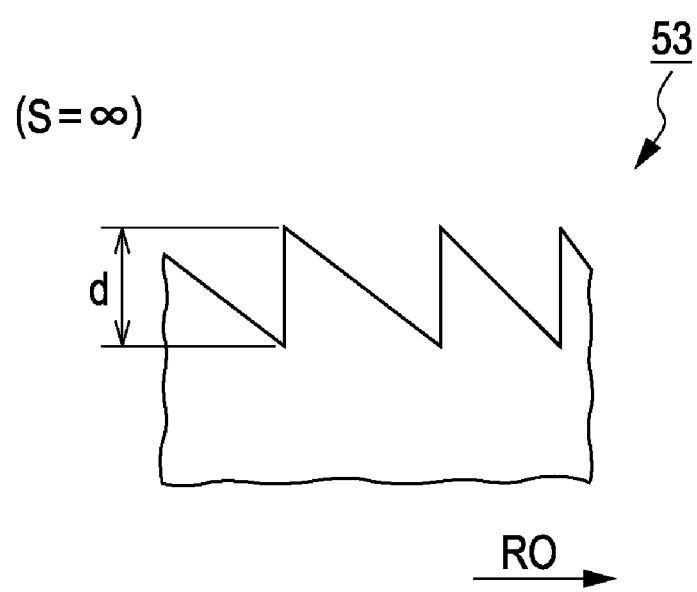

Further, the reference surface means a shape of the incident side surface for functioning as a refraction element of the objective lens 34. In addition, as shown in FIG. 4A in practice, in the first region 51, assuming that the shape of the incident side surface for functioning as a refraction element of the objective lens 34 is the reference surface, the diffraction structure is formed as follows. That is, in the first region 51, as shown in FIG. 8A, the shape of the surface is formed as a combination between the orbicular zone shape having a diffraction structure having a diffraction function and the slope-applied multi-step surface shape on the reference surface. However, in FIG. 8A and FIGS. 10A and 10B to be described later, for convenience of description, only the shape of the diffraction structure formed on the reference surface is described, and in the following description, the shape formed on the reference surface is also described. When the diffractive portion 50 is formed as an optical element (the diffractive optical element 35B to be described later) separate from the objective lens, the shapes shown in FIGS. 8A, 10A, and 10B are sectional shapes of the corresponding diffractive optical elements 35B. Further, the diffraction structures shown in FIGS. 4A and 4B, and the like are formed with microscopic dimensions in practice as described below, and FIGS. 8A to 8C and the like show enlarged sections.

Further, the diffraction structure, with which the blazed structure is not overlapped, having the multi-step shape with the predetermined number of steps S shown in FIG. 8B is formed as a structure in which the multi-step portions each having first to S-th steps with substantially equivalent depths are changed from the equidistant configuration to have the depths and widths different from each other and are successively formed in the radial direction. In other words, the diffraction structure is formed to have the first to (S+1)-th diffraction surfaces substantially equally spaced in the direction of the optical axis. Further, the predetermined depth d in the diffraction structure means a length in the optical direction between the (S+1)-th diffraction surface, which is located at a position closest to the surface side of the multi-step shape (the highest step, which is the shallowest position), and the first diffraction surface which is located at a position closest to the element side of the multi-step shape (the lowest step, which is the deepest position). Further, in FIG. 8B, the configuration is made so that as each step of each stepped portion is formed to be closer to the inside in the radial direction, that is, as the step gets closer to the inside thereof in the radial direction, the step is formed to be closer to the surface side. The reason is that the diffraction order to be described later is selected as the maximum diffraction efficiency order in the inner orbicular zone. Further, similarly to the inner orbicular zone, FIGS. 10A and 10B show the example in which each step of the multi-step shape or each unevenness slope surface having a saw-tooth shape formed closer to the inside in the radial direction is formed to be closer to the surface side, but the invention is not limited to this. That is, in accordance with the selected diffraction order, the formation direction of the blaze shape or multi-step shape state is set. In FIGS. 8A to 8C, 10A, and 10B, the reference sign RO represents the direction toward the outer side in the radial direction of the orbicular zones, that is, the direction away from the optical axis.

As described above, in the first region 51, the slope-applied multi-step diffraction structure, in which the multi-step structures having the number of steps S are successively formed in the radial direction of the orbicular zones, is formed on the reference surface. However, such a configuration includes the following additional configurations. First, in the multi-step structure with which the blazed structure is overlapped, minute steps, each of which has around a half of the level difference and the space of the structure with the same level differences and the same spaces for a single unit period, is additionally provided. The reason is that, although the minute steps having around a half of the basic level difference and space are added, the characteristics of the diffraction efficiency of the predetermined diffraction order are changed a little bit without having a great influence on the overall characteristics. In other words, the reason is that, by defining the number of steps S and the groove depth d set as follows, it is possible to exhibit the functions of the diffractive portion and the objective lens, and it is also possible to exhibit the same functions even when the minute steps are added thereto as described above. In addition, the number of steps S is the number of the steps in the multi-step structure during a single period, and when the level difference between those is equal to or less than a half of the average height of the respective steps in the multi-step structure, it is not counted as a step. Further, in the definition of the number of steps S, if S=0, it represents that the surface thereof is planar. Furthermore, the groove depth d is a difference between the maximum depth and the minimum depth during a single period, that is, the on-axis distance between the surfaces farthest away from each other in the direction of the optical axis in the multi-step structure during a single period. Further, the above description is commonly applied to the second region 52 to be described later.

In the multi-step diffraction structure serving as a basis of the first diffraction structure and the later-described second and third diffraction structures formed on the first region 51, the groove depth d and number of steps S are determined taking into consideration the dominant diffraction order and diffraction efficiency. Further, as shown in FIG. 8B, the groove widths of the steps (the radial-direction dimension of each step of the multi-step shape) help to exhibit resistance to the environmental change as described later, and are formed to be changed from its equidistant state. In addition, while looking at the different multi-step shapes formed successively in the radial direction, as the multi-step shapes are farther away from the optical axis, the steps are formed so that the value of the groove width is smaller. Further, here the configuration has been made as described above, but while looking at the different multi-step shapes formed successively in the radial direction, as the multi-step shapes are farther away from the optical axis, the steps may be formed so that the value of the groove width of each step is larger. The above description is commonly applied to FIGS. 10A and 10B. Further, the groove widths are determined on the basis of phase difference given by the diffraction regions formed with the groove widths, so that the spot, on which the light beams are collected, on the signal recording surface of the optical disc is optimal.

For example, the multi-step diffraction structure 151 as a basis of the diffraction structure of the first region 51 is, as shown in FIG. 8B, a diffraction structure in which the number of steps is 6 (S=6). That is, the multi-step portions, which include first to sixth steps 151s1, 151s2, 151s3, 151s4, 151s5, and 151s6 having the substantially equivalent depths (d/6), are formed successively in the radial direction. Further, in the multi-step portions, by changing the substantially equivalent spaces (d/6) of the steps in the direction of the optical axis and the equivalent widths in the radial direction (the equidistant state) into predetermined spaces, the first to seventh diffraction surfaces 151f1, 151f2, 151f3, 151f4, 151f5, 151f6, and 151f7 are formed. Further, hereinafter, the diffraction surfaces 151f1 to 151f7 are respectively referred to as 1 level, 2 level, 3 level, 4 level, 5 level, 6 level, and 7 level. Furthermore, in the drawings, there are shown level start points 151L1S, 151L2S, 151L3S, 151L4S, 151L5S, 151L6S, and 151L7S. Further, the diffraction structure of S=6 is referred to as a 6-level-difference 7-level or 6-step 7-level diffraction structure. Moreover, described herein is the example in which the equivalent widths are changed in order to obtain the resistance to the environmental change, but the equivalent depths may be changed.

Here, in order to describe in detail the point in which the equivalent widths in the shape shown in FIG. 8B are changed, description will be given with reference to FIG. 8C. FIG. 8C shows, as a comparative example, the diffraction structure 251 formed as a general equidistant multi-step shape having 6 steps and 7 levels. In the diffraction structure 251 shown in FIG. 8C, the multi-step portions, which include the first to sixth steps 251s1 to 251s6 having the substantially equivalent depths (d/6) of the steps, are formed successively in the radial direction. Further, the multi-step portions are formed to include the first to seventh diffraction surfaces 251f1 to 251f7 formed so that the spaces (d/6) of the steps are substantially equivalent in the direction of the optical axis and the widths are equivalent in the radial direction. The diffraction structure of the first region 151 shown in FIG. 8B is, in viewpoint of description in the following Section 5, a structure in which the 2-level start point 251L2S and 7-level start point 251L7S are changed from the basic shape (the equidistant multi-step shape) shown in FIG. 8C so as to be moved outward. Moreover, 3-to-6-level start points 251L3 to 251L6 are changed to be moved to the equally spaced positions. That is, the start points are changed to be the start points 151L2S to 151L7S of FIG. 8B. Further, described herein is the configuration in which the positions of the start points are changed in order to obtain the resistance to the environmental change in the case where the number of steps is 6 (S=6), but the invention is not limited to this. Although described later in detail, the diffraction structure of the inner orbicular zone may be configured so that, if the number of steps is $S=N_1-1$, the width of the first level and the width of the $N_1$-th level are changed by changing the equally spaced positions of the 2-level start point and the $N_1$-level start point. With such a configuration, it is possible to obtain the resistance to the environmental change.

Further, in order to change from the change of FIG. 8B into the shape of FIG. 8A, the positions of the start points 51L1S to 51L7S of the respective levels are changed by the height determined in accordance with the widths of the levels 51L1 to 51L7 and the slope angles of the overlapped blazes. With such a configuration, as shown in FIG. 8A, the diffraction structure of the slope-applied non-equidistant multi-step shape is formed which has the first to sixth steps 51s1, 51s2, 51s3, 51s4, 51s5, and 51s6 and the slope-applied 1 to 7 levels 51f1 to 51f7.

Further, the first region 51 diffracts the light beam with the first wavelength which is transmitted therethrough so that diffracted light of the k1i-th order is dominant, that is, so that the diffraction efficiency thereof is maximum. Further, the first region 51 diffracts the light beam with the second wavelength which is transmitted therethrough so that diffracted light of the k2i-th order is dominant, that is, so that the diffraction efficiency thereof is maximum. Furthermore, the first region 51 diffracts the light beam with the third wavelength which is transmitted therethrough so that diffracted light of the k3i-th order is dominant. In this case, the first region 51 is configured to have the following relationships: (k1i, k2i, k3i)=(1, −2, −3), (1, −1, −2), (0, −1, −2), (0, −2, −3), (2, −1, −2). Here, description will be given under the assumption that the sign of diffraction order is positive when the traveling direction of the diffracted light beams is a direction toward the center of the optical axis. Further, in the first region 51, the combinations of the diffraction orders are selected from the viewpoint of prevention of an increase in size, assurance of diffraction efficiency, reduction in aberrations, and advantages in manufacturing. The combinations of the orders in the first region 51 and the following regions 52 and 53 are selected from the viewpoint disclosed in Japanese Patent Application No. 2009-018706, and the entire contents of Japanese Patent Application No. 2009-018706 are incorporated herein by reference.

Figure 9A:
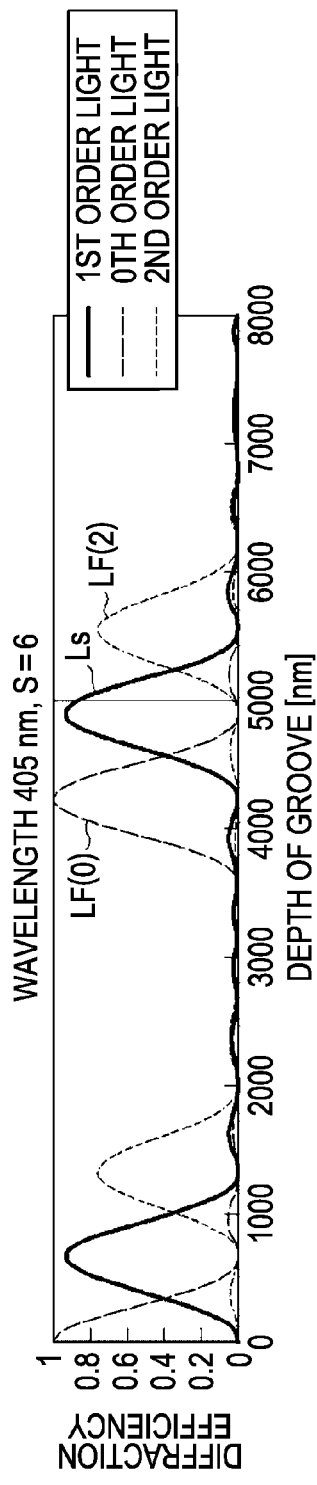
FIGS. 9A to 9C are graphs for calculating the diffraction efficiencies of exemplary configurations of the inner orbicular zone, and diagrams illustrating the change in diffraction efficiency of each wavelength relative to the change in the groove depth d in a case where S=6, and (k1$i$, k2$i$, k3$i$)=(+1, −2, −3)
Figure 9B:
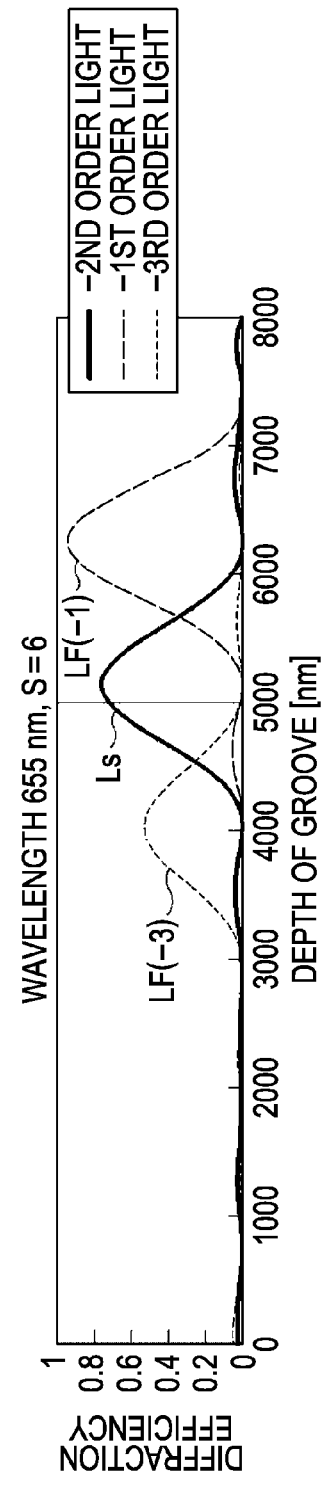
Figure 9C:
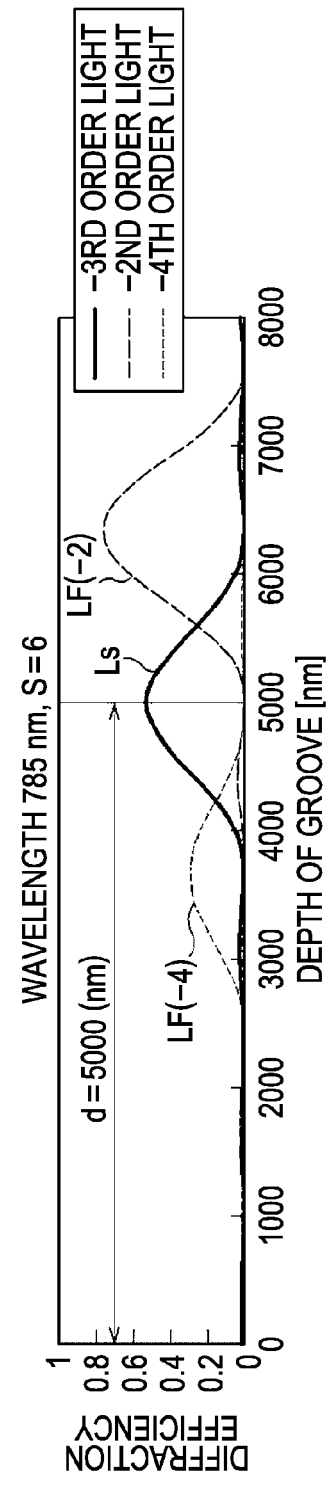

As the exemplary configurations of the inner orbicular zone, FIGS. 9A to 9C shows, in detail, the change in diffraction efficiency of each wavelength depending on the groove depth d in a case where (k1i, k2i, k3i)=(+1, −2, −3) in the multi-step shape having the number of steps S of 6. In FIG. 9A, the change in diffraction efficiency of the +1st order diffracted light of the light beam with the first wavelength is indicated by LS, and the changes in diffraction efficiencies of the 0th order light and the +2nd order diffracted light having adjacent orders are indicated by LF (0) and LF (2). In FIG. 9B, the change in diffraction efficiency of the −2nd order diffracted light of the light beam with the second wavelength is indicated by LS, and the changes in diffraction efficiencies of the −1st order diffracted light and the −3rd order diffracted light having adjacent orders are indicated by LF (−1) and LF (−3). In FIG. 9C, the change in diffraction efficiency of the −3rd order diffracted light of the light beam with the third wavelength is indicated by LS, and the changes in diffraction efficiencies of the −2nd order diffracted light and the −4th order diffracted light having adjacent orders are indicated by LF (−2) and LF (−4). In FIGS. 9A to 9C, the horizontal axis represents the groove depth in nm, and the vertical axis represents the diffraction efficiency (intensity of light). In addition, when the diffraction efficiency of k1$i$ is eff1, the diffraction efficiency of k2$i$ is eff2, and the diffraction efficiency of k3$i$ is eff3, the diffraction efficiencies are sufficient at the position of groove depth d=5000 (nm) on the horizontal axis. Specifically, when eff1 is equal to 0.92 as shown in FIG. 9A, eff2 is equal to 0.68 as shown in FIG. 9B, and eff3 is equal to 0.52 as shown in FIG. 9C, the diffraction efficiencies are sufficient. As shown in FIGS. 9A to 9C, the relationship between the diffraction efficiency and the groove depth also depends on the number of steps, and thus it is necessary to select the appropriate number of steps, but here the number of steps S is set to 6 as described above. In addition, here, by additionally providing minute steps, it is possible to slightly change characteristics without having an adverse effect on the overall characteristics. Specifically, the configuration may be made in which the minute steps are additionally provided in the diffraction structure formed with the predetermined depth and the predetermined number of steps S so as to improve the diffraction efficiencies of the selected diffraction orders of the light beams with the respective wavelengths. Here, when the level difference of the single step as a reference is more than a half of the average level difference, this has an effect on the overall characteristics. Further, the combinations of the selected orders satisfy the following relation: $(\lambda 1 \times k1i - \lambda 2 \times k2i)/(t1-t2) \cong (\lambda 1 \times k1i - \lambda 3 \times k3i)/(t1-t3)$. Thus, it is possible to sufficiently reduce spherical aberration. Here, $\lambda 1$ is defined as the first wavelength (nm), $\lambda 2$ is defined as the second wavelength (nm), and $\lambda 3$ is defined as the third wavelength (nm). Further, t1 is defined as the thickness (mm) of the first protective layer of the first optical disc, t2 is defined as the thickness (mm) of the second protective layer of the second optical disc, and t3 is defined as the thickness (mm) of the third protective layer of the third optical disc.

In the second region 52 as the intermediate orbicular zone, the second diffraction structure, which has the orbicular zone shape, has a predetermined depth, and is different from the first diffraction structure, is formed. The second region 52 is configured to diffract light so that the diffracted light with the diffraction order, which is collected through the objective lens 34 to form an appropriate spot on the signal recording surface of the first optical disc, of the light beam with the first wavelength transmitted therethrough is dominant. Consequently, the second region 52 makes the diffraction order have the maximum diffraction efficiency relative to the diffracted light with other diffraction orders.

Further, by using the second diffraction structure, the second region 52 is configured to diffract light so that the diffracted light with the diffraction order, which is collected through the objective lens 34 to form an appropriate spot on the signal recording surface of the second optical disc, of the light beam with the second wavelength transmitted therethrough is dominant. Consequently, the second region 52 makes the diffraction order have the maximum diffraction efficiency relative to the diffracted light with other diffraction orders.

Further, by using the second diffraction structure, the second region 52 is configured to diffract light so that the diffracted light with the diffraction order other than the diffracted light with the diffraction order, which is collected through the objective lens 34 to form an appropriate spot on the signal recording surface of the third optical disc, of the light beam with the third wavelength transmitted therethrough is dominant. Specifically, the second region 52 makes the diffracted light with the diffraction order have the maximum diffraction efficiency relative to the diffracted light with other diffraction orders. In other words, by using the second diffraction structure, the second region 52 is configured so that the diffracted light with the diffraction order, which does not form an appropriate spot on the signal recording surface of the third optical disc through the objective lens 34, of the light beam with the third wavelength transmitted therethrough is dominant. Here, the second diffraction structure is configured in consideration of the effects of flaring and the like. Further, by using the second diffraction structure, the second region 52 is able to reduce the diffraction efficiency of the diffracted light with the diffraction order, which is collected through the objective lens 34 to form an appropriate spot on the signal recording surface of the third optical disc, of the light beam with the third wavelength transmitted therethrough. Here, "flaring" means that the position, on which an image of the predetermined wavelength light beam with the diffraction order is formed through the objective lens 34, is deviated from the signal recording surface of the corresponding optical disc, thereby reducing the light amount of the light beam practically collected on the signal recording surface.

As described above, the second region 52 has a diffraction structure that is suitable for the diffracted light with the above-mentioned predetermined diffraction order to be dominant to the light beams of the respective wavelengths. Hence, it is possible to correct and reduce spherical aberration caused when the light beams with the first and second wavelengths, which are transmitted through the second region 52 and are changed into the diffracted light with the predetermined diffraction order, are collected by the objective lens 34 on the signal recording surfaces of the respective optical discs.

Further, the second region 52 functions as described above for the light beams with the first and second wavelengths. In addition, for the light beam with the third wavelength, the second region 52 is configured, in consideration of the effects of flaring, so that the diffracted light with the diffraction order, which is transmitted through the second region 52 and is not collected on the signal recording surface of the third optical disc through the objective lens 34, is dominant. With such a configuration, in the second region 52, the light beam with the third wavelength transmitted through the second region 52 has almost no effect on the signal recording surface of the third optical disc even when being incident to the objective lens 34. In other words, the second region 52 is able to function to perform the aperture restriction for the light beam with the third wavelength by significantly reducing a light amount of the light beam with the third wavelength, which is transmitted through the second region 52 and collected on the signal recording surface by the objective lens 34, up to approximately zero.

However, the above-mentioned first region 51 is formed to have a size equal to the size capable of making the light beam with the third wavelength transmitted through the area be incident to the objective lens 34 in the same state as the beam restricted by NA of around 0.45. Further, the second region 52 formed outside the first region 51 is configured not to collect the light beam with the third wavelength transmitted through the area on the third optical disc through the objective lens 34. Hence, the diffractive portion 50 having the first and second diffraction regions 51 and 52 functions so as to perform the aperture restriction on the light beam with the third wavelength by NA of around 0.45. Here, the diffractive portion 50 is configured so that the aperture restriction is performed on the light beam with the third wavelength by numerical aperture NA of around 0.45, but the numerical aperture restricted by the above-mentioned configuration is not limited to this.

Specifically, the second region 52 is, as shown in FIGS. 4A, 4B, and FIG. 10A, formed in the orbicular zone shape centered on the optical axis. In the sectional shape of the orbicular zone, the multi-step shapes having the predetermined number of steps S and the predetermined depth d (hereinafter referred to as a "groove depth") are successively formed on the reference surface in the radial direction. Further, the second region 52 is different from the first region 51 in the numerical values of d and/or S. Therefore, the second region 52 has a second diffraction structure different from the first diffraction structure provided on the first region 51. For example, the diffraction structure of the second region 52 shown in FIG. 10A is a diffraction structure in which the number of steps is 2 (S=2) and the steps have the substantially equivalent depths (d/2). The multi-step portions, which include first to second steps 52$s$1 and 52$s$2, are formed successively in the radial direction. Further, the multi-step portions are formed to include the first to third diffraction surfaces 52/1, 52/2, and 52/3 formed to have the equivalent spaces (d/3) in the direction of the optical axis. Further, the second region as an intermediate orbicular zone may be configured so that the diffraction structure is formed in a non-periodic shape in which non-periodic structures for applying a desirable phase difference are arranged in the radial direction of the orbicular zones.

Further, the second region 52 diffracts the light beam with the first wavelength which is transmitted therethrough so that diffracted light of the k1$m$-th order is dominant, that is, so that the diffraction efficiency thereof is maximum. Further, the second region 52 diffracts the light beam with the second wavelength which is transmitted therethrough so that diffracted light of the k2$m$-th order is dominant, that is, so that the diffraction efficiency thereof is maximum. Furthermore, the second region 52 diffracts the light beam with third wavelength which is transmitted therethrough so that diffracted light of the k3$m$-th order is dominant. In this case, the second region 52 is configured to have the following relationships: for example, (k1$m$, k2$m$)=(0, −1). Further, in the second region 52, the combinations of the diffraction orders are selected from the viewpoint of aperture restriction for the third wavelength, flaring, fitness to the diffraction orders in the inner orbicular zone, and advantages in manufacturing. Further, the combinations of the orders are not limited to this, but may be the following combinations: for example, (k1$m$, k2$m$)=(0, −2), (1, 0), (1, −1). In addition, other different combinations may be allowed.

As the exemplary configurations of the intermediate orbicular zone, specifically, the diffraction structure is formed in a multi-step shape having the number of steps S of 2 and the groove depth of 1500 nm. In this case, when (k1$m$, k2$m$)=(0, −1), the eff1 is 1.00, and the eff2 is 0.59. There is no problem in the diffraction efficiency due to the effects of flaring at the third wavelength. The flaring means deviation, which is caused by adjusting the slope of the design line calculated by the expression: $(t1-t2)/(\lambda 1 \times k1m - \lambda 2 \times k2m)$, from the state in which the diffracted light of the corresponding diffraction order of the light beam with the third wavelength is focused on the signal recording surface of the third optical disc. For detailed description of the flaring, the entire contents of Japanese Patent Application No. 2008-196640 are incorporated herein by reference. With such a configuration, it is possible to achieve appropriate aperture restriction (NA=0.45) at the third wavelength.

In the third region 53 as the outer orbicular zone, the third diffraction structure, which has the orbicular zone shape, has a predetermined depth, and is different from the first and second diffraction structures, is formed. The third region 53 is configured to diffract light so that the diffracted light with the diffraction order, which is collected through the objective lens 34 to form an appropriate spot on the signal recording surface of the first optical disc, of the light beam with the first wavelength transmitted therethrough is dominant. That is, the third region 53 makes the diffraction order have the maximum diffraction efficiency relative to the diffracted light with other diffraction orders. Consequently, the third region 53 as the outer orbicular zone collects the light beam with the first wavelength transmitted therethrough on the signal recording surface of the first optical disc through the objective lens 34.

Further, by using the third diffraction structure, the third region 53 is configured to diffract light so that the diffracted light with the diffraction order other than the diffracted light with the diffraction order, which is collected through the objective lens 34 to form an appropriate spot on the signal recording surface of the second optical disc, of the light beam with the second wavelength transmitted therethrough is dominant. Specifically, the third region 53 makes the diffraction order have the maximum diffraction efficiency relative to the diffracted light with other diffraction orders. In other words, by using the third diffraction structure, the third region 53 is configured so that the diffracted light with the diffraction order, which does not form an appropriate spot on the signal recording surface of the second optical disc through the objective lens 34, of the light beam with the second wavelength transmitted therethrough is dominant. Here, the third diffraction structure is configured in consideration of the effects of flaring and the like. Further, by using the third diffraction structure, the third region 53 is able to reduce the diffraction efficiency of the diffracted light with the diffraction order, which is collected through the objective lens 34 to form an appropriate spot on the signal recording surface of the second optical disc, of the light beam with the second wavelength transmitted therethrough. Consequently, the third region 53 as the outer orbicular zone does not collect the light beam with the second wavelength transmitted therethrough on the signal recording surface of the second optical disc through the objective lens 34.

Further, by using the third diffraction structure, the third region 53 is configured to diffract light so that the diffracted light with the diffraction order other than the diffracted light with the diffraction order, which is collected through the objective lens 34 to form an appropriate spot on the signal recording surface of the third optical disc, of the light beam with the third wavelength transmitted therethrough is dominant. Specifically, the third region 53 makes the diffraction order have the maximum diffraction efficiency relative to the diffracted light with other diffraction orders. In other words, by using the third diffraction structure, the third region 53 is configured so that the diffracted light with the diffraction order, which does not form an appropriate spot on the signal recording surface of the third optical disc through the objective lens 34, of the light beam with the third wavelength transmitted therethrough is dominant. Here, the third diffraction structure is configured in consideration of the effects of flaring and the like. Further, by using the third diffraction structure, the third region 53 is able to reduce the diffraction efficiency of the diffracted light with the diffraction order, which is collected through the objective lens 34 to form an appropriate spot on the signal recording surface of the third optical disc, of the light beam with the third wavelength transmitted therethrough. Consequently, the third region 53 as the outer orbicular zone does not collect the light beam with the third wavelength transmitted therethrough on the signal recording surface of the third optical disc through the objective lens 34.

As described above, the third region 53 has a diffraction structure that is suitable for the diffracted light with the above-mentioned predetermined diffraction order to be dominant to the light beams of the respective wavelengths. Hence, it is possible to correct and reduce spherical aberration caused when the light beam with the first wavelength, which is transmitted through the third region 53 and is changed into the diffracted light with the predetermined diffraction order, is collected by the objective lens 34 on the signal recording surfaces of the respective optical discs.

Further, the third region 53 functions as described above for the light beam with the first wavelength. In addition, for the light beams with the second and third wavelengths, the third region 53 is configured so that the diffracted light with the diffraction order, which is transmitted through the third region 53 and is not collected on the signal recording surface of the second and third optical discs through the objective lens 34, is dominant. At this time, the third region 53 is configured in consideration of the effects of flaring. With such a configuration, in the third region 53, the light beams with the second and third wavelengths transmitted through the third region 53 have almost no effect on the signal recording surfaces of the second and third optical discs even when being incident to the objective lens 34. Consequently, the third region 53 is able to function to perform the aperture restriction for the light beam with the second wavelength by significantly reducing the light amount of the light beams with the second and third wavelengths, which are transmitted through the third region 53 and collected on the signal recording surface by the objective lens 34, up to approximately zero. Further, the third region 53 is able to function to perform the aperture restriction for the light beam with the third wavelength together with the above-mentioned second region 52.

However, the above-mentioned second region 52 is formed to have a size equal to the size capable of making the light beam with the second wavelength transmitted through the area be incident to the objective lens 34 in the same state as the beam restricted by NA of around 0.6. Further, the third region 53 formed outside the second region 52 is configured not to collect the light beam with the second wavelength transmitted through the area on the third optical disc through the objective lens 34. Hence, the diffractive portion 50 having the second and third diffraction regions 52 and 53 functions so as to perform the aperture restriction on the light beam with the second wavelength by NA of around 0.6. Here, the diffractive portion 50 is configured so that the aperture restriction is performed on the light beam with the second wavelength by numerical aperture NA of around 0.6, but the numerical aperture restricted by the above-mentioned configuration is not limited to this.

Further, the third region 53 is formed to allow the light beam with the first wavelength, which is transmitted through the area, to have a size restricted by NA of around 0.85. Since the diffraction structure is not formed outside the third region 53, the light beam with the first wavelength transmitted through the area is not collected on the first optical disc through the objective lens 34. Hence, the diffractive portion 50 having the third region 53 functions so as to perform the aperture restriction on the light beam with the first wavelength by NA of around 0.85. Furthermore, in the light beam with the first wavelength transmitted through the third region 53, for example, 2nd order light is dominant. Hence, the 0th order light transmitted through the area outside the third region 53 is mostly not collected on the first optical disc through the objective lens 34. Here, when the 0th order light is collected on the first optical disc through the objective lens 34, the aperture restriction may be performed by providing a blocking portion for blocking the transmitted light beams in the area outside the third region 53. Further, the aperture restriction may be performed by providing, instead of the blocking portion, a diffraction region having a diffraction structure in which the light beam with the diffraction order other than the diffraction order of the transmitted light beam collected on the first optical disc through the objective lens 34 is dominant. Here, the diffractive portion 50 is configured so that the aperture restriction is performed on the light beam with the first wavelength by numerical aperture NA of around 0.85, but the numerical aperture restricted by the above-mentioned configuration is not limited to this.

Figure 5A:
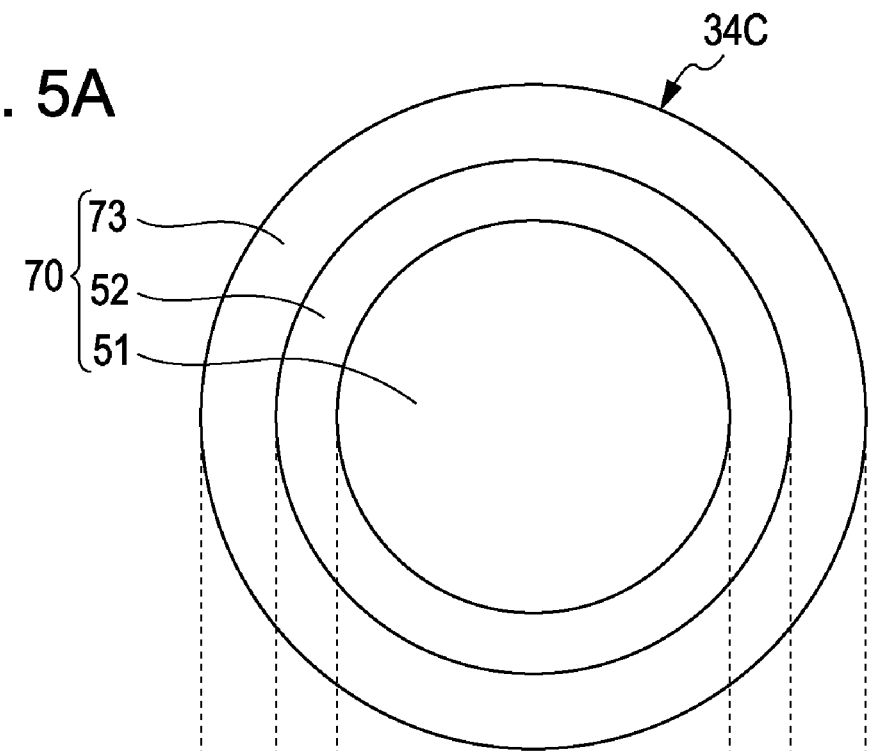
FIGS. 5A and 5B are diagrams illustrating another example of the objective lens constituting the optical pickup shown in FIG. 2 and having an exemplary configuration in which the outer orbicular zone thereof is formed as a continuous aspheric surface, where
Figure 5B:
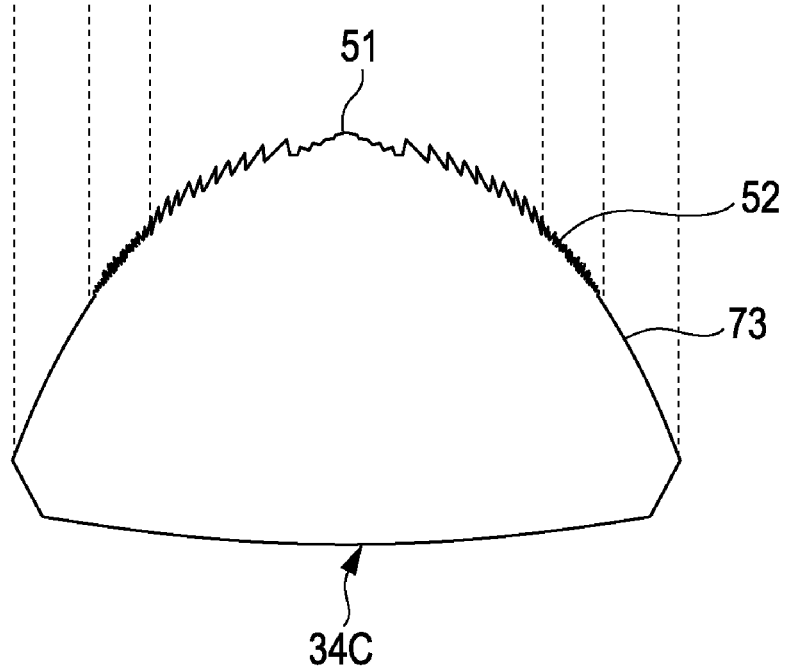

Specifically, the third region 53 is, as shown in FIGS. 5A, 5B, and 10B, formed in the orbicular zone shape centered on the optical axis. The sectional shape of the orbicular zone is formed as a blaze shape having the predetermined depth d on the reference surface.

In the third region 53 as the outer orbicular zone, the blazed structure is employed as described above. The reason is that, in the outer orbicular zone provided on the outermost side, the curved lens surface has the highest curvature, and thus from the viewpoint of manufacture, it is disadvantageous to provide a structure other than a blaze structure. Further, it is not necessary to consider the problems of the unwanted light, the efficiency, and the like as described above, and thus it is possible to obtain a sufficient performance with the blazed structure. Further, the third region 53 may be formed by the step structure having the multi-step shape, but when considering the above-mentioned advantages of the blaze, the blazed structure is better.

As the exemplary configurations of the outer orbicular zone, specifically, the diffraction structure is formed in a blaze shape (S=∞) having the number of steps S of 2 and the groove depth of 1450 nm. In this case, when k1$o$=2, the eff1 is 1.00. There is no problem in the diffraction efficiency due to the effects of flaring at the second and third wavelengths. With such a configuration, it is possible to achieve appropriate aperture restriction (NA=0.6) at the second wavelength, and it is possible to achieve appropriate aperture restriction (NA=0.45) at the third wavelength.

The diffractive portion 50 having the first to third diffraction regions 51, 52, and 53 configured as described above has the predetermined effects on the light beams with the respective wavelengths transmitted through the respective regions. The diffractive portion 50 diffracts the light beams with the first to third wavelengths transmitted through the first region 51 by a diffractive power that makes the beams be in a divergent angle state in which spherical aberration is not caused on the signal recording surfaces of the optical discs of the corresponding types by the refractive power of the objective lens 34 common to three wavelengths. In addition, the diffractive portion 50 is able to collect the appropriate spot on the signal recording surfaces of the corresponding optical discs by the refractive power of the objective lens 34. Furthermore, the diffractive portion 50 diffracts the light beams with the first and second wavelengths transmitted through the second region 52 by a diffractive power that makes the beams be in the divergent angle state in which spherical aberration is not caused on the signal recording surfaces of the optical discs of the corresponding types by the refractive power of the common objective lens 34. In addition, the diffractive portion 50 is able to collect light in the appropriate spot on the signal recording surfaces of the corresponding optical discs by the refractive power of the objective lens 34. Further, the diffractive portion 50 diffracts the light beam with the first wavelength transmitted through the third region 53 by a diffractive power that makes the beams be in the divergent angle state in which spherical aberration is not caused on the signal recording surfaces of the optical discs of the corresponding types by the refractive power of the common objective lens 34. In addition, the diffractive portion 50 is able to collect light in the appropriate spot on the signal recording surfaces of the corresponding optical discs by the refractive power of the objective lens 34. Here, "the divergent angle state in which spherical aberration is not caused" includes the divergent state, the convergent state, and the parallel light state, and means a state in which spherical aberration is corrected by the refractive power of the curved surface of the lens.

That is, the diffractive portion 50, which is provided on one surface of the objective lens 34 disposed on the optical path between the first to third emission portions of the optical pickup 3 and the signal recording surface, has the following effects. The diffractive portion 50 is able to diffract light beams of respective wavelengths transmitted through the respective regions (the first to third regions 51, 52, and 53) so as to reduce spherical aberration caused on the signal recording surface. Thereby, the diffractive portion 50 is able to minimize spherical aberration caused on the signal recording surface when collecting light beams with the first to third wavelengths on the signal recording surface of the respective corresponding optical discs using the common objective lens 34 in the optical pickup 3. Consequently, the diffractive portion 50 is able to achieve three-wavelength compatibility of the optical pickup using three types of wavelengths for three types of optical discs and a common objective lens 34, thereby enabling recording and/or reproducing of information signals on the respective optical discs.

Further, the objective lens 34, which has the diffractive portion 50 formed of the above-mentioned first to third regions 51, 52, and 53, is configured so that the diffraction orders (k1$i$, k2$i$, k3$i$) of light selected by the first region 15 serving as the inner orbicular zone are set to (1, −2, −3). Accordingly, the objective lens 34 has a configuration advantageous in view of manufacture in that the lens is able to reduce spherical aberration and optimize the operation distance and the focal length. That is, the objective lens 34 is able to collect light beams with the respective wavelengths on the signal recording surfaces of the corresponding optical discs in a way that the diffracted light with the diffraction order capable of appropriately reducing spherical aberration is made to be dominant. Further, the objective lens 34 is able to prevent problems such as an increase in size and simplify the manufacturing process, and thus it is possible to set the diffraction efficiency of the selected diffraction order to be sufficiently high. Consequently, the objective lens 34 is able to achieve three-wavelength compatibility of the optical pickup using three types of wavelengths for three types of optical discs and a common objective lens 34, thereby enabling recording and/or reproducing of information signals on the respective optical discs. Further, also in the case where the objective lens 34 is configured so that (k1$i$, k2$i$, k3$i$) is set to (1,−1,−2), (0,−1,−2), (0,−2,−3), or (2,−1,−2), it is possible to obtain the same effect as the case of (1, −2, −3).

Further, in the objective lens 34, as shown in FIG. 8A, the first region 51 serving as the inner orbicular zone is configured to increase the efficiency of the third wavelength and reduce the unwanted light with the first wavelength in a way that blaze overlapping is applied to the multi-step diffraction structure. Thus, it is possible to achieve favorable recording reproducing characteristics regardless of the change in temperature and wavelength. Further, in the first region 51 serving as the inner orbicular zone, the multi-step diffraction structure as a target of the blaze overlapping is a diffraction structure in which the equivalent spaces are changed as shown in FIG. 8B, and thus it is possible to achieve favorable recording reproducing characteristics regardless of the change in temperature and wavelength. The reason is that the diffraction structure provided on the first region 51 is able to prevent the servo from becoming unstable by suppressing the occurrence of the unwanted diffracted light in the case of environmental change. Further, this point will be described in Section 5.

Further, the diffractive portion 50 having the first to third regions 51, 52, and 53 is able to perform the aperture restriction function by allowing the light beam with the third wavelength to pass through the second and third regions 52 and 53. The second and third regions 52 and 53 flare the diffracted light with the diffraction order having the maximum diffraction efficiency and predetermined diffraction efficiency, and thus deviates an imaging position from the signal recording surface. In such a manner, it is possible to reduce the diffraction efficiency of the diffracted light with the diffraction order. With such a configuration, only a part of the light beam, which is transmitted through the first region 51, of the light beam with the third wavelength is collected on the signal recording surface of the optical disc by the objective lens 34. In addition, the first region 51 is formed to have a size capable of satisfying a predetermined NA for transmitting the light beam with the third wavelength through the region. With such a configuration, it is possible to perform the aperture restriction so that the NA is, for example, around 0.45 relative to the light beam with the third wavelength.

Further, the diffractive portion 50 is able to perform the aperture restriction function by allowing the light beam with the second wavelength to pass through the third region 53. The third region 53 flares the diffracted light with the diffraction order having the maximum diffraction efficiency and predetermined diffraction efficiency, and thus deviates an imaging position from the signal recording surface. In such a manner, it is possible to reduce the diffraction efficiency of the diffracted light with the diffraction order. With such a configuration, only a part of the light beam, which is transmitted through the first and second regions 51 and 52, of the light beam with the second wavelength is collected on the signal recording surface of the optical disc by the objective lens 34. In addition, the first and second regions 51 and 52 are formed to have a size capable of satisfying a predetermined NA for transmitting the light beam with the second wavelength through the regions. With such a configuration, it is possible to perform the aperture restriction so that the NA is, for example, around 0.60 relative to the light beam with the second wavelength.

Further, the diffractive portion 50 is able to perform the aperture restriction function by allowing the light beam with the first wavelength, which is transmitted through the area outside the third region 53, not to be appropriately collected on the signal recording surface of the corresponding type optical disc by the objective lens 34, or by blocking the light beam. The diffractive portion 50 collects only a part of the light beam, which is transmitted through the first to third diffraction regions 51, 52, and 53, of the light beam with the first wavelength on the signal recording surface of the optical disc by the objective lens 34. In addition, the first to third regions 51, 52, and 53 are formed to have a size capable of satisfying a predetermined NA for transmitting the light beam with the first wavelength through the region. With such a configuration, it is possible to perform the aperture restriction so that the NA is, for example, around 0.85 for the light beam with the first wavelength.

As described above, the diffractive portion 50 provided on one surface of the objective lens 34 disposed in the above-mentioned optical path is able to not only achieve the three-wavelength compatibility but also achieve the aperture restriction function. Specifically, the diffractive portion 50 is able to allow the light beams with the respective wavelengths to be incident to the common objective lens 34 in a state where the aperture is restricted with the numerical apertures corresponding to the three types of the optical discs and the light beams with the first to third wavelengths. Consequently, the diffractive portion 50 has not only a function for correcting aberrations corresponding to the three wavelengths, but also a function as the aperture restriction section.

Further, the diffractive portion can be configured by appropriately combining examples of the above-mentioned diffraction regions. That is, the diffraction orders of the respective wavelengths of the light beams transmitted through the diffraction regions can be selected appropriately on the basis of the above description. Furthermore, in a case where the diffraction orders of the respective wavelengths of the light beams transmitted through the diffraction regions are changed, it is preferable that the objective lens 34 should have a curved lens surface corresponding to the diffraction orders of the respective wavelengths of the light beams transmitted through the respective regions.

Further, in the modified examples of the first to third regions 51, 52, 53 described above, the third region may be formed to have a continuous aspheric surface. That is, it may be possible to adopt a configuration in which, instead of the third region 53 having the predetermined diffraction structure, the predetermined continuous aspheric surface may appropriately perform the aperture restriction for the second and third wavelengths by collecting the light beam with the first wavelength on the optical disc.

4. Regarding Another Example of Objective Lens According to Embodiment of Invention Next, as another example of the objective lens used in the above-mentioned optical pickup 3 according to the embodiment of the invention, an exemplary configuration will be described with reference to FIGS. 5A and 5B in which the outer orbicular zone is formed as a continuous aspheric surface instead of the third region 53 of the above-mentioned diffractive portion 50. Specifically, with reference to FIGS. 5A and 5B, a description is given of a diffractive portion 70 having the third region 73, which is added to the first and second regions 51 and 52 and is formed as a continuous aspheric surface outside the second region 52, and an objective lens 34C having the diffractive portion 70. Further, the diffractive portion 70 has the same configuration as the above-mentioned diffractive portion 50 except that the third region 73 is provided on the portion corresponding to the third region 53 of the above-mentioned diffractive portion 50. Accordingly, In the case where common elements exist in the embodiments, those elements will be referenced by the same reference numerals and signs, and detailed description thereof will be omitted.

Similarly to the objective lens 34 having the diffractive portion 50, in the objective lens 34C having the diffractive portion 70, the diffractive portion 70 diffracts each of the light beams with the first to third wavelengths transmitted through each of a plurality of diffraction regions 51 and 52 being diffracted so as to have a predetermined order. Thereby, the light beams in a diffused state or a converged state having a predetermined divergent angle are incident to the objective lens 34C, and predetermined effects are given by the third region 73 described below. With such a configuration, the single objective lens 34C can be used to collect appropriately the light beams with the first to third wavelengths on the signal recording surfaces of the corresponding three type optical discs so as not to cause spherical aberration. The objective lens 34C having the diffractive portion 70 has a diffraction structure which generates diffraction power with a lens surface shape as reference. With such a configuration, the objective lens 34C functions as a light collecting optical device that appropriately collects the light beams with the three different wavelengths on the signal recording surfaces of the optical discs corresponding thereto without causing spherical aberration. Further, the objective lens 34C having the diffractive portion 70 has a function of a refraction element in combination with a function of a diffraction element. That is, the objective lens 34C has a refractive function resulting from a curved surface of the lens in combination with a diffractive function resulting from the diffractive portion 70 provided on one surface thereof.

Specifically, as shown in FIGS. 5A and 5B, the diffractive portion 70 provided on the incident side surface of the objective lens 34C has a first region (the inner orbicular zone) 51 which is provided in the innermost peripheral portion and is a diffraction region having a substantially circular shape. Further, the diffractive portion 70 is provided outside the first region 51, and has a second region (the intermediate orbicular zone) 52 which is a diffraction region having an orbicular zone shape. Further, the diffractive portion 70 is provided outside the second region 52, and has a third region (the outer orbicular zone) 73 which is a diffraction region having an orbicular zone shape.

The third region 73 as the outer orbicular zone is formed as an orbicular zone-shaped aspheric continuous surface having a predetermined refraction operation, and is configured to refract the light beam with the first wavelength transmitted therethrough so as to collect and form an appropriate spot on the signal recording surface of the first optical disc.

Further, the third region 73 refracts the light beam with the second wavelength transmitted therethrough by using the aspheric continuous surface so as not to form an appropriate spot on the signal recording surface of the second optical disc. That is, the third region 73 allows the light beam with the second wavelength not to be collected on the signal recording surface of the second optical disc. In other words, the third region 73 refracts the light beam with the second wavelength so that the light beam with the second wavelength is defocused from the signal recording surface of the second optical disc, that is, the light beam is collected at a position deviated therefrom, or the light beam is diverged not to be collected.

Further, the third region 73 refracts the light beam with the third wavelength transmitted therethrough by using the aspheric continuous surface so as not to form an appropriate spot on the signal recording surface of the third optical disc. That is, the third region 73 allows the light beam with the third wavelength not to be collected on the signal recording surface of the third optical disc. In other words, the third region 73 refracts the light beam with the third wavelength so that the light beam with the third wavelength is defocused from the signal recording surface of the third optical disc, that is, the light beam is collected at a position deviated therefrom, or the light beam is diverged not to be collected.

As described above, by forming the third region 73 as an aspheric continuous surface which provides the above-described operation, it is possible to correct and reduce spherical aberration caused when the light beam with the first wavelength transmitted through the third region 73 is collected on the signal recording surface of the first optical disc. Further, for the light beam with the second wavelength, the third region 73 is able to perform the aperture restriction function without collecting the light beam on the signal recording surface of the corresponding optical disc. Moreover, for the light beam with the third wavelength, the third region 73 is able to perform the aperture restriction function together with the above-described diffraction region 52 without collecting the light beam on the signal recording surface of the corresponding optical disc.

Here, the third region 73 is formed outside the second region 52 configured to perform aperture restriction on the light beam with the second wavelength with a numerical aperture NA of around 0.6. The third region 73 is formed to have a size equal to the size capable of making the light beam with the first wavelength transmitted through the area be incident to the objective lens 34C in the same state as the beam restricted by the numerical aperture NA of around 0.85. Further, in the region outside the third region 73, a blocking portion for blocking the light beam transmitted through is provided, thereby performing aperture restriction. Alternatively, a diffraction region is provided so that the light beam of the diffraction order other than the diffraction order of the light beam transmitted therethrough and collected on the first optical disc through the objective lens 34C is dominant, thereby performing aperture restriction. Alternatively, a refraction surface is provided so that the light beam with the first wavelength transmitted therethrough is not collected on the signal recording surface on the first optical disc, thereby performing aperture restriction. The numerical aperture restricted by the above-described configuration is not limited to this.

The diffractive portion 70 having the first and second regions 51 and 52 and the third region 73, which is formed in aspheric shape, as the diffraction regions configured as described above has the predetermined effects on the light beams with the respective wavelengths transmitted through the respective regions. The diffractive portion 70 diffracts the light beams with the first to third wavelengths transmitted through the first region 51 by a diffractive power that makes the beams be in a divergent angle state in which spherical aberration is not caused on the signal recording surfaces of the optical discs of the corresponding types by the refractive power of the objective lens 34C common to the three wavelengths. In addition, the diffractive portion 70 is able to collect the appropriate spot on the signal recording surfaces of the corresponding optical discs by the refractive power of the objective lens 34C. Furthermore, the diffractive portion 70 diffracts the light beams with the first and second wavelengths transmitted through the second region 52 by a diffractive power that makes the beams be in the divergent angle state in which spherical aberration is not caused on the signal recording surfaces of the optical discs of the corresponding types by the refractive power of the common objective lens 34C. In addition, the diffractive portion 70 is able to collect light in the appropriate spot on the signal recording surfaces of the corresponding optical discs by the refractive power of the objective lens 34C. Further, the diffractive portion 70 is able to collect appropriately the light beam with the first wavelength transmitted through the third region 73 so as to make the beams be in the divergent angle state in which spherical aberration is not caused on the signal recording surfaces of the optical discs of the corresponding types by the refractive power thereof.

That is, the diffractive portion 70, which is provided on one surface of the objective lens 34C disposed on the optical path between the first to third emission portions in the optical system of the optical pickup 3 and the signal recording surface, has the following effects. The diffractive portion 70 is able to diffract light beams of respective wavelengths transmitted through the respective regions (the first to third regions 51, 52, and 73) so as to reduce spherical aberration caused on the signal recording surface. Thereby, the diffractive portion 70 is able to minimize spherical aberration caused on the signal recording surface when collecting light beams with the first to third wavelengths on the signal recording surface of the respective corresponding optical discs using the common objective lens 34C in the optical pickup 3. Consequently, the diffractive portion 70 is able to achieve three-wavelength compatibility of the optical pickup using three types of wavelengths for three types of optical discs and a common objective lens 34C, thereby enabling appropriate recording and/or reproducing of information signals on the respective optical discs.

Further, the diffractive portion 70 provided on one surface of the objective lens 34C and the objective lens 34C having the diffractive portion 70 has the same functions and effects as the above-mentioned diffractive portion 50 and the objective lens 34 having the same, due to the functions of the first and second regions 51 and 52 and the function of the third region 73. That is, as shown in FIG. 8A, the first region 51 serving as the inner orbicular zone is configured to increase the efficiency of the third wavelength and reduce the unwanted light with the first wavelength in a way that blaze overlapping is applied to the multi-step diffraction structure. Thus, it is possible to achieve favorable recording reproducing characteristics regardless of the change in temperature and wavelength. Further, in the first region 51 serving as the inner orbicular zone, the multi-step diffraction structure as a target of the blaze overlapping is a diffraction structure in which the equivalent spaces are changed as shown in FIG. 8B, and thus it is possible to achieve favorable recording reproducing characteristics regardless of the change in temperature and wavelength. As described below in Section 5, the reason is that the diffraction structure provided on the first region 51 is able to prevent the servo from becoming unstable by suppressing the occurrence of the unwanted diffracted light in the case of environmental change.

5. Regarding Method of Preventing Unwanted Diffracted Light from Increasing due to Change in Temperature and Wavelength Regarding Problems The above-mentioned objective lenses 34 and 34C are three-wavelength compatible objective lenses which are able to achieve three-wavelength compatibility in a way that the diffraction orders of the inner orbicular zone and intermediate orbicular zone are appropriately set by dividing the diffraction region of the incident side surface into two or more. As described above, the inner orbicular zone having the diffraction structure in which for example (k1$i$, k2$i$, k3$i$)=(+1, −2, −3) has favorable characteristics even when the diffraction structure is formed in the so-called equidistant multi-step shape as shown in FIG. 8B. Hence, at room temperature, it is possible to exhibit the characteristics thereof sufficiently. However, the applicant found that, when the temperature is changed or the wavelength of laser oscillation is changed, a problem arises in that the diffraction efficiency of the light with the orders generated as the unwanted light increases. In addition, the increase in the unwanted diffracted light causes a problem in that, particularly in the double layer optical disc, the unwanted light has an effect on the focus signal, thereby making the servo unstable. Then, resulting from the state where the servo becomes unstable, there is a concern about deterioration in jitter in signal reading.

Regarding Unwanted Diffraction Order

The unwanted diffraction order is described in detail with reference to the case where $(k1i, k2i, k3i)=(+1, -2, -3)$. As described above, the diffraction structure in which $(k1i, k2i, k3i)=(+1, -2, -3)$ may be formed in the inner orbicular zone. In this case, if a certain refractive index is estimated, it is possible to select the equidistant multi-step diffraction structure having the number of steps and the height corresponding thereto. For example, a description is given of the condition in which the refractive index $n1(\lambda 1)=1.560$, $n2(\lambda 2)=1.541$, $n3(\lambda 3)=1.537$, $dn/dT=-9.0\times 10^{-5}$, $\lambda 1=405$ nm, $\lambda 2=660$ nm, and $\lambda 3=785$ nm. In such a condition, it is conceivable that there is an equidistant multi-step diffraction structure having 6 steps and 7 levels and having the equivalent space of around 5.0 µm. The relationship of the efficiency at the depth at this time is as described above in FIGS. 9A to 9C. FIGS. 9A to 9C show the diffraction efficiency of the diffracted light with the order selected as regular light as described above, and also shows the change in the diffraction efficiency of the unwanted adjacent light of the adjacent order of the corresponding regular order.

Here, studying the environmental change, it is assumed that the refractive index is lowered depending on the temperature rise. When the refractive index is lowered, the optical path difference with the air tends to decrease, and thus each groove depth of FIGS. 9A to 9C can be converted as if it is lowered. As a result, as shown in FIG. 9B, at the second wavelength $\lambda 2$ corresponding to the second optical disc (DVD), the efficiency of the −2nd order light of the regular light is lowered, while the efficiency of the −3rd order light of the unwanted light increases. Specifically, as can be seen from FIG. 9B, the efficiency may be better at a position slightly shifted leftward from the position of 5000 nm.

On the other hand, when the temperature is lowered, the refractive index increases, and thus the groove depth can be converted as if it increases. As a result, in the first optical disc (BD), the efficiency of the +1st order light which is the regular light is lowered, the efficiency of the +2nd order light which is the unwanted light increases.

Further, even in the change in wavelength, the same effect occurs. That is, when the wavelength is changed toward the long wavelength side, the groove depth at the corresponding wavelength decreases. Thus, in the second optical disc (DVD), the amount of the regular light decreases, and simultaneously the amount of the unwanted light increases. In contrast, in the first optical disc (BD), when it is changed toward the short wavelength side, the regular efficiency is lowered, and thus the efficiency of the unwanted light increases. The above-mentioned phenomenon occurs on the basis of the positional relationship between the groove depth and the peak position in the diffraction efficiency curve in a state where the order and groove depth are selected as described in FIGS. 9A to 9C. In the above-mentioned conditions, in the first optical disc (BD), the unwanted light becomes the maximum on the low-temperature short-wavelength side, and in the second optical disc (DVD), the unwanted light becomes the maximum on the high-temperature long-wavelength side.

Further, as shown in FIG. 9C, in the third optical disc (CD), the depth is positioned at the vertex of the groove-depth-efficiency graph. Hence, basically, there is a resistance to the change in wavelength and the change in temperature, and thus the rate of change thereof is the amount of change that is negligible as compared with the first and second optical disc (BD, and DVD).

In the above, the unwanted light due to the environmental change on the side in which it tends to occur is described, but actually the unwanted light may be generated even by the change in temperature and the change in wavelength on the side opposite thereto. That is, in the second optical disc (DVD), when the curve is biased to the low-temperature short-wavelength side, the −1st order light is generated, and acts as the unwanted adjacent light. Further, in the first optical disc (BD), when the curve is biased to the high-temperature long-wavelength side, the 0th order light is generated, and acts as the unwanted adjacent light. Hereinafter, this is referred to as "second unwanted light". Further, the above-mentioned unwanted light on the side in which it tends to occur is referred to as "first unwanted light".

Figure 11:
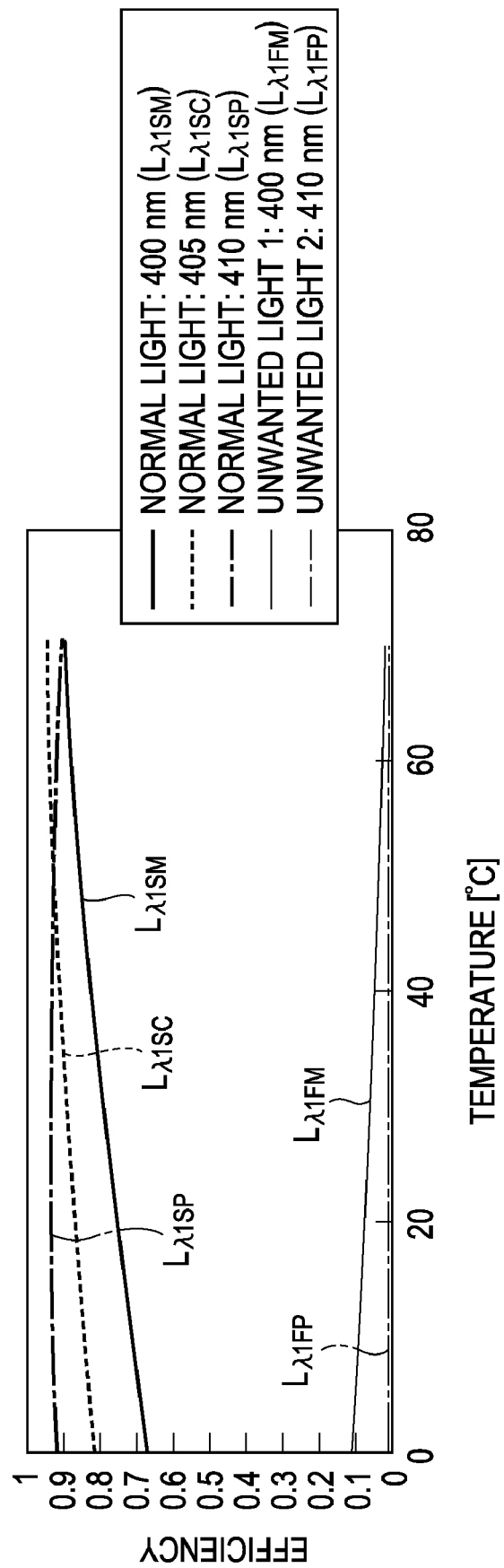
FIG. 11 is a diagram illustrating environmental change in efficiency of a first optical disc (BD), and illustrating change in light efficiency thereof caused by the change in temperature for each of predetermined wavelengths of regular light and unwanted light.
Figure 12:
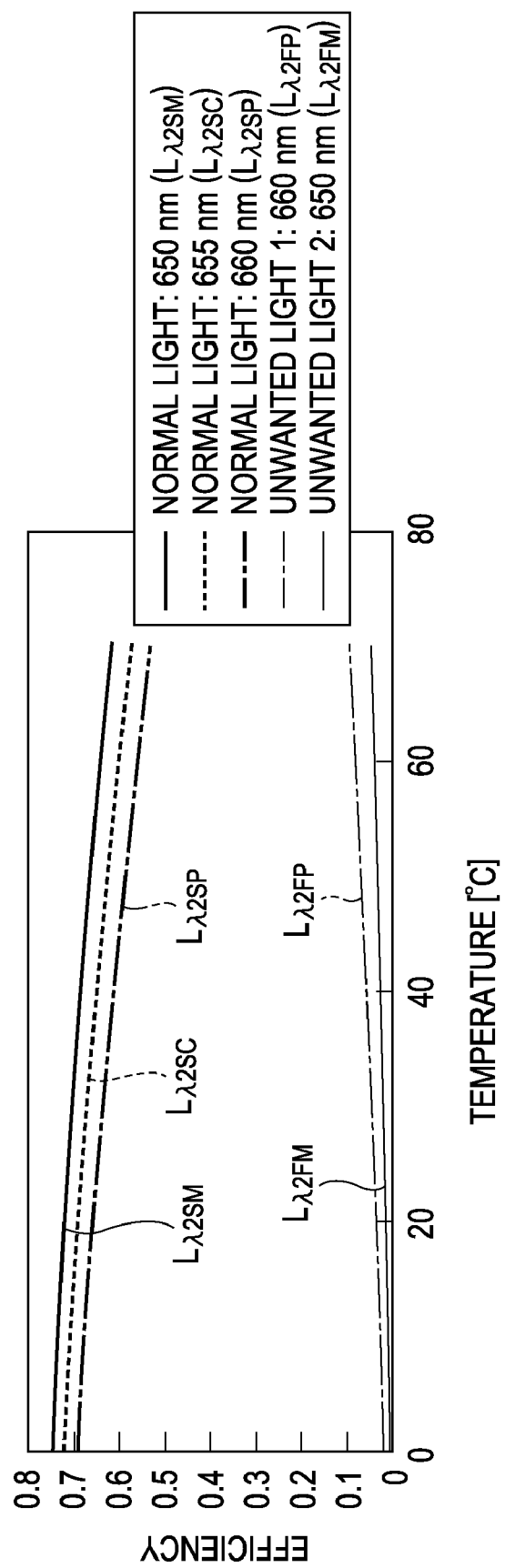
FIG. 12 is a diagram illustrating environmental change in efficiency of a second optical disc (DVD), and illustrating change in light efficiency thereof caused by the change in temperature for each of predetermined wavelengths of regular light and unwanted light.
Figure 13:
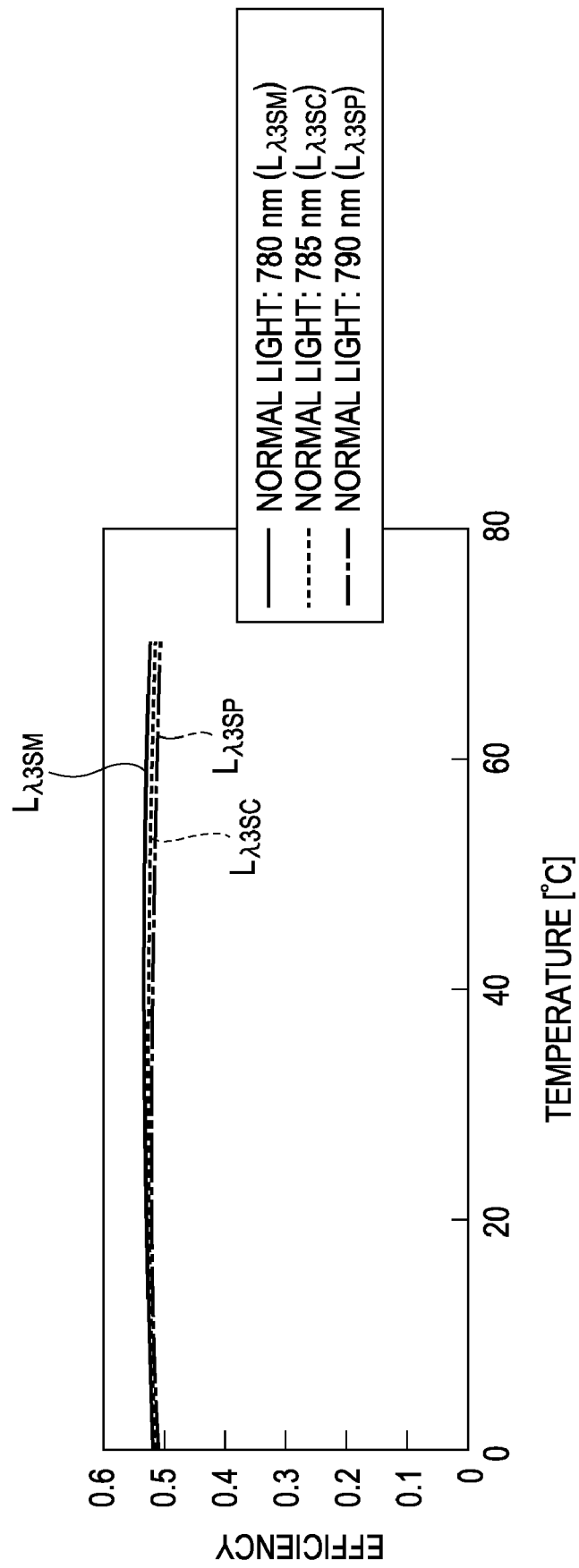
FIG. 13 is a diagram illustrating environmental change in efficiency of a third optical disc (CD), and illustrating change in light efficiency thereof caused by the change in temperature for each of predetermined wavelengths of regular light.

FIGS. 11 to 13 show the changes in efficiency depending on changes in wavelength and temperature. FIG. 11 shows the change in efficiency due to the environmental change (referred to as the "environmental change in efficiency") in the first optical disc (BD). FIG. 12 shows the environmental change in efficiency in the second optical disc (DVD). FIG. 13 shows the environmental change in efficiency in the third optical disc (CD). In FIGS. 11 to 13, all of the second unwanted light have small values. The reason is that the change in efficiency of the original signal depending on the temperature is asymmetric to the center temperature. Accordingly, when the later-described optimization is performed, the value thereof is important. Further, in the third optical disc (CD), the unwanted light is no problem, and thus the unwanted light is not plotted. Further, in this plot, the amounts of changes in temperature and wavelength of LD are also considered.

In FIG. 11, the $L_{\lambda 1SC}$ is the line representing the change in efficiency caused by the change in temperature of light with a wavelength of 405 nm which is the center wavelength of the regular light with the first wavelength $\lambda 1$ corresponding to the first optical disc. Here, the regular light means the diffracted light with the order (for example, $k1i$) selected when the diffraction structure is formed. The $L_{\lambda 1SM}$ is the line representing the change in efficiency caused by the change in temperature of light with a wavelength of 400 nm as the condition of the shorter wavelength than the center wavelength of the regular light with the first wavelength $\lambda 1$. The $L_{\lambda 1SP}$ is the line representing the change in efficiency caused by the change in temperature of light with a wavelength of 410 nm as the condition of the longer wavelength than the center wavelength of the regular light with the first wavelength $\lambda 1$. Further, the $L_{\lambda 1FM}$ and the $L_{\lambda 1FP}$ indicates the first unwanted light and the second unwanted light respectively, and are the lines representing the changes in efficiencies caused by the changes in temperatures of light with wavelengths of 400 nm and 410 nm of the unwanted light with the first wavelength $\lambda 1$. Further, here the amount of change in laser wavelength caused by the change in temperature is also included in the axis of temperature.

Further, in FIG. 12, the $L_{\lambda 2SC}$ is the line representing the change in efficiency caused by the change in temperature of light with a wavelength of 655 nm which is the center wavelength of the regular light with the second wavelength $\lambda 2$ corresponding to the second optical disc. The $L_{\lambda 2SM}$ and the $L_{\lambda 2SP}$ are the lines respectively representing the changes in efficiencies caused by the changes in temperatures of light with wavelengths of 650 nm and 660 nm as the conditions of the shorter wavelength and the longer wavelength than the center wavelength of the regular light with the second wavelength λ2. Further, the $L_{\lambda 2FP}$ and the $L_{\lambda 2FM}$ are the lines indicating the first unwanted light and the second unwanted light respectively, and are the lines representing the changes in efficiencies caused by the changes in temperatures of light with wavelengths of 660 nm and 650 nm of the unwanted light with the second wavelength λ2.

Further, in FIG. 13, the $L_{\lambda 3SC}$ is the line representing the change in efficiency caused by the change in temperature of light with a wavelength of 785 nm which is the center wavelength of the regular light with the third wavelength λ3 corresponding to the third optical disc. The $L_{\lambda 3SM}$ and the $L_{\lambda 3SP}$ are the lines respectively representing the changes in efficiencies caused by the changes in temperatures of light with wavelengths of 780 nm and 790 nm as the conditions of the shorter wavelength and the longer wavelength than the center wavelength of the regular light with the third wavelength λ3.

As can be seen from the above description in FIGS. 11 to 13, the efficiency of the light (hereinafter just referred to as the "unwanted light") of the diffraction order adjacent to the regular light increases depending on the temperature and the initial wavelength of the laser. Further, the unwanted light means the light with the diffraction order on the side in which the diffraction order, which is more likely to have an adverse effect, among the adjacent diffraction orders, that is, the diffraction efficiency increases.

Figure 14:
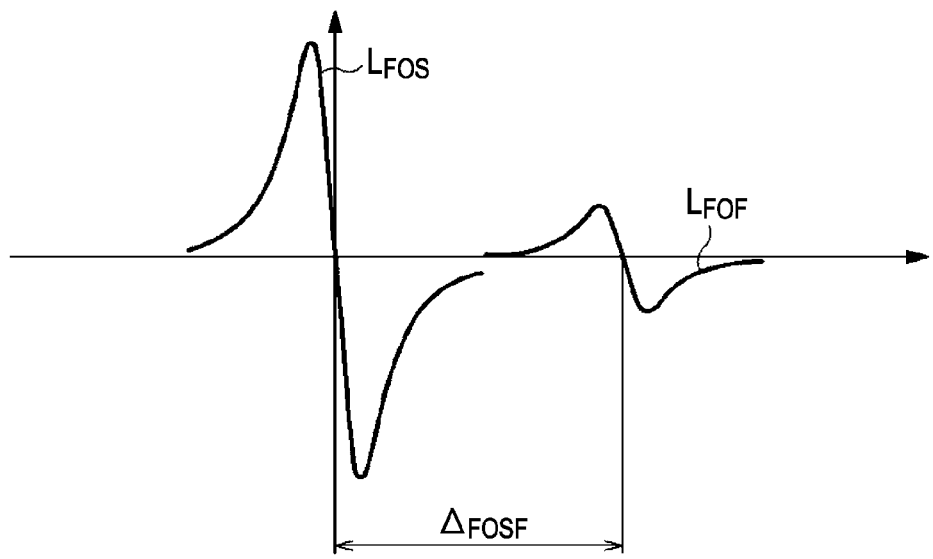
FIG. 14 is a diagram illustrating an effect on a focus error signal affected by change in efficiency of the unwanted diffracted light relative to the environmental change, and illustrating a focus search waveform (a single layer)

Focus Error Signal pickup equipped with the above-mentioned objective lens, the focus error signal at that time has the shape schematically shown in FIG. 14. FIG. 14 shows the focus search waveform of the regular signal and the unwanted signal. Further, in FIG. 14, the $L_{FOS}$ indicates the regular signal of the focus error signal that can be acquired from the unwanted light, and the $L_{FOF}$ indicates the unwanted signal of the focus error signal formed by the unwanted diffracted light. Further, the $\Delta_{FOSF}$ indicates the space between the center of the regular signal and the center of the unwanted signal.

Here, the regular signal indicated by $L_{FOS}$ in FIG. 14 is formed by the sum of the regular diffraction orders of the outgoing and returning light beams of the respective orbicular zones from the inner orbicular zone to outer orbicular zone. On the other hand, the unwanted signal is formed by combination between the above-mentioned unwanted diffraction order and the regular diffraction order of the outgoing and returning light beams in the inner orbicular zone. Table 1 shows the relationship between the regular light and the unwanted light and the relationship between the regular signal and the unwanted signal when the signals are formed by appropriately selecting the intermediate orbicular zone and the outer orbicular zone. The focus error signal is likely to cause a problem in the double layer optical disc shown in Table 1.

TABLE 1

|  |  | OUTGOING PATH | | RETURNING PATH | |
| --- | --- | --- | --- | --- | --- |
|  |  | ORBICULAR ZONE | DIFFRACTION ORDER | ORBICULAR ZONE | DIFFRACTION ORDER |
| FIRST OPTICAL DISC (BD) | REGULAR SIGNAL (SUM) | INNER ORBICULAR ZONE | 1 | INNER ORBICULAR ZONE | 1 |
|  |  | INTERMEDIATE ORBICULAR ZONE | 0 | INTERMEDIATE ORBICULAR ZONE | 0 |
|  |  | OUTER ORBICULAR ZONE | 2 | OUTER ORBICULAR ZONE | 2 |
|  | UNWANTED SIGNAL (SUM) | INNER ORBICULAR ZONE | 1 | INNER ORBICULAR ZONE | 2 |
|  |  | INNER ORBICULAR ZONE | 2 | INNER ORBICULAR ZONE | 1 |
| SECOND OPTICAL DISC (DVD) | REGULAR SIGNAL (SUM) | INNER ORBICULAR ZONE | -2 | INNER ORBICULAR ZONE | -2 |
|  |  | INTERMEDIATE ORBICULAR ZONE | -1 | INTERMEDIATE ORBICULAR ZONE | -1 |
|  | UNWANTED SIGNAL (SUM) | INNER ORBICULAR ZONE | -2 | INNER ORBICULAR ZONE | -3 |
|  |  | INNER ORBICULAR ZONE | -3 | INNER ORBICULAR ZONE | -2 |
| THIRD OPTICAL DISC (CD) | REGULAR SIGNAL | INNER ORBICULAR ZONE | -3 | INNER ORBICULAR ZONE | -3 |
|  | UNWANTED SIGNAL (SUM) | INNER ORBICULAR ZONE | -2 | INNER ORBICULAR ZONE | -3 |
|  |  | INNER ORBICULAR ZONE | -3 | INNER ORBICULAR ZONE | -2 |

Next, it will be considered what effect the change in efficiency of the unwanted diffracted light due to the environmental change has on the focus error signal. When the focus servo is performed on an optical disc by using the optical Here, Table 1 is supplemented with a description. The regular signal (sum) shown in Table 1 represents the regular signal that can be obtained from the sum of the regular light of the inner orbicular zone, the regular light of the intermediate orbicular zone, and the regular light of the outer orbicular zone. Here, the regular light of the inner orbicular zone is defined as the combination between the +1st order light formed as regular light in the outgoing path of the inner orbicular zone and the +1st order light formed as regular light in the returning path thereof. Further, the definition is similarly applied to the intermediate orbicular zone and the outer orbicular zone.

Further, the unwanted signal of Table 1 is defined as the combination between the +1st order light formed as regular light in the outgoing path and the +2nd order light formed as unwanted light in the returning path and the combination between the +2nd order light formed as unwanted light in the outgoing path and the +1st order light formed as regular light in the returning path.

Figure 15:
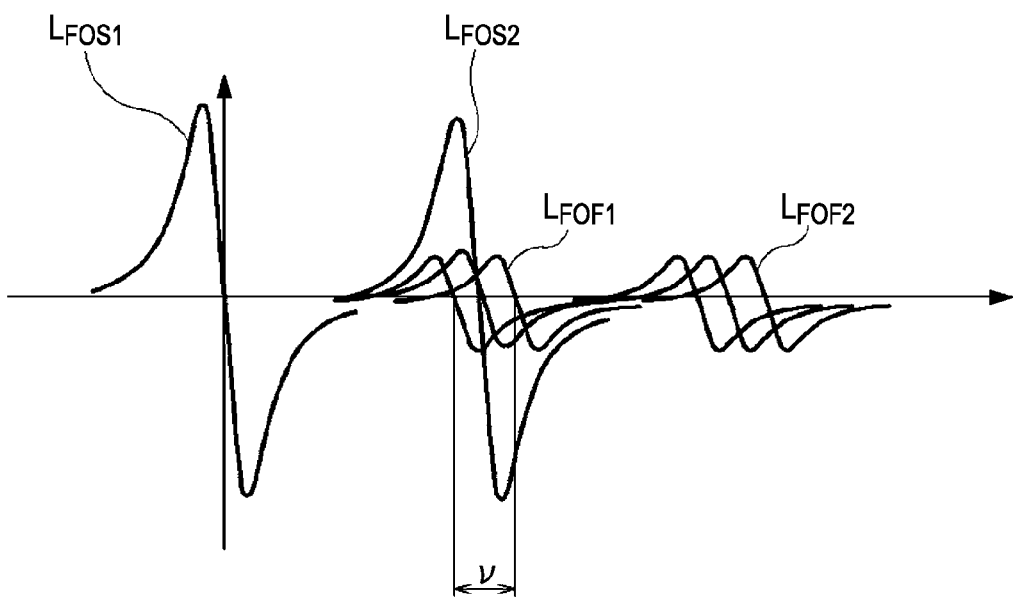
FIG. 15 is a diagram illustrating an effect on a focus error signal affected by change in efficiency of the unwanted diffracted light relative to the environmental change, and illustrating a focus search waveform (a double layer)

Here, the unwanted signal is larger than the regular signal, and the separation distance Δ between the regular signal and the unwanted signal is equal to the optical distance between the two layers of the double layer optical disc. In this case, as shown in FIG. 15, the regular signal of the second layer to be read is formed to be overlapped with the unwanted signals of the first layer. In FIG. 15, the $L_{FOS1}$ and $L_{FOS2}$ indicate the regular signals of the focus error signals which can be acquired from the regular light generated from the first layer and the second layer of the double layer optical disc. Further, the $L_{FOF1}$ and $L_{FOF2}$ indicate the unwanted signals of the focus error signals which are formed by the unwanted diffraction light generated from the first layer and the second layer of the double layer optical disc. Here, when the second layer indicated by $L_{FOS2}$ in FIG. 15 is intended to be read, as described above, the unwanted signal of the first layer interferes with the regular signal of the second layer. Further, at this time, if the thickness between the layers of the optical disc is constant, some effects on the focus are suppressed, but practically the thickness between the disc layers is different in accordance with the position on the optical disc, and thus the signal is shifted by just an amount of, for example, v shown in the drawing. As a result, because of the rotation of the disc, the interference position is changed between the unwanted signal and the regular signal, thereby causing the focus servo to be extremely unstable. In addition, here, the astigmatism method is assumed as the focus servo, but even though another method is used, the problem is not solved. Accordingly, unless the unwanted signal is reduced, the focus servo is not stabilized. Further, even though the unwanted signal is generated in the opposite direction, then the reading from the first layer becomes unstable. Further, in the above-mentioned section "Regarding Unwanted Diffraction Order", it is assumed that the combination of the regular light and the adjacent orders makes the position of the unwanted signal closest to the regular signal, and it is almost the same as the space of the layers of the double layer optical disc. Since all the unwanted signals based on the other order combinations are sufficiently thicker than the layer space of the double layer optical disc, there is no effect.

Solution

In order to solve such problems, the method is considered which reduces the efficiency of the unwanted light up to the level at which there is no problem with any environmental change by adopting a configuration of the diffraction structure. That is, as described in FIG. 8B, it is possible to reduce the effect of the unwanted signal by forming the non-equidistant multi-step structure. However, the configuration shown in FIG. 8B has room for further improvement. First, in the corresponding method, there is a problem in that the efficiency of the third wavelength λ3 for the CD and the like is remarkably lowered. In some cases, a problem in practical use arises in that the diffraction efficiency of the third wavelength λ3 is lowered. Second, in the corresponding method, there is a problem in that, when an appropriate depth is selected, it is difficult to obtain the effect of reduction in the unwanted light with the first wavelength λ1 for BD and the like and it is possible to reduce only the unwanted light with the second wavelength λ2 for the DVD and the like. Here, there is demand for reduction in the amount of the unwanted light with the first wavelength λ1 for the BD. In consideration of such problems and demand, for example, as shown in FIG. 8A, there is the method of the blazed-structure-overlapping configuration described below. By adopting such a method, it is possible to obtain the following excellent advantages: the lowering in the efficiency of the third wavelength for the CD and the like is compensated; besides the efficiency of the second wavelength for the DVD and the like is increased; and moreover the unwanted light with the first wavelength for the BD and the like is reduced. Moreover, in such a configuration, the diffraction structure is slightly changed, and thus the configuration is able to obtain a great advantage with a simple change. Hereinafter, first, the improvement method using the non-equidistant configuration shown in FIG. 8B is described, and then the improvement method using the slope-applied configuration shown in FIG. 8A is described.

Regarding Solution: Change in Shape of Non-Equidistant Diffraction Structure

Here, by using the method disclosed in Japanese Unexamined Patent Application Publication No. 2009-76163, the equidistant multi-step shape of the inner orbicular zone is improved as shown in FIG. 8B. Thus, here it is desirable to increase the efficiency by improving the phase characteristics of the BD and DVD.

Figure 16A:
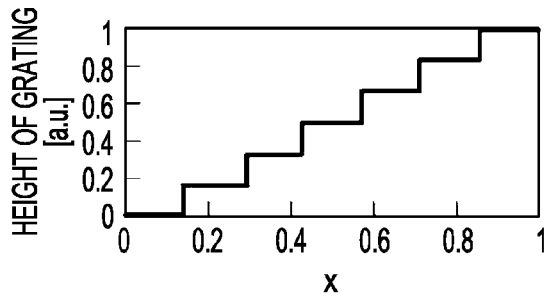
FIGS. 16A to 16H are diagrams illustrating a representative example of a method of changing a diffraction structure shape so as to reduce unwanted signals in an exemplary case where (k1$i$, k2$i$, k3$i$)=(1, −2, −3), where

According to the method, in consideration of the diffraction structure formed in a circular shape in advance, by changing the amounts of phases at the respective wavelengths in design, it can be expected to improve the efficiency, the wavelength characteristics, and the temperature characteristics. First, as a representative example, the case where (k1$i$, k2$i$, k3$i$)=(1, −2, −3) is described with reference to FIGS. 16A to 16H. As described above, FIG. 16A shows a single period of the diffraction structure which can be firstly considered as the equidistant multi-step shape on the basis of the relationship of the diffraction efficiency, the groove depth, and the number of steps. That is, FIG. 16A corresponds to FIG. 8C. Further, FIGS. 16B to 16D shows the amount of phase φ(x)−kx (k is an order) of the light with the regular diffraction order at that time. Hereinafter, the equidistant multi-step shape is referred to as a "general configuration". It can be seen from FIGS. 16B to 16D that the average of the phases is deviated at the first wavelength λ1 corresponding to the BD and the second wavelength λ2 corresponding to the DVD. In particular, it can be seen from FIG. 16C that, at the second wavelength λ2 corresponding to DVD, as x increases from 0 to 1, the phase steadily decreases downward. Further, it can be seen from FIG. 16B that, at the first wavelength λ1 corresponding to the BD, as the x increases from 0 to 1, the phase steadily increases upward. Basically, in the phase diagram, as the phase is distributed to be more constant, the efficiency increases. Thus, as the action of the phase is more planar as a whole, the resistance to the change in wavelength increases.

Such characteristics are clarified by calculation of the diffraction efficiency I represented by the following general expression (1) (refer to "Guide to Diffractive Optical Element" published by Optronics Co., Ltd., Enlarged and Revised First Edition, p 69). That is, by using the corresponding expression and normalizing the expression by x=Λx, the range of φ(x) is changed into the range from 0 to 1. Further, the I in the expression (1) represents the diffraction efficiency, and the φ(x) represents the phase given by the diffraction structure. In the expression (1), as the efficiency increases, |φ(x)−kx| is closer to a constant value. As it is closer to a constant value, the value of the integral is closer to 1, and thus the efficiency increases. This represents that, as the phase is distributed to be more constant in the phase diagram of φ(x)−kx, the efficiency is better. Further, the φ(x) in the expression (1) is a portion changed by the change in wavelength, but in order to suppress the change in efficiency caused by the change in wavelength, it is necessary for dφ(x)/dλ to be approximate to a constant value. Here, since the dφ(x)/dλ correlates with dφ(x)/dx, in order to obtain the resistance to the change in wavelength, it is necessary for dφ(x)/dx to be approximate to a constant value. This represents that, as the action of |φ(x)−kx| is more planar as a whole, the resistance to the change in wavelength, the change in temperature, and the change in depth increases. Accordingly, in order to reduce the unwanted light due to the environmental change, it is necessary to correct the rise in the BD and the lowering in the DVD.

$$I = \left| \int_0^1 \exp\{j \cdot 2\pi\Phi(x)\}\exp(-j \cdot 2\pi kx)dx \right|^2 \quad (1)$$

$$= \left| \int_0^1 \exp\{j \cdot 2\pi(\Phi(x) - kx)\}dx \right|^2$$

Figure 16E:
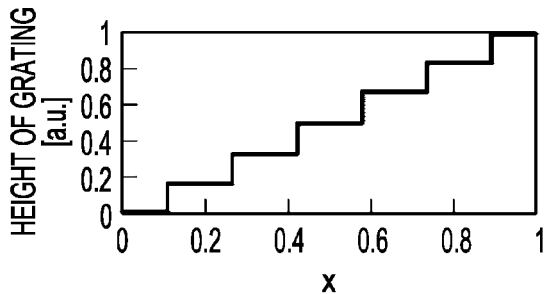
Figure 16B:
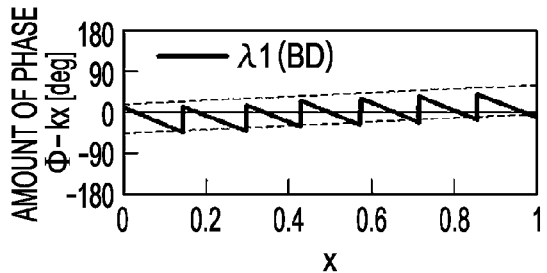
Figure 16F:
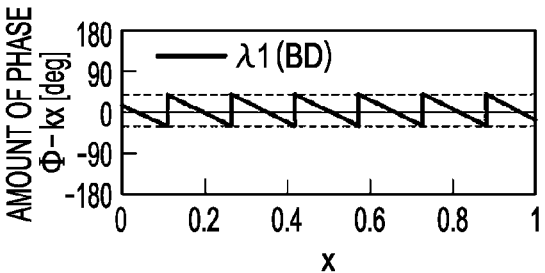
Figure 16C:
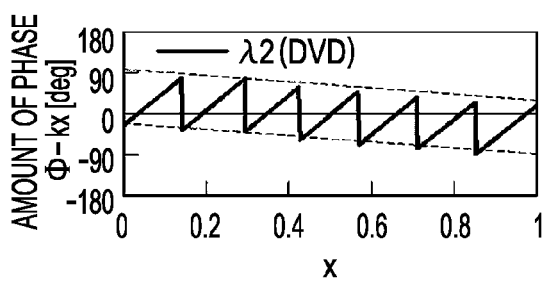
Figure 16G:
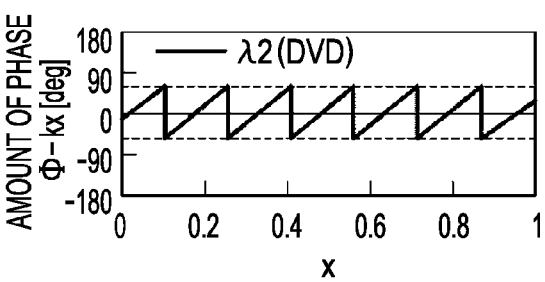
Figure 16D:
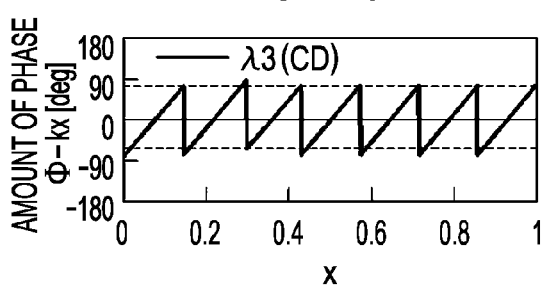
Figure 16H:
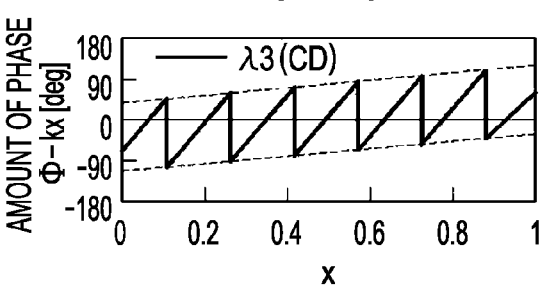

Next, FIG. 16E shows the configuration (hereinafter referred to as an "improved step-width configuration") of the improved diffraction structure in which the widths of the steps are changed. FIG. 16E corresponds to FIG. 8B. In the part, in which x is in the range of 0.4 to 0.6, in the diffraction structure of the general configuration formed in the above-mentioned equidistant multi-step shape, the phase distribution is substantially planar. Hence, this distribution has a trade-off relation, and thus it is not preferable that the structure is changed from the equidistant configuration. FIGS. 16B to 16D show the contents mentioned above. Accordingly, the other part is changed. Specifically, in FIG. 16E, in order to change the phase distribution of the BD and DVD in the vicinity of x=0 and x=1, by narrowing the pitches of the first level and the seventh level, the phase distribution is planarized. More specifically, here the pitches of the first level and the seventh level are set to be 0.775 times those of the genera configuration, and the pitches of the other levels are set to be equivalent. That is, the ratio of the widths of the steps is changed from 1:1:1:1:1:1:1, which is set originally as shown in FIG. 8C, to 0.775:1.09:1.09:1.09:1.09:0.775 which is set as shown in FIG. 8B. In such a manner, it is possible to improve greatly the flatness of the phase. Hereinafter, non-equidistant configuration is expressed by using the duty ratio η. That is, assuming that the number of steps is s, it is preferable to adopt the non-equidistant configuration in which the ratio of the widths of the steps during a period is ((s+1)−(s−1)η)/2:η: η:....:η:η:((s+1)−(s−1)η)/2 in order. Particularly, in the case of s=6, 6 level differences, and 7 levels, the ratio is (7−5η)/2:η:η:η:η:η:(7−5η)/2. FIGS. 16F to 16H show the amount of phase of the light with the regular diffraction order in the diffraction structure of the improved configuration shown in FIG. 16E. As described above, as a result of the improved step-width configuration shown in FIG. 16E, the flatness of phase is greatly improved as shown in FIGS. 16F to 16H. In particular, the flatness of phases in the BD and DVD is improved.

Figure 17:
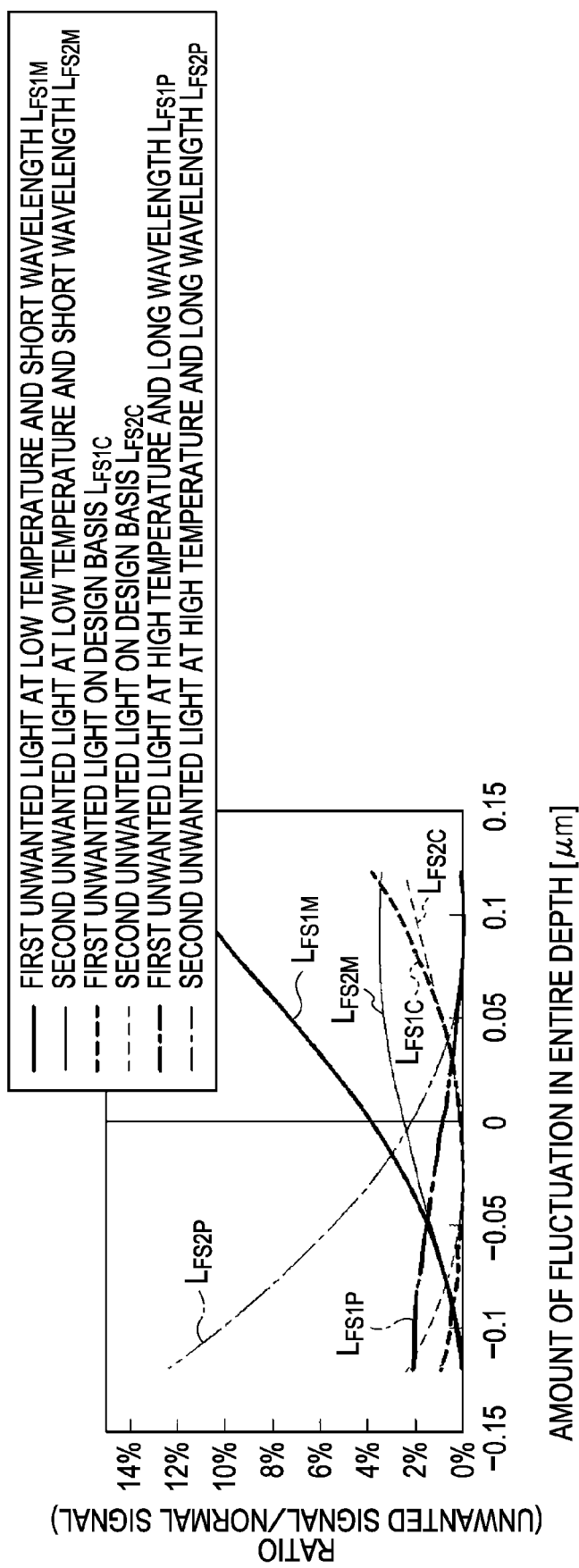
FIG. 17 is a diagram illustrating states of the unwanted signals generated from the first optical disc (BD) in the general configuration (the equidistant multi-step configuration, and the depth of 5000 nm), and illustrating change in ratio of the unwanted signal to the regular signal relative to the amount of change in the overall depth under the low-temperature short-wavelength condition and the high-temperature long-wavelength condition on the design basis.
Figure 18:
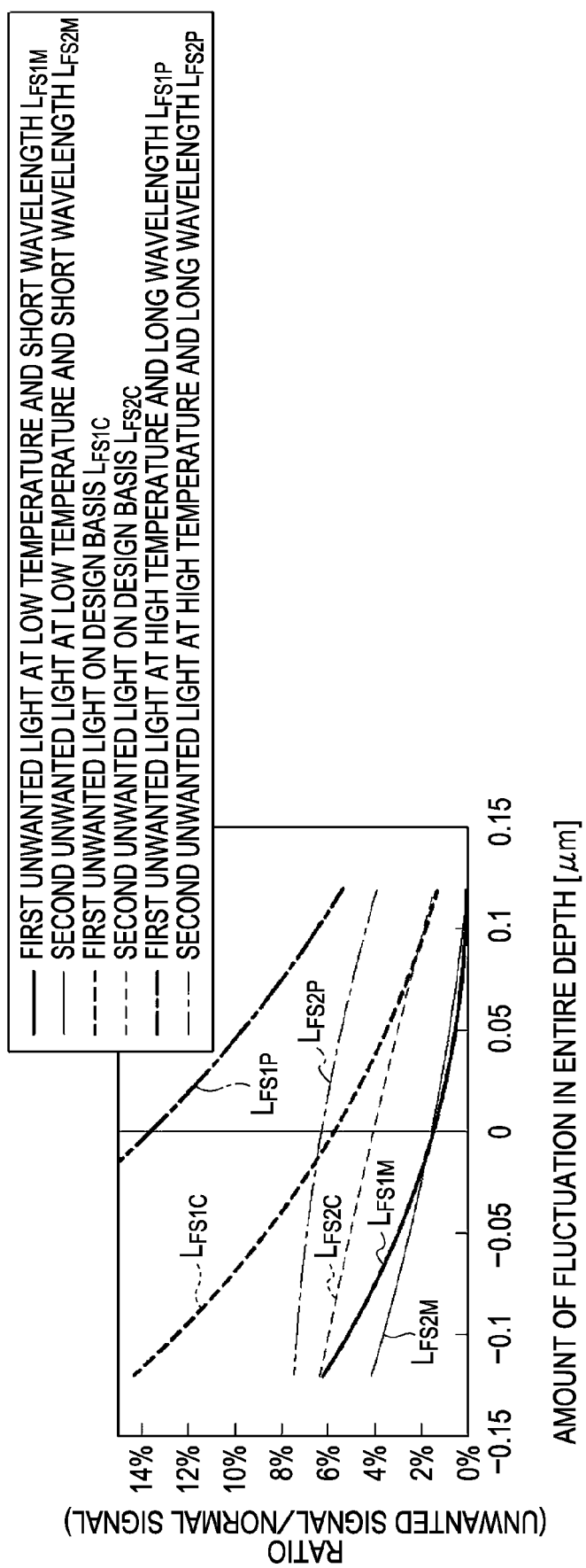
FIG. 18 is a diagram illustrating states of the unwanted signals generated from the second optical disc (DVD) in the general configuration (the equidistant multi-step configuration, and the depth of 5000 nm), and illustrating change in ratio of the unwanted signal to the regular signal relative to the amount of change in the overall depth under the low-temperature short-wavelength condition and the high-temperature long-wavelength condition on the design basis.
Figure 19:
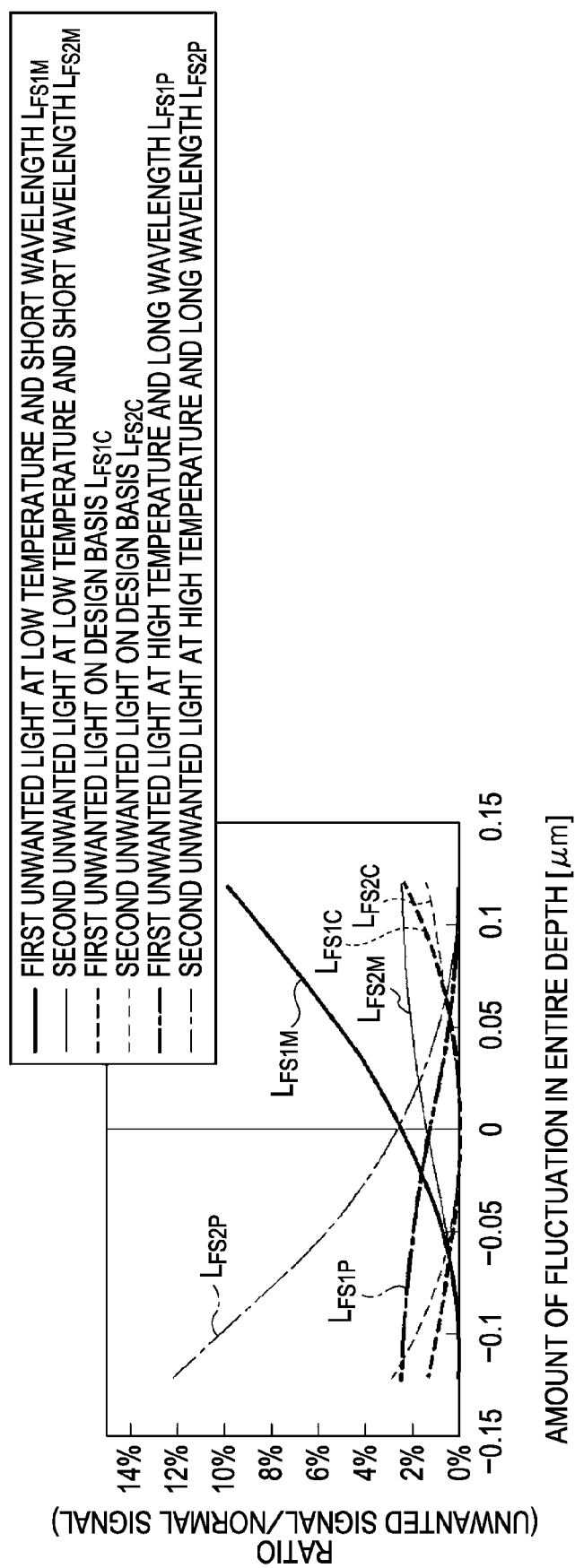
FIG. 19 is a diagram illustrating states of the unwanted signals generated from the first optical disc (BD) in the improved step-width configuration (the non-equidistant multi-step configuration, and the depth of 5030 nm), and illustrating change in ratio of the unwanted signal to the regular signal relative to the amount of change in the overall depth under the low-temperature short-wavelength condition and the high-temperature long-wavelength condition on the design basis.

In practice, when the improved step-width configuration is applied to the inner orbicular zone, the state, in which the ratio of unwanted signal (unwanted signal/regular signal) is improved, is described with reference to FIGS. 17 to 20. That is, FIG. 17 is a diagram illustrating the states of the unwanted signals of the first wavelength corresponding to the BD and the like in the case of adopting the equidistant multi-step configuration as a general configuration for comparison with the improved step-width configuration. Further, FIG. 18 is a diagram illustrating the states of the unwanted signals of the second wavelength corresponding to the DVD and the like in a case of adopting the equidistant multi-step configuration. Furthermore, FIG. 19 is a diagram illustrating the states of the unwanted signals of the first wavelength in the case of adopting the improved step-width configuration. Further, FIG. 20 is a diagram illustrating the states of the unwanted signals of the second wavelength in the case of adopting the improved step-width configuration.

Further, in FIGS. 17 to 20, each line represents the change in ratio (the ratio of unwanted signal/regular signal) change relative to the amount of change in overall depth (um). In the drawings, the $L_{FS1M}$ indicates the first unwanted light at the low temperature and the short wavelength, and the $L_{FS2M}$ indicates the second unwanted light at the low temperature and the short wavelength. Further, in the drawings, the $L_{FS1C}$ indicates the first unwanted light on the design basis, the $L_{FS2C}$ indicates the second unwanted light on the design basis, the $L_{FS1P}$ indicates the first unwanted light at the high temperature and the long-wavelength, the $L_{FS2P}$ indicates the second unwanted light at the high temperature and the long wavelength.

Figure 20:
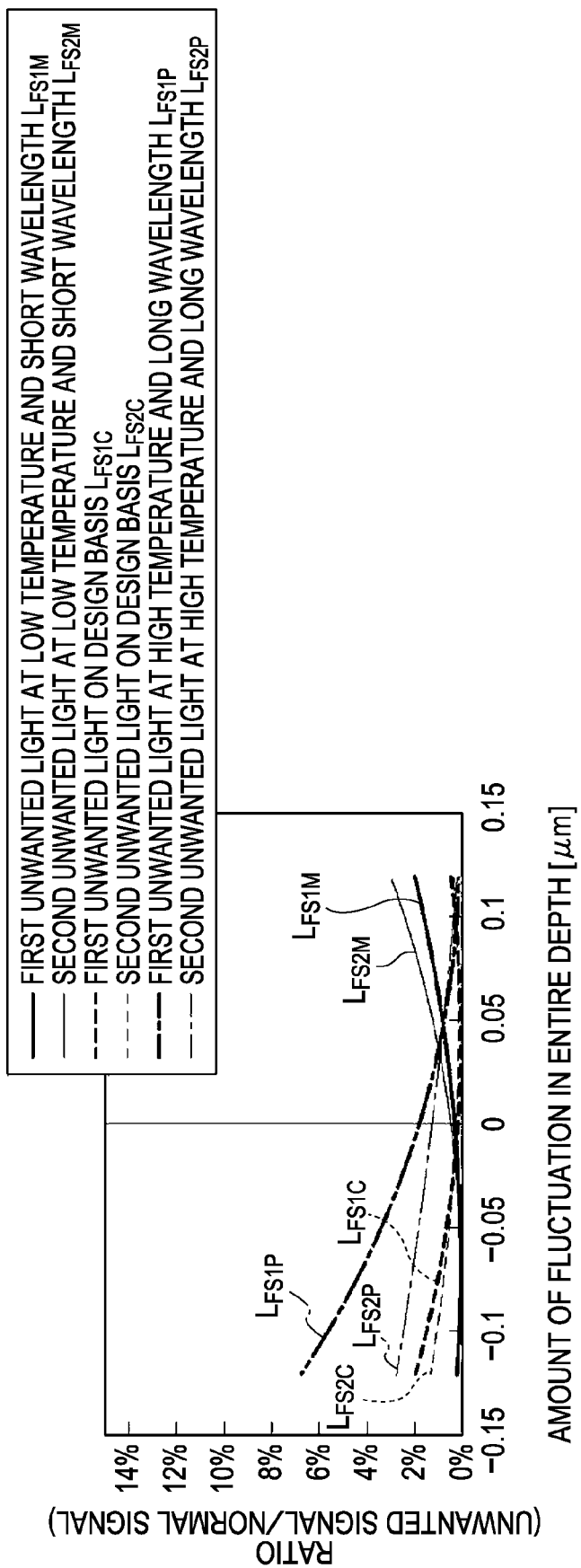
FIG. 20 is a diagram illustrating states of the unwanted signals generated from the second optical disc (DVD) in the improved step-width configuration (the non-equidistant multi-step configuration, and the depth of 5030 nm), and illustrating change in ratio of the unwanted signal to the regular signal relative to the amount of change in the overall depth under the low-temperature short-wavelength condition and the high-temperature long-wavelength condition on the design basis.

The total height of the diffraction structure in the general configuration shown in FIGS. 17 to 18 described herein is 5000 nm, and the total height of the diffraction structure in the improved step-width configuration shown in FIGS. 19 to 20 is 5030 nm. Each horizontal axis represents the change in depth. Further, the upper and lower limits of the laser wavelength are respectively set to ±5 nm from the center of a certain wavelength. Further, the upper and lower limits of the temperature are set to ±35° C. from the central temperature of 35° C. on a design basis.

In FIGS. 17 to 20, a ratio of the amount of unwanted signal to the amount of the regular signal is a value estimated on the basis of the signal ratio which is obtained by ray tracing in lens design in practice. That is, the $\text{Eff}_{1im}$, $E_{1mm}$, and $\text{Eff}_{1om}$ are respectively defined as efficiencies of the orders of the regular light in the orbicular zones (the inner orbicular zone, the intermediate orbicular zone, and the outer orbicular zone) at the first wavelength λ1 corresponding to BD and the like. Further, the $\text{Eff}_{2im}$, and $\text{Eff}_{2mm}$ are respectively defined as efficiencies of the orders of the regular light in the orbicular zones (the inner orbicular zone and the intermediate orbicular zone) at the second wavelength λ2 corresponding to DVD and the like. In addition, the $\text{Eff}_{1is}$ is defined as an efficiency of the order of the unwanted light in the inner orbicular zone at the first wavelength λ1, and the $\text{Eff}_{2is}$ is defined as an efficiency of the order of the unwanted light in the inner orbicular zone at the second wavelength λ2. In the above-mentioned case, relative to the regular signal, the unwanted signal ratio Effr1 of BD (the first wavelength λ1) and the unwanted signal ratio Effr2 of DVD (the second wavelength λ2) are represented by the following expressions (2) and (3). Further, R1 to R3 in the expressions are the radiuses of the first to third regions, respectively. Further, in the configurations of the intermediate orbicular zone and the outer orbicular zone, the respective efficiencies Eff are calculated by employing the structure and depth in Table 2. The expressions (2) and (3) are just in proportion to the unwanted signal ratios respectively. Hence, the proportional coefficients are calculated by performing the ray tracing on the lens in the practical focus error search simulation on the proportional coefficients at this time.

$$EFFr_1 \propto \frac{2 \cdot Eff_{1im} \cdot Eff_{1is} \cdot R_1^4}{(Eff_{1im} \cdot R_1^2 + Eff_{1mm} \cdot (R_2 - R_1)^2 + Eff_{1om} \cdot (R_3 - R_2)^2)^2} \quad (2)$$

$$EFFr_2 \propto \frac{2 \cdot Eff_{2im} \cdot Eff_{2is} \cdot R_1^4}{(Eff_{2im} \cdot R_1^2 + Eff_{2mm} \cdot (R_2 - R_1)^2)^2} \quad (3)$$

TABLE 2

STANDARD CONFIGURATIONS OF ORBICULAR ZONES

| | ORBICULAR ZONE | | | | | | |
|---|---|---|---|---|---|---|---|
| | k1 | k2 | k3 | eff1 | eff2 | eff3 | d [µm] | s |
| INNER ORBICULAR ZONE | 1 | −2 | −3 | 0.92 | 0.68 | 0.52 | 5.0 | 6 |
| INTERMEDIATE ORBICULAR ZONE | 0 | −1 | — | 1.00 | 0.59 | — | 1.5 | 2 |
| OUTER ORBICULAR ZONE | 2 | — | — | 1.00 | — | — | 1.45 | BLAZE |

It can be seen from FIGS. 17 to 20 that the method (the improved step-width configuration) has a great effect on, particularly, DVD, and the frequency of occurrence of the unwanted light is greatly reduced from around the maximum value of 10% to 2% or less. On the other hand, the unwanted signal ratio of BD is not so improved. Even though the unwanted signal ratio of BD is large to a certain extent, an operation itself is possible. However, with a view to providing a stable optical pickup in which various kinds of errors are minimized, further improvement is necessary.

Figure 21:
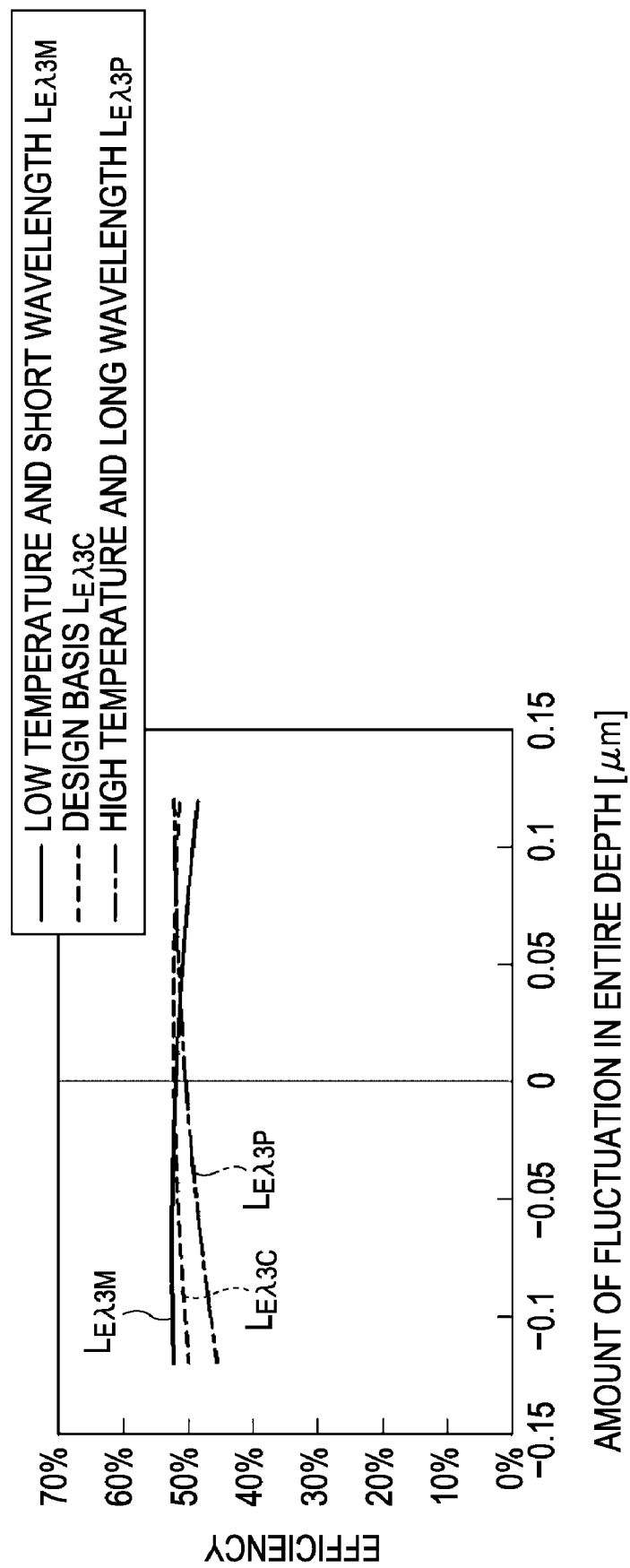
FIG. 21 is a diagram illustrating efficiencies of the third optical disc (CD) in the general configuration (the equidistant multi-step configuration, and the depth of 5000 nm), and illustrating change in efficiency of the third wavelength relative to the amount of change in the overall depth under the low-temperature short-wavelength condition and the high-temperature long-wavelength condition on the design basis.
Figure 22:
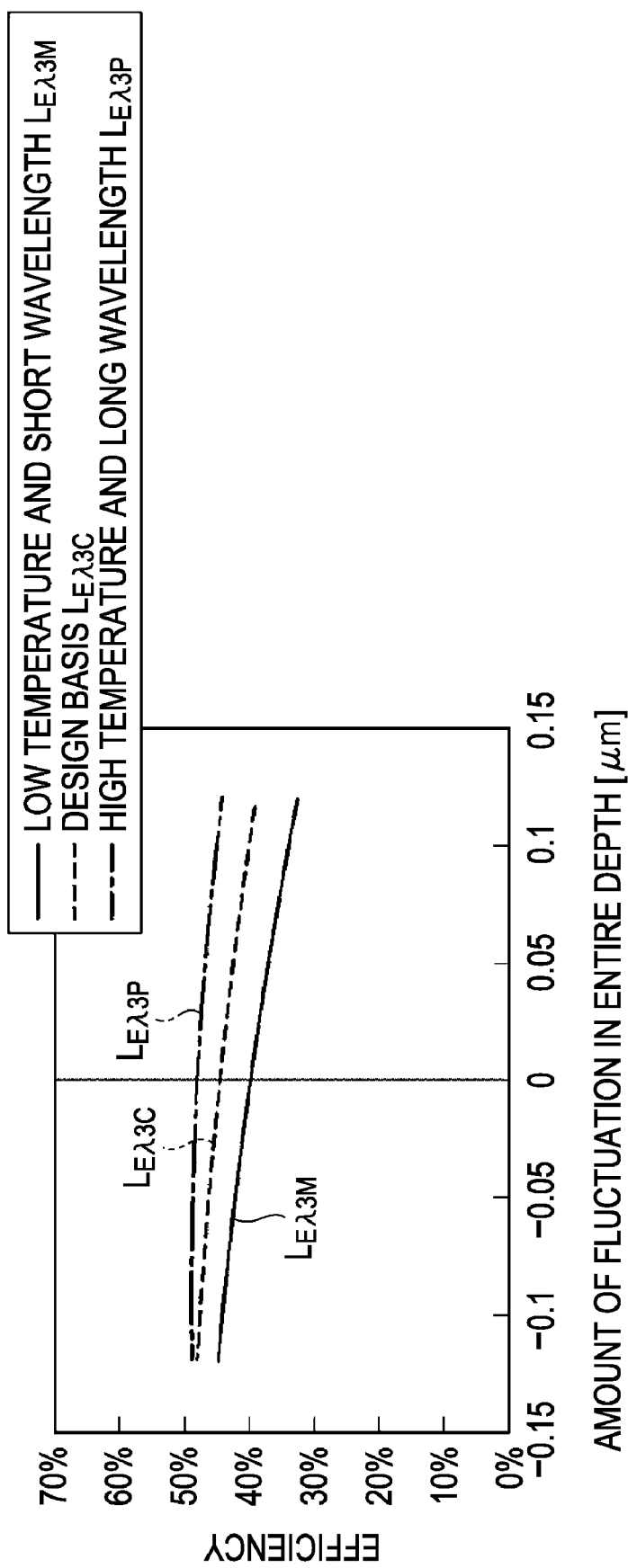
FIG. 22 is a diagram illustrating efficiencies of the third optical disc (CD) in the improved step-width configuration (the non-equidistant multi-step configuration, and the depth of 5030 nm), and illustrating change in efficiency of the third wavelength relative to the amount of change in the overall depth under the low-temperature short-wavelength condition and the high-temperature long-wavelength condition on the design basis.

Further, FIG. 21 shows the change in efficiency at the third wavelength λ3 corresponding to CD and the like in the general configuration. FIG. 22 shows the change in efficiency at the third wavelength λ3 in the improved step-width configuration. In FIGS. 21 to 22, the $L_{E\lambda 3M}$ indicates the case of the low temperature and the short wavelength, the $L_{E\lambda 3C}$ indicates the case of the design basis, and the $L_{E\lambda 3P}$ indicates the case of the high temperature and the long wavelength. In FIGS. 21 to 22, in the improved step-width configuration, the minimum CD efficiency is lowered up to around 42%, and in practical use, a lot of laser power is necessary. Hence, the cost thereof is likely to increase. For this reason, a method for improving this point is necessary. Next, the slope structure for improving the unwanted signal ratio of the BD and the efficiency of the CD, that is, the blaze overlapping configuration is described.

Additional Solution: Application of Slope Structure

Figure 23A:
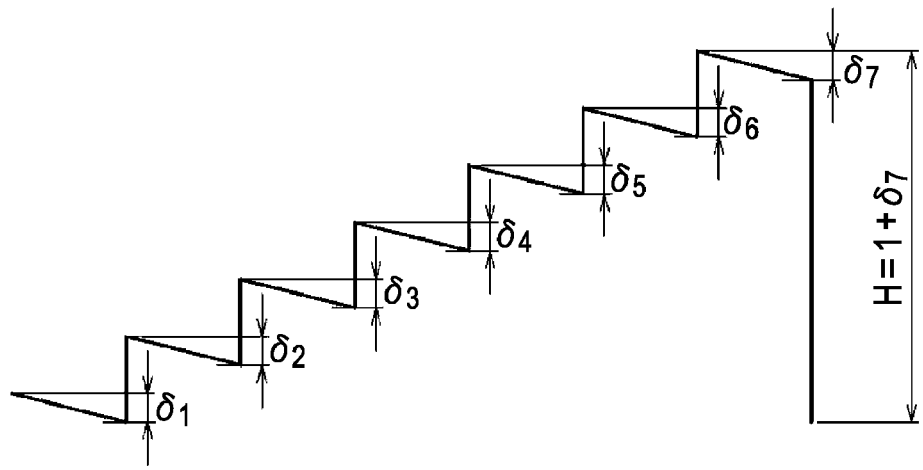
FIGS. 23A to 23C are diagrams illustrating an improved slope-applied configuration and the amount of slope, where
Figure 23B:
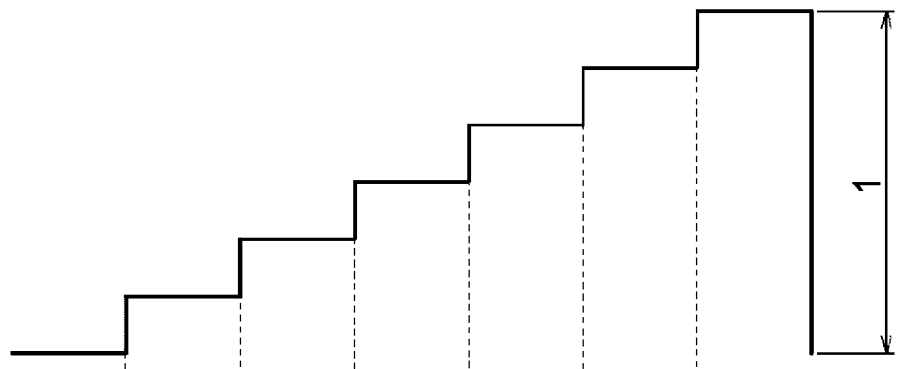
Figure 23C:
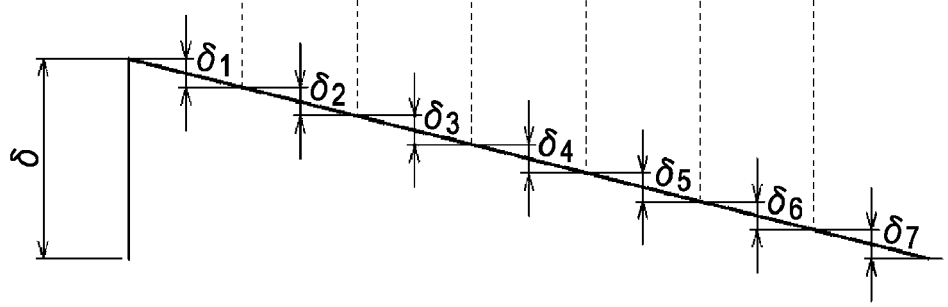

Here, in addition to the above-mentioned improved step-width configuration, it is possible to obtain an improved effect such as reduction in effects of the unwanted light by adopting a method in which a periodic structure is formed by applying a certain slope as shown in FIG. 23A. In such a method of applying a slope, more specifically, the blazed structure shown in FIG. 23C is overlapped with the multi-step structure which is shown in FIG. 23B. With this overlapping configuration, it is possible to obtain the multi-step diffraction structure to which the slope structure is added as shown in FIG. 23A. Moreover, in this method, it is also possible to improve the CD efficiency. Accordingly, in this method, it is also possible to constitute an objective lens which is more optimized as a whole. Here, the amount of slope δ is defined as shown in FIG. 23A. First, the total height of the multi-step structure, which is shown in FIG. 23B and on which nothing is performed, that is, to which the slope is not applied, is set to 1, and the sum of the slopes of the steps is defined as the amount of slope δ. That is, the following relationship is satisfied: $\delta=\delta_1+\delta_2+\delta_3+\delta_4+\delta_5+\delta_6+\delta_7$. In this case, the tilt of the slope is set to be constant. Specifically, FIGS. 23A to 23C are diagrams schematically illustrating an example of the equidistant multi-step structure to which the slope is applied. As shown in the drawing, when the number of steps S is 6 in the equidistant configuration in which the steps are equally spaced, the height of the steps increases by δ/7. In the case of the non-equidistant configuration, the total amount is still δ, and the respective steps have the slopes with the heights relative to the widths of the respective steps. In addition, each amount of the slopes is formed to increase in the direction opposite to the direction of increasing the steps, thereby obtaining the following effects. Thus, it is difficult to obtain the desirable effects even if the oppositely-directed slopes are applied.

Figure 24A:
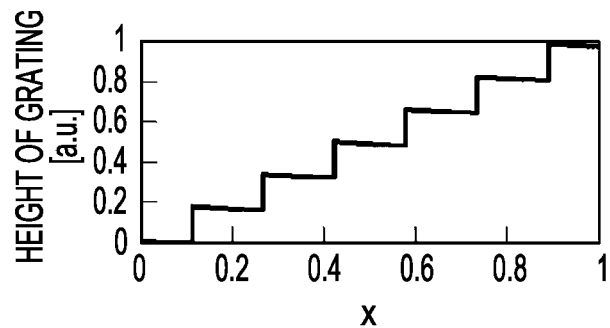
FIGS. 24A to 24D are diagrams illustrating cases where further improved slope-applied configurations are applied to the improved step-width method shown in FIGS. 16A to 16H, where
Figure 24B:
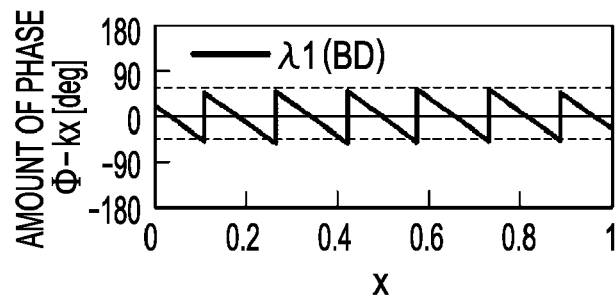
Figure 24C:
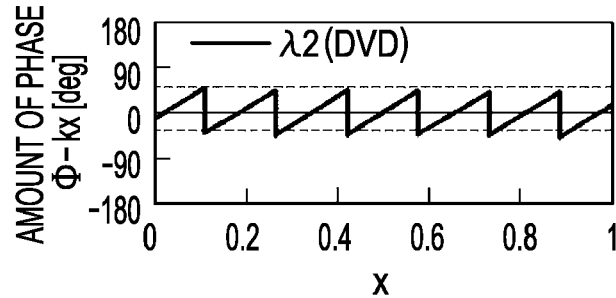
Figure 24D:
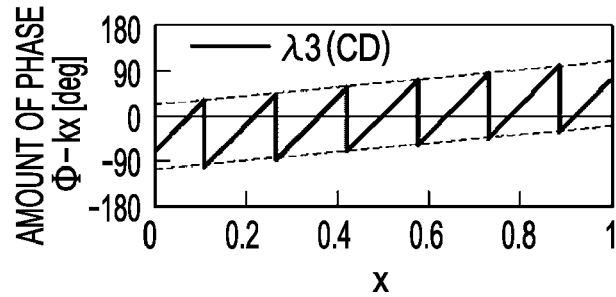

FIGS. 24A to 24D show the configuration of the improved slope-applied diffraction structure (hereinafter referred to as "improved slope-applied configuration"). FIG. 24A shows a single period of the diffraction structure of the improved configuration in which the slope is applied to the non-equidistant multi-step shape. FIG. 24A corresponds to FIG. 8A. In the improved slope-applied configuration, the amount of slope δ is 0.1, the duty ratio η is 1.09, and the total depth is 5110 nm. FIGS. 24B to 24D show the amounts of phases of the light with the regular diffraction order in the diffraction structure of the improved configuration shown in FIG. 24A. As can be seen from the phase states shown in FIGS. 24B to 24D, the envelopes of φ-kx of the DVD and CD tend to be converged to be more constant than those in FIGS. 16F to 16H mentioned above, and thus it is inferred that the efficiencies of the DVD and CD increase. Further, in FIGS. 16A to 16H and FIGS. 24A to 24D, the segments indicated by the dashed lines represent the envelopes.

Figure 25A:
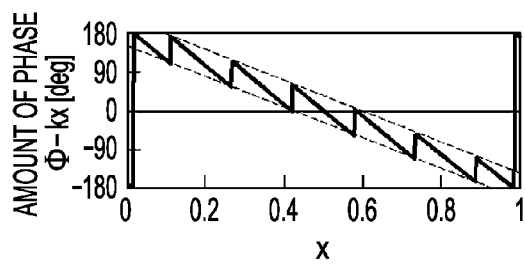
FIGS. 25A to 25D are diagrams illustrating the phases of the unwanted light of the improved step-width configuration and the improved slope-applied configuration by comparing those with each other, where
Figure 25C:
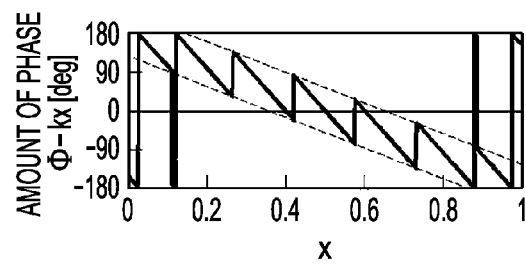
Figure 25B:
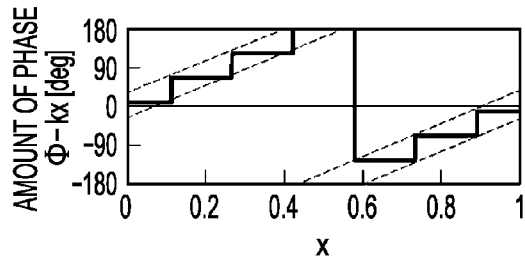
Figure 25D:
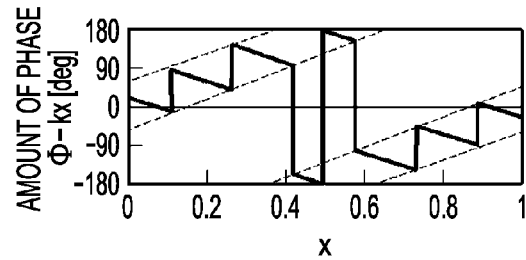

On the other hand, it is inferred that the efficiency of the BD decreases. However, in comparison with FIGS. 25A to 25D in which the diagrams of phases φ-kx of the unwanted light of the BD are plotted, it would appear that the improved slope-applied configuration has a larger envelope than the above-mentioned improved step-width configuration, and the efficiency of the unwanted light thereof is further lowered. Further, FIG. 25A shows the amount of phase φ-kx of the light with the order which is generated as the first unwanted light by the diffraction structure shown in FIG. 16E. FIG. 25B shows the amount of phase φ-kx of the light with the order which is generated as the second unwanted light by the diffraction structure shown in FIG. 16E. Furthermore, FIG. 25C shows the amount of phase φ-kx of the light with the order which is generated as the first unwanted light by the diffraction structure shown in FIG. 24A. FIG. 25D shows the amount of phase φ-kx of the light with the order which is generated as the second unwanted light by the diffraction structure shown in FIG. 24A. As described above, as compared with the improved step-width configuration shown in FIGS. 25A and 25B, the envelopes of the improved slope-applied configuration shown in FIGS. 25C and 25D are large. From the above, it may be said that the efficiency of the unwanted light is lowered.

Figure 26:
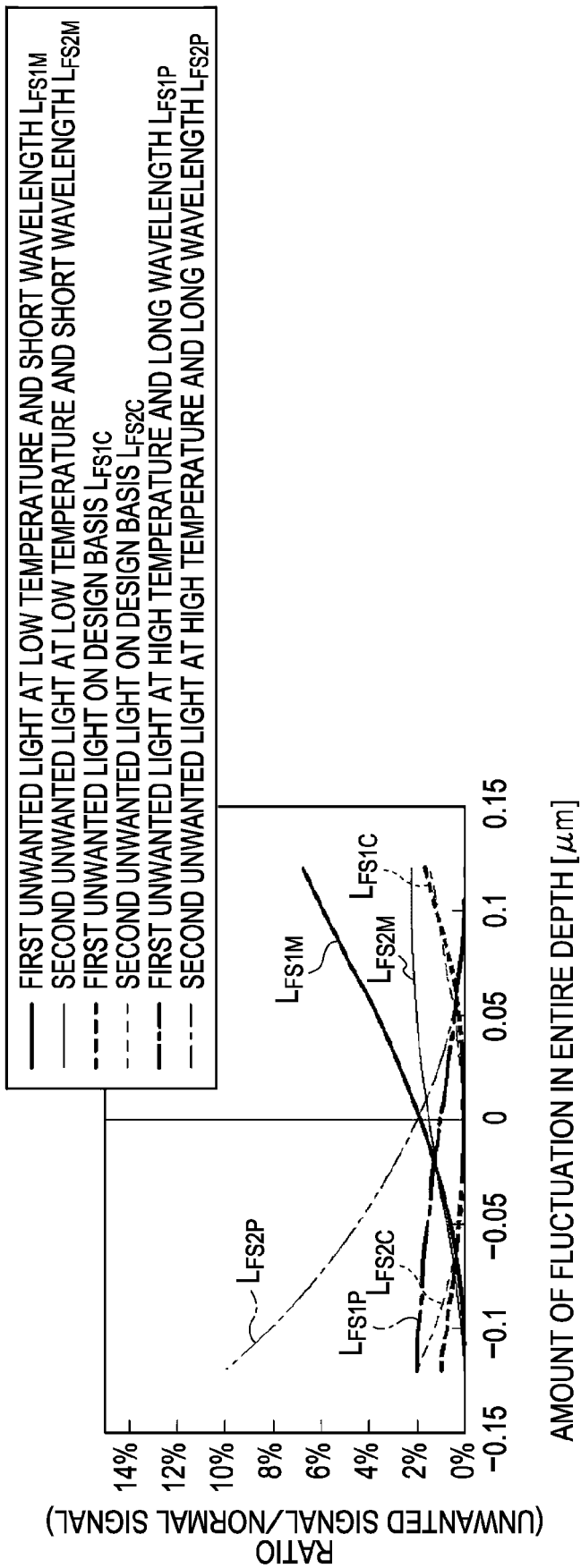
FIG. 26 is a diagram illustrating states of the unwanted signals generated from the first optical disc (BD) in the improved slope-applied configuration (the slope-applied non-equidistant multi-step configuration, and the depth of 5110 nm), and illustrating change in ratio of the unwanted signal to the regular signal relative to the amount of change in the overall depth under the low-temperature short-wavelength condition and the high-temperature long-wavelength condition on the design basis.
Figure 27:
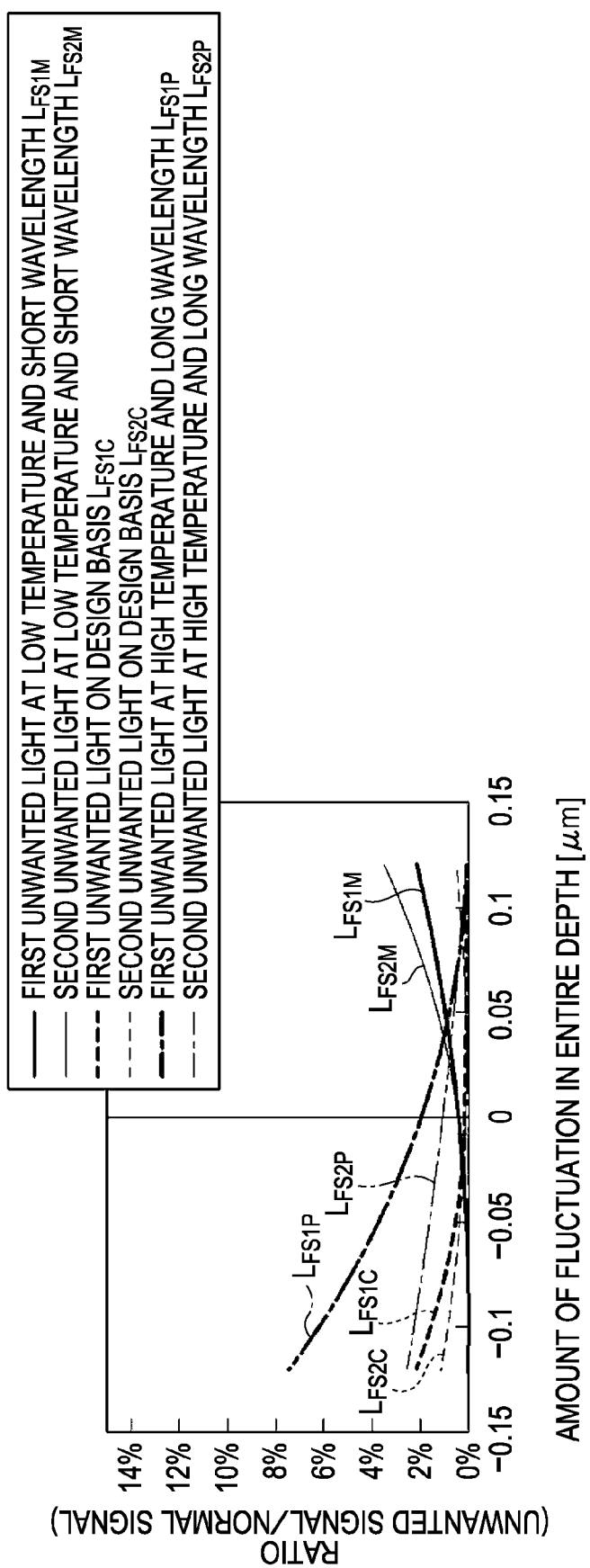
FIG. 27 is a diagram illustrating states of the unwanted signals generated from the second optical disc (DVD) in the improved slope-applied configuration (the slope-applied non-equidistant multi-step configuration, and the depth of 5110 nm), and illustrating change in ratio of the unwanted signal to the regular signal relative to the amount of change in the overall depth under the low-temperature short-wavelength condition and the high-temperature long-wavelength condition on the design basis.
Figure 28:
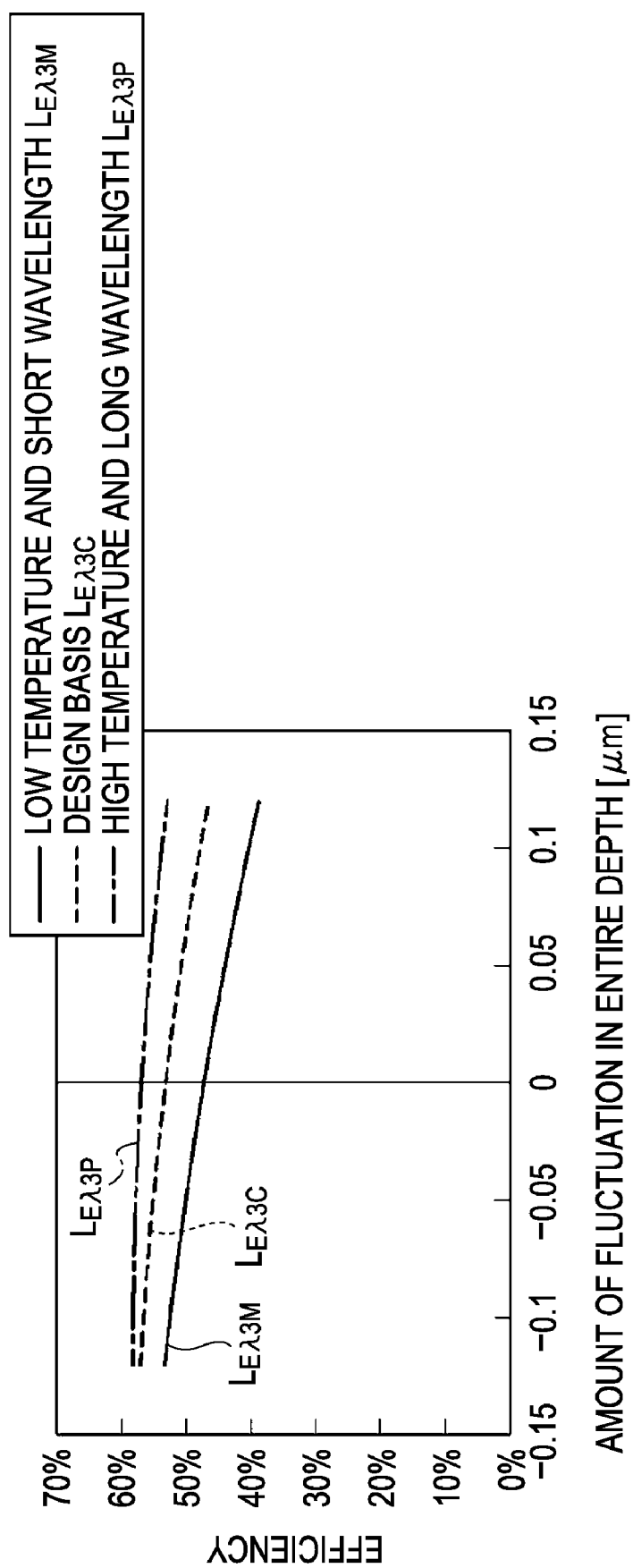
FIG. 28 is a diagram illustrating efficiencies of the third optical disc (CD) in the improved slope-applied configuration (the slope-applied non-equidistant multi-step configuration, and the depth of 5110 nm), and illustrating change in efficiency of the third wavelength relative to the amount of change in the overall depth under the low-temperature short-wavelength condition and the high-temperature long-wavelength condition on the design basis.

Next, in the case where the improved slope-applied configuration is applied to the inner orbicular body in practice, the state, in which the unwanted signal ratio (unwanted signal/regular signal) is improved, is described with reference to FIGS. 26 and 27. Specifically, FIGS. 26 and 27 are diagrams corresponding to FIGS. 19 and 20 illustrating the case of the above-mentioned improved step-width configuration, and are diagrams illustrating the states of the unwanted signals of the first wavelength and the second wavelength in the case of adopting the further improved slope-applied configuration. According to FIGS. 26 and 27, it would appear that the unwanted light of the BD is improved by around 1% in comparison with FIGS. 19 and 20 mentioned above. Further, FIG. 28 shows the change in efficiency at the third wavelength λ3 in the case where the improved slope-applied configuration is applied to the inner orbicular zone. FIG. 28 is a diagram corresponding to FIG. 22 illustrating the case of the above-mentioned improved step-width configuration, and is a diagram in the case of adopting the further improved slope-applied configuration. According to FIG. 28, the minimum efficiency of the CD is recovered by around 49% as compared with FIG. 22. Thus, it may be said that this configuration is advantageous in the case where such an objective lens is used in an optical pickup and the like and this configuration is convenient for use.

As described above, the first diffraction structure provided on the first region 51 has, as shown in FIG. 8A, the improved slope-applied configuration in which the blazed structure formed with the predetermined height in the predetermined direction is overlapped with the multi-step diffraction structure. Further, in the first diffraction structure, the multi-step diffraction structure as an overlapping target is formed as the non-equidistant multi-step structure as shown in FIG. 8B. The first diffraction structure is able to reduce the efficiency of the unwanted light at the time of the environmental change, and in particular to reduce the unwanted light of the DVD, by using the improved step-width configuration. Further, the first diffraction structure is able to reduce sufficiently the unwanted light of the BD and keep the efficiency of the CD high by using the improved slope-applied configuration. The diffractive portion 50 and the objective lens 34 having the above-mentioned first diffraction structure is configured to prevent the servo from becoming unstable due to an increase of the unwanted diffracted light, which is generated by the diffractive portion, caused by the change in temperature and wavelength. Accordingly, the diffractive portion 50 and the objective lens 34 prevents recording and reproducing characteristics from being deteriorated, thereby achieving favorable recording and reproducing characteristics, that is, thereby achieving three-wavelength compatibility with a simple and accessible configuration.

Regarding Limit of η and δ in Slope Structure

Here, the limit of η and δ having an improvement effect in the improved slope-applied configuration is described. As duty ratio η increases, the efficiencies of the BD and DVD increase, and the efficiency of the CD decreases. Further, the unwanted light of the DVD is reduced. Further, as the δ increases, the efficiency of the DVD and CD increases, and the efficiency of the BD decreases. Further, the unwanted light of the BD decreases, while the amount of change in efficiency depending on the temperature of the CD increases. In a case where the difference in efficiency between the inner orbicular zone and intermediate orbicular zone in the BD is 50% or more, the spot size is reduced, and thus this causes it to act differently from the general lens. Hence, the efficiency of 50% or more in the inner orbicular zone from Table 1 is necessary. In terms of the total efficiency, this corresponds to 86% as calculated in the following expression (4).

$$I = \text{Eff}_{1in} \cdot R_1^2 + \text{Eff}_{1mm} \cdot (R_2 - R_1)^2 + \text{Eff}_{1om} \cdot (R_3 - R_2)^2 / R_3^2 = 86\% \quad (4)$$

Further, it is difficult to use the CD when the amount of change in relative efficiency representing the amount of change in efficiency exceeds 10%. Here, the amount of change in relative efficiency is defined as an amount represented by the following relation: the amount of change in relative efficiency=$(I_\lambda - I_{0\lambda})/I_{0\lambda}$, where $I_{0\lambda}$ is a value of the efficiency at the central temperature on the design basis at a certain wavelength λ and $I_\lambda$ is a value of the efficiency at the time of temperature change. The amount of change in relative efficiency is fluctuated up and down in accordance with λ and the change in temperature. However, in the case of the improved configuration using the order selected herein, the absolute value thereof becomes the maximum at the high temperature and long wavelength (70° C., +5 nm). Hence, the amount of change in relative efficiency of the CD in FIG. 34 exemplified later also uses the high-temperature long-wavelength side.

Figure 29:
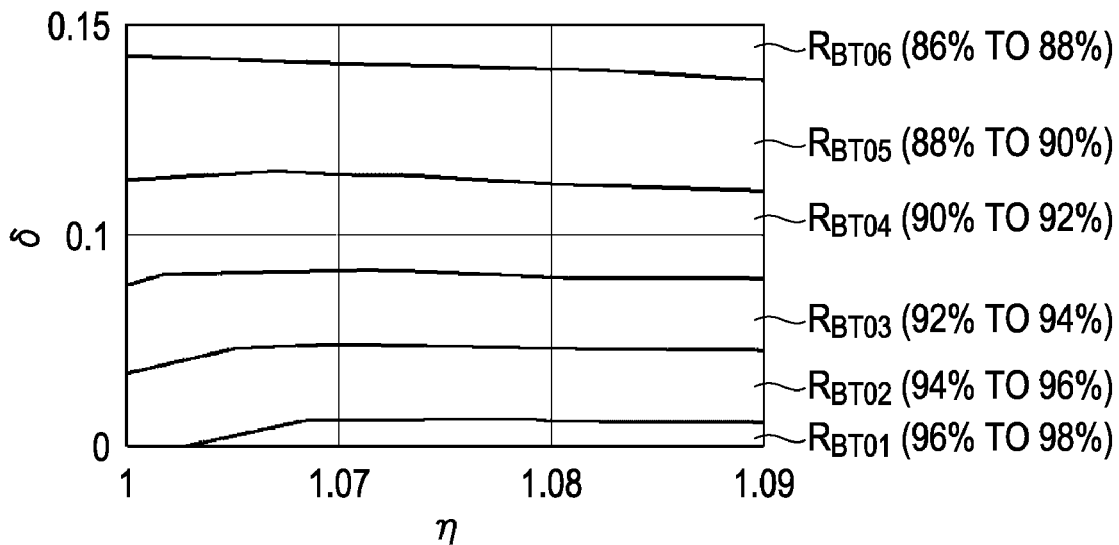
FIG. 29 is a diagram illustrating distribution of TYP efficiencies of the first wavelength $\lambda 1$ depending on the change in $\eta$ and $\delta$.
Figure 30:
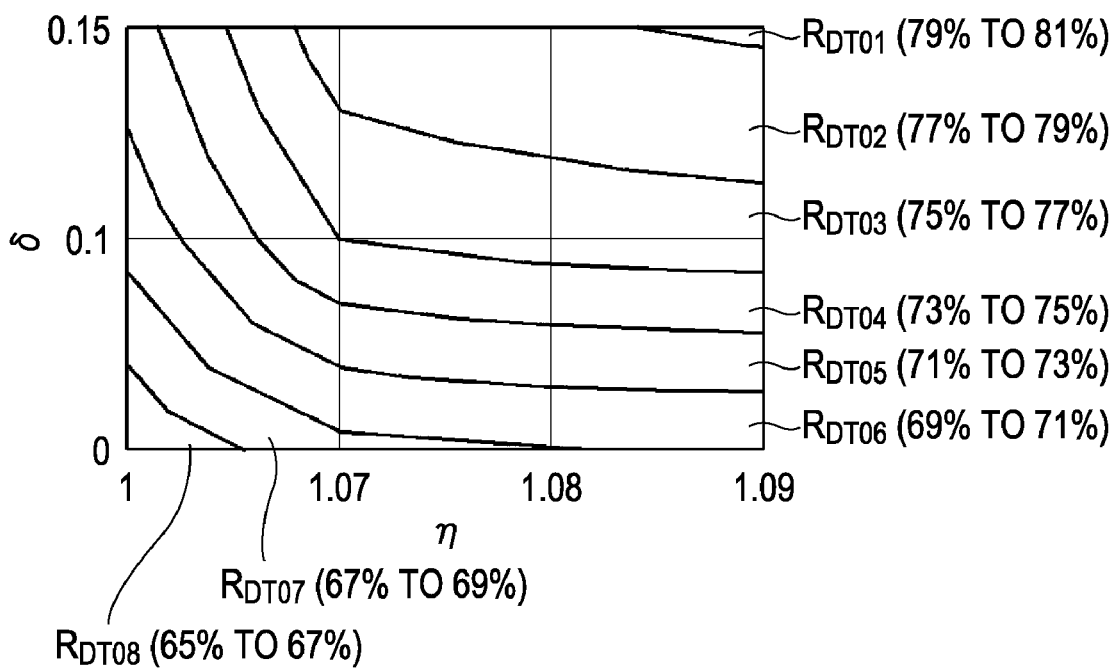
FIG. 30 is a diagram illustrating distribution of TYP efficiencies of the second wavelength $\lambda 2$ depending on the change in $\eta$ and $\delta$.
Figure 31:
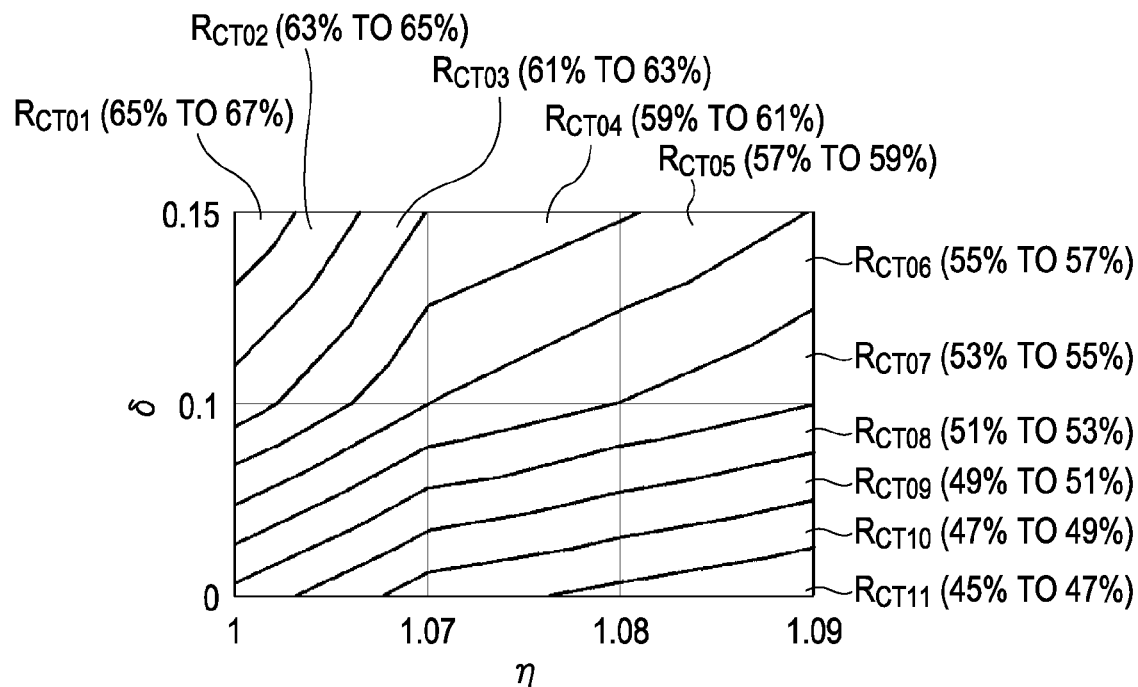
FIG. 31 is a diagram illustrating distribution of TYP efficiencies of the third wavelength $\lambda 3$ depending on the change in $\eta$ and $\delta$.
Figure 32:
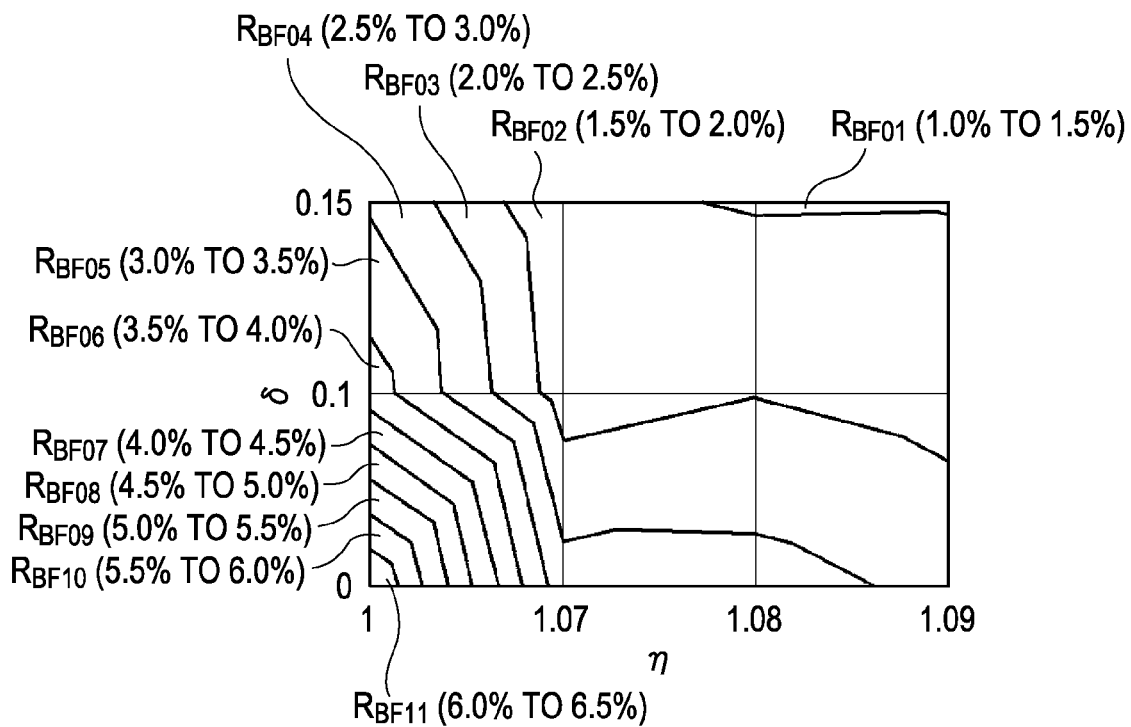
FIG. 32 is a diagram illustrating distribution of diffraction efficiencies of the first unwanted light with the first wavelength $\lambda 1$ depending on the change in $\eta$ and $\delta$.
Figure 33:
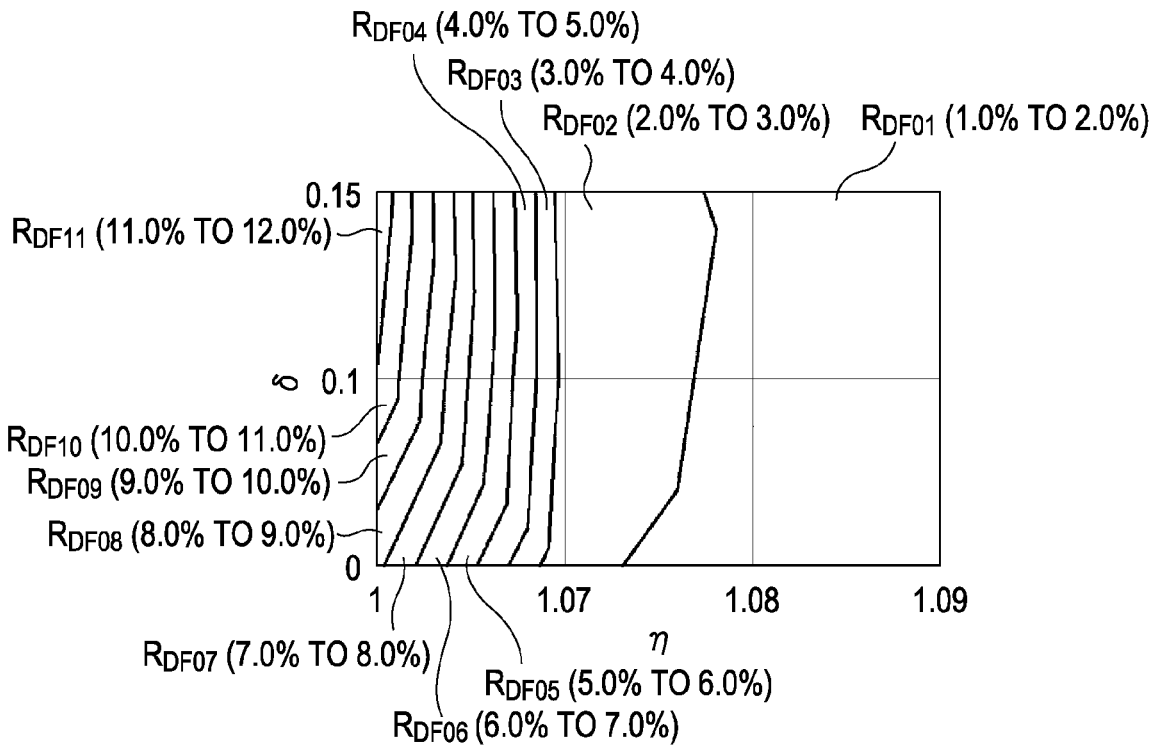
FIG. 33 is a diagram illustrating distribution of diffraction efficiencies of the first unwanted light with the second wavelength $\lambda 2$ depending on the change in $\eta$ and $\delta$.
Figure 34:
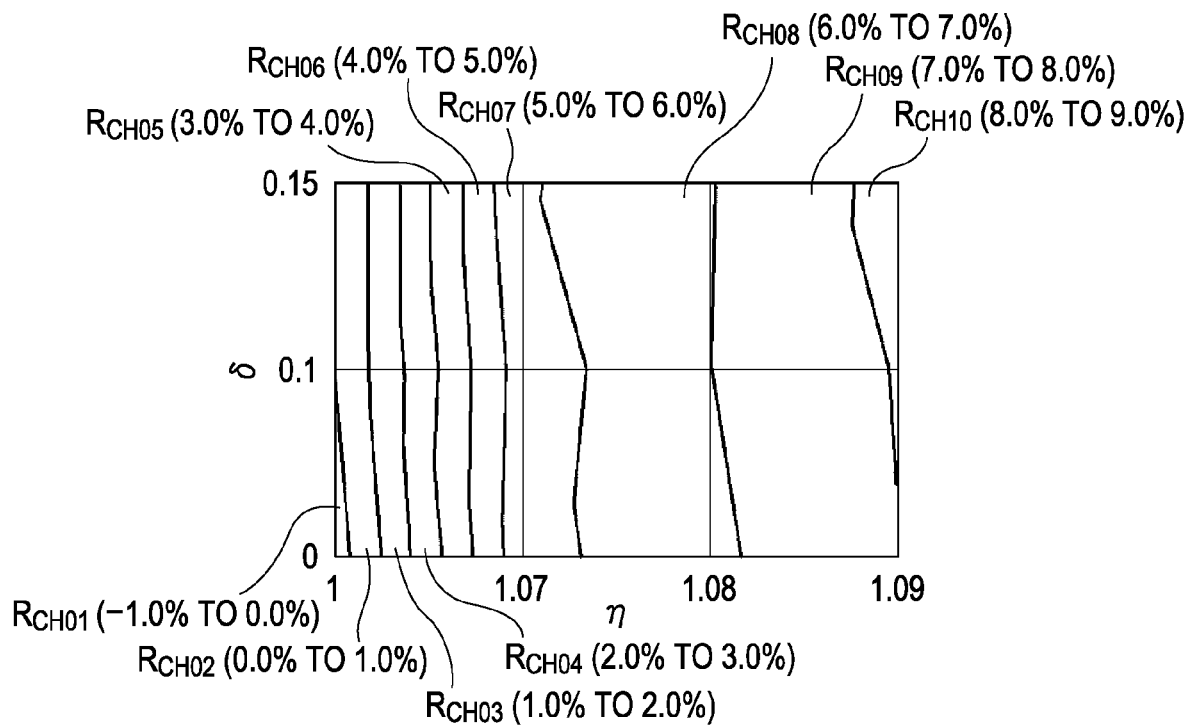
FIG. 34 is a diagram illustrating distribution of amounts of change in relative efficiencies of the third wavelength $\lambda 3$ depending on the change in $\eta$ and $\delta$.

If the relationship of the efficiency is represented as a 2-dimensional map relating to η and δ, it is the same as shown in FIGS. 29 to 34. FIG. 29 is a diagram illustrating the BD TYP efficiencies, that is, the distribution of the diffraction efficiencies of the maximum diffraction order of the first wavelength corresponding to the BD and the like in the environment-basis state. Here, the diffraction efficiency in the environment-basis state means the diffraction efficiency at the temperature and wavelength as a design basis determined in consideration of the estimated changes in temperature and wavelength. Specifically, here, the temperature thereof is set to 35° C., and the wavelength thereof is set to 405 nm. FIG. 30 is a diagram illustrating the DVD TYP efficiencies, that is, the distribution of the diffraction efficiencies of the maximum diffraction order of the second wavelength corresponding to the DVD and the like in the environment-basis state. FIG. 31 is a diagram illustrating the CD TYP efficiencies, that is, the distribution of the diffraction efficiencies of the maximum diffraction order of the third wavelength corresponding to the CD and the like in the environment-basis state. FIG. 32 shows the BDFake1MAX, that is, the distribution of the diffraction efficiency of the first unwanted light with the first wavelength. FIG. 33 shows the DVDFake1MAX, that is, the distribution of the diffraction efficiency of the first unwanted light with the second wavelength. FIG. 34 shows the change in CD efficiency, that is, the distribution of the change in relative efficiency of the third wavelength.

In FIGS. 29 to 34, the horizontal axis represents the duty ratio η, and the vertical axis represents the amount of slope δ. In FIG. 29, the $R_{BT01}$ to $R_{BT06}$ represents the distribution in the range of the diffraction efficiency % in the environment-basis state of the first wavelength λ1. In addition, the $R_{BT01}$ represents the range of 96% to 98%, the $R_{BT02}$ represents the range of 94% to 96%, the $R_{BT03}$ represents the range of 92% to 94%, the $R_{BT04}$ represents the range of 90% to 92%, and the $R_{BT05}$ represents the range of 88% to 90%. In addition, the $R_{BT06}$ represents the range of 86% to 88%.

In FIG. 30, the $R_{DT01}$ to $R_{DT08}$ represents the distribution in the range of the diffraction efficiency % in the environment-basis state of the second wavelength λ2. In addition, the $R_{DT01}$ represents the range of 79% to 81%, the $R_{DT02}$ represents the range of 77% to 79%, the $R_{DT03}$ represents the range of 75% to 77%, the $R_{DT04}$ represents the range of 73% to 75%, and the $R_{DT05}$ represents the range of 71% to 73%. In addition, the $R_{DT06}$ represents the range of 69% to 71%, and the $R_{DT07}$ represents the range of 67% to 69%, and the $R_{DT08}$ represents the range of 65% to 67%.

In FIG. 31, the $R_{CT01}$ to $R_{CT11}$ represents the distribution in the range of the diffraction efficiency % in the environment-basis state of the third wavelength λ3. In addition, the $R_{CT01}$ represents the range of 65% to 67%, the $R_{CT02}$ represents the range of 63% to 65%, the $R_{CT03}$ represents the range of 61% to 63%, the $R_{CT04}$ represents the range of 59% to 61%, and the $R_{CT05}$ represents the range of 57% to 59%. Further, the $R_{CT06}$ represents the range of 55% to 57%, the $R_{CT07}$ represents the range of 53% to 55%, the $R_{CT08}$ represents the range of 51% to 53%, the $R_{CT09}$ represents the range of 49% to 51%, the $R_{CT10}$ represents the range of 47% to 49%, and the $R_{CT11}$ represents the range of 45% to 47%.

In FIG. 32, the $R_{BF01}$ to $R_{BF11}$ represents the distribution in the range of the diffraction efficiency % of the unwanted diffracted light with the first wavelength $\lambda 1$. In addition, the $R_{BF01}$ represents the range of 1.0% to 1.5%, the $R_{BF02}$ represents the range of 1.5% to 2.0%, the $R_{BF03}$ represents the range of 2.0% to 2.5%, the $R_{BF04}$ represents the range of 2.5% to 3.0%, and the $R_{BF05}$ represents the range of 3.0% to 3.5%. Further, the $R_{BF06}$ represents the range of 3.5% to 4.0%, the $R_{BF07}$ represents the range of 4.0% to 4.5%, the $R_{BF08}$ represents the range of 4.5% to 5.0%, the $R_{BF09}$ represents the range of 5.0% to 5.5%, and the $R_{BF10}$ represents the range of 5.5% to 6.0%. Further, the $R_{BF11}$ represents the range of 6.0% to 6.5%.

In FIG. 33, the $R_{DF01}$ to $R_{DF11}$ represents the distribution in the range of the diffraction efficiency % of the unwanted diffracted light with the second wavelength $\lambda 2$. In addition, the $R_{DF01}$ represents the range of 1.0% to 2.0%, the $R_{DF02}$ represents the range of 2.0% to 3.0%, the $R_{DF03}$ represents the range of 3.0% to 4.0%, the $R_{DF04}$ represents the range of 4.0% to 5.0%, and the $R_{DF05}$ represents the range of 5.0% to 6.0%. Further, the $R_{DF06}$ represents the range of 6.0% to 7.0%, the $R_{DF07}$ represents the range of 7.0% to 8.0%, the $R_{DF08}$ represents the range of 8.0% to 9.0%, the $R_{DF09}$ represents the range of 9.0% to 10.0%, and the $R_{DF10}$ represents the range of 10.0% to 11.0%. Further, the $R_{DF11}$ represent the range of 11.0% to 12.0%.

In FIG. 34, the $R_{CH01}$ to $R_{CH10}$ represents the distribution in the range of the amount of change in relative efficiency of the third wavelength $\lambda 3$. In addition, the $R_{CH01}$ represents the range of -1% to 0%, the $R_{CH02}$ represents the range of 0% to 1%, the $R_{CH03}$ represents the range of 1% to 2%, the $R_{CH04}$ represents the range of 2% to 3%, the $R_{CH05}$ represents the range of 3% to 4%, and the $R_{CH06}$ represents the range of 4% to 5%. Further, the $R_{CH07}$ represents the range of 5% to 6%, the $R_{CH08}$ represents the range of 6% to 7%, the $R_{CH09}$ represents the range of 7% to 8%, and the $R_{CH10}$ represents the range of 8% to 9%.

By extrapolating the above-mentioned tendencies of FIGS. 29 to 34, the portion corresponding to the BD efficiency of 86% is calculated. In this case, it is inferred that $\delta<0.15$.

Further, from the amount of change in efficiency of CD, it is inferred that $\eta<1.11$. The reason is that, as can be seen from the distribution of the efficiency of the BD shown in FIG. 29, the efficiency is less likely to depend on $\eta$, and tends to depend on $\delta$. Further, the reason is that, as can be seen from FIG. 34 which shows the amount of change in efficiency of the CD, the amount of change in efficiency of the CD tends to depend on $\eta$, and thus it can be estimated that $\eta<1.11$ from the distribution in the drawing.

In order to verify the conditions $\delta<0.15$ and $\eta<1.11$ which can be estimated from the tendency of FIGS. 29 to 34, Tables 3 and 4 show the example, in which $\delta=0.15$ and $\eta=1.11$, as a "$\eta \cdot \delta$ limit configuration". Here, Table 3 shows the design parameters, and Table 4 shows efficiencies and signal ratios of the respective configuration examples. Here, the depth of the $\eta \cdot \delta$ limit configuration is 5180 nm. At this time, the change in efficiency of the CD reaches -10% on the long-wavelength high-temperature side (+5 nm, and 70° C.), and it becomes the limit. Here, assuming that the total depth of the diffraction structure is d and the original depth of the overlapping target is d0, the following relationship is substantially satisfied: $d=(1+\delta/(s+1))d0$. Actually, for the overall optimization, it is preferable that practically the total depth should be adjusted by adding balance in the unwanted light to the diagram plotted similarly to FIG. 17.

TABLE 3

PARAMETERS OF DESIGNS

| | $\eta$ | $\delta$ | $\delta m$ | $\delta s$ | m | TOTAL DEPTH [nm] |
|---|---|---|---|---|---|---|
| STANDARD CONFIGURATION | 1 | 0 | — | — | — | 5000 |
| IMPROVED STEP-WIDTH CONFIGURATION | 1.09 | 0 | — | — | — | 5030 |
| IMPROVED SLOPE-APPLIED CONFIGURATION | 1.09 | 0.1 | — | — | — | 5110 |
| DOUBLE SLOPE CONFIGURATION | 1.09 | 0.2 | — | — | — | 5090 |
| SLOPE-COMBINATION-APPLIED CONFIGURATION | 1.09 | — | 0.03 | 0.06 | 2 | 5090 |
| $\eta \cdot \delta$ LIMITATION CONFIGURATION | 1.1 | 0.15 | — | — | — | 5180 |

TABLE 4

UNWANTED DISTANT SIGNAL POSITION AND SYNTHESIZED SIGNAL VALUE

| | TYP EFFICIENCY [%] | | | MAXIMUM UNWANTED ADJACENT SIGNAL [%] | | MAXIMUM UNWANTED DISTANT SIGNAL (-5TH ORDER) | | MAXIMUM UNWANTED DISTANT SIGNAL (-12ND ORDER) |
|---|---|---|---|---|---|---|---|---|
| | | | | | | RATIO OF UNWNTED DISTANT SIGNAL/SURFACE | AIR-CONVERTED LONG DISTANCE | RATIO OF UNWANTED DISTANT SIGNAL/SURFACE |
| | BD | DVD | CD | BD | DVD | SIGNAL | [um] | SIGNAL |
| STANDARD CONFIGURATION | 97 | 62 | 52 | 3.9 | 13.7 | 22% | 29 | 0% |
| IMPROVED STEP-WIDTH CONFIGURATION | 97 | 69 | 45 | 2.7 | 1.7 | 57% | | 0% |
| IMPROVED SLOPE-APPLIED | 91 | 76 | 54 | 1.9 | 1.8 | 162% | | 18% |

TABLE 4-continued

UNWANTED DISTANT SIGNAL POSITION AND SYNTHESIZED SIGNAL VALUE

| | TYP EFFICIENCY [%] | | | MAXIMUM UNWANTED ADJACENT SIGNAL [%] | | MAXIMUM UNWANTED DISTANT SIGNAL (-5TH ORDER) | | MAXIMUM UNWANTED DISTANT SIGNAL (-12ND ORDER) |
|---|---|---|---|---|---|---|---|---|
| | | | | | | RATIO OF UNWNTED DISTANT SIGNAL/SURFACE SIGNAL | AIR-CONVERTED LONG DISTANCE [um] | RATIO OF UNWANTED DISTANT SIGNAL/SURFACE SIGNAL |
| | BD | DVD | CD | BD | DVD | | | |
| CONFIGURATION DOUBLE SLOPE CONFIGURATION | 94 | 71 | 48 | 2.3 | 1.7 | 77% | | 44% |
| SLOPE-COMBINATION-APPLIED CONFIGURATION | 89 | 72 | 49 | 1.9 | 1.6 | 115% | | 14% |
| η·δ LIMITATION CONFIGURATION | 86 | 80 | 53 | 1.6 | 1.2 | — | | |

As described above, the first diffraction structure provided on the first diffraction region 51 shown in FIG. 8A is able to keep the BD efficiency high by suppressing the unwanted light of the BD in a way that the δ representing the amount of slope is made to satisfy the condition: $0<\delta<0.15$, and is also able to keep CD efficiency high. Further, with the δ, assuming that the height of the multi-step diffraction structure is d0, d0×δ is defined as the sum of the slope heights applied by the blazed structure during a single period of the multi-step diffraction structure. Further, as described later, when the period of the overlapped blazed structure is m times the period of the multi-step diffraction structure, it is possible to obtain the effect of causing the amount of slope δ to satisfy the condition: $0<\delta<0.15/m$. Further, the first diffraction structure provided on the first diffraction region 51 shown in FIG. 8A is able to suppress the amount of change in efficiency at the time of the change in temperature of the CD by setting the η, which represents the duty ratio, to satisfy the condition: $0<\eta<1.11$.

Double-Slope Structure

Figure 35A:
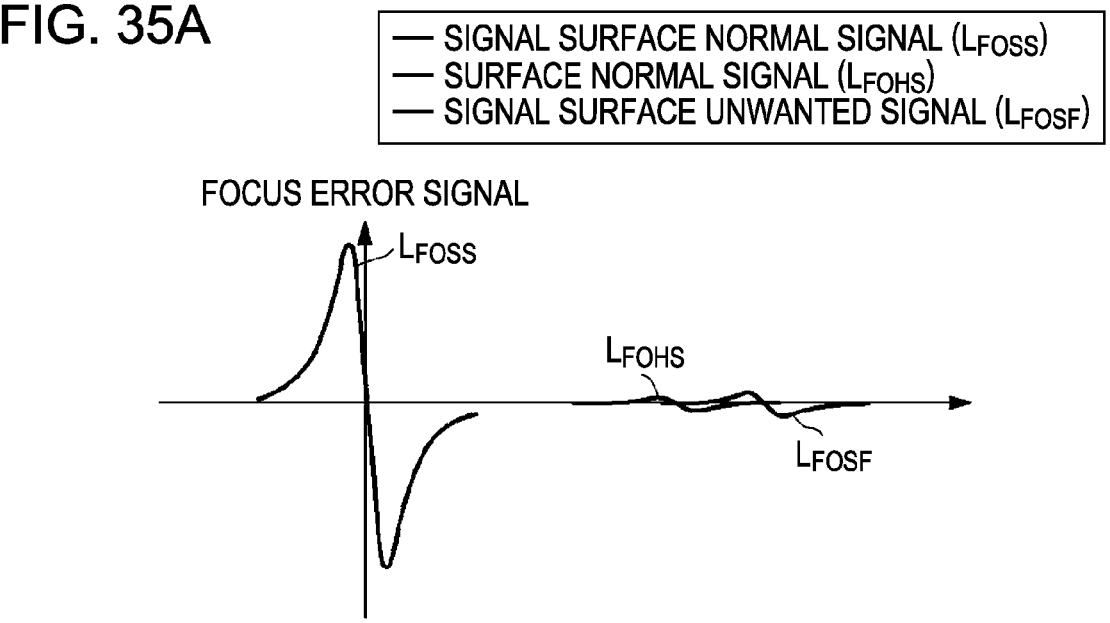
FIGS. 35A and 35B are diagrams illustrating synthesized signals and focus error signals in the light sensing element at the time of focus search.
Figure 35B:
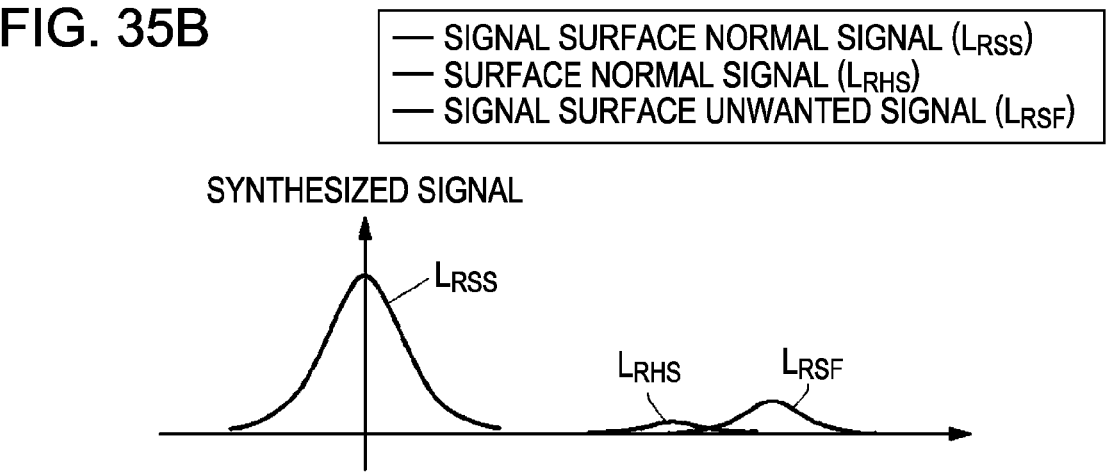

Here, a modified example of the above-mentioned improved slope-applied configuration is described. Further, the problems described below can be improved by the system of the optical disc apparatus, but in the case of the later-described "double-slope structure", those can be solved by the diffractive portion. However, the above-mentioned diffraction grating structure improves most of the characteristics, but another unwanted light is generated by the effect of reducing the diffraction efficiency of the main light in the BD. FIGS. 35A and 35B show the schematic diagrams thereof. FIG. 35A shows the focus error signal at the time of focus search, where the $L_{FOSS}$ represents the signal surface regular signal, the $L_{FOHS}$ represents the surface regular signal, and the $L_{FOSF}$ represents the signal surface unwanted signal. FIG. 35B shows the synthesized signal at the time of focus search, where the $L_{RSS}$ represents the signal surface regular signal, the $L_{RHS}$ represents the surface regular signal, and the $L_{RSF}$ represents signal surface unwanted signal. It can be seen from FIGS. 35A and 35B that the unwanted signal on the right side of the surface regular signal is generated from the signal surface. The signal is likely to interfere with the surface signal when the surface signal is intended to be recognized during the focus search, and thus there is a demand for minimization of the unwanted signal. Hereinafter, this problematic signal is referred to as the "unwanted distant signal". In the above-mentioned slope structure shown in FIG. 8A, the relationship between the unwanted distant signal and the unwanted adjacent signal of the BD is a trade-off, and it is difficult to solve them both. Practically, the above-mentioned Tables 3 and 4 show the amount of the unwanted distant signal of the worst temperature characteristics in the environmental change at that time. In Table 4, the amount of the unwanted distant signal is normalized on the basis of the amount of the surface signal. In addition, the reflectance at the time is estimated as a value in the case of one-layer media of the BD. In Table 4, the value of the synthesized signal of the unwanted distant signal is larger than that of the surface signal, and the position thereof is not so deviated. This is likely to have an effect on the focus search.

Figure 36:
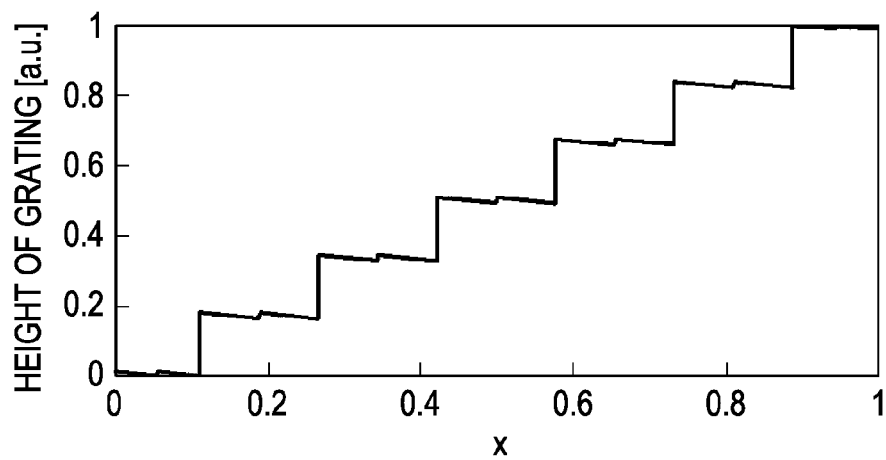
FIG. 36 is a diagram illustrating an improved double-slope-applied configuration which is an improved configuration different from the improved slope-applied configuration shown in FIG. 24, and illustrating a relationship between the height of grating and the radial position of the diffraction structure during the single period in the improved double-slope-applied configuration.

One of the methods of solving the problem is a method of using the structure in which the above-mentioned slopes are doubled (hereinafter referred to as the "improved double-slope-applied configuration"). This example is shown in FIG. 36. The amount of slope in FIG. 36 is the sum of heights of the slope portions applied when the entirety is set to 1 in advance. Specifically, in FIG. 36, the δ is equal to 0.2, the duty ratio η is equal to 1.09, and the total depth is equal to 5090 nm. Tables 3 and 4 show the values of efficiencies at the time. It can be seen from Table 4 that the effect of the unwanted distant signal is reduced, and then the unwanted adjacent light is reduced with a balance. In this case, here, it is assumed that the number of the periodic structures is doubled, but the number may be tripled or quadrupled.

In the double-slope structure, the ratio of the unwanted distant signal generated at a more distant position increases. Thus, a device may be necessary for some operations. Further, in the case where the double slopes are formed, it is difficult to deny that the various risks in formation are likely to occur in practice. The multi-period slope structure for solving this point is described as follows.

Figure 37A:
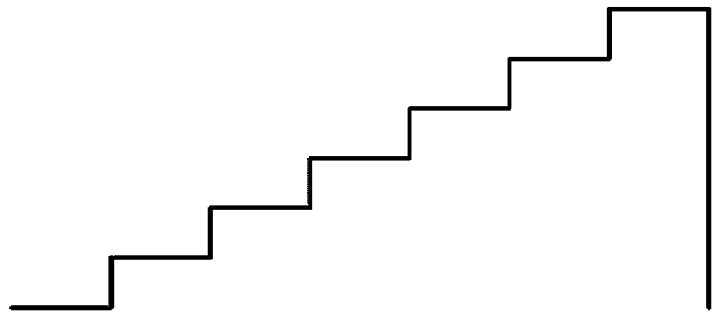
FIGS. 37A to 37D are diagrams illustrating the improved double-slope-applied configuration, where
Figure 37B:
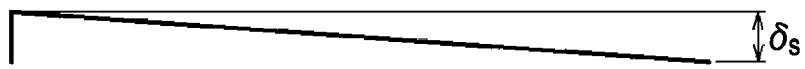
Figure 37C:
Figure 37D:
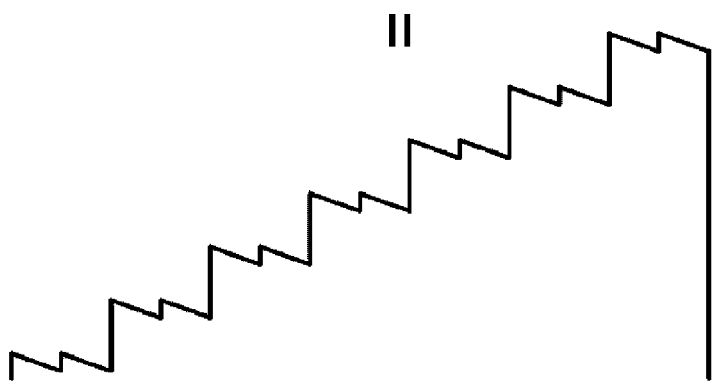

The double-slope structure has a structure shown in FIG. 37D in which the blaze shown in FIG. 37B and the binary shown in FIG. 37C are overlapped with the step shown in FIG. 37A. In the case of the non-equidistant configuration, the steps each having the binary overlapped therewith are formed not to be equally spaced, and thus can be formed by overlapping the blaze therewith. At this time, as shown in FIG. 36, in order to make the heights of the slopes equivalent, and in FIGS. 37A to 37D, the following expression is established: $\delta s=(s+1)\delta b$. Here, s is the number of steps. Further, the total height of slopes δ is represented by δs and δb as the following expression: $\delta=\delta s+(s+1)\delta b$. In particular, as shown in FIGS. 37A to 37D, if the heights of the slopes are equivalent, $\delta$ is equal to $2\delta s$.

As described above, instead of the diffraction structure shown in the above-mentioned FIG. 8A, the diffraction structure of the double-slope structure shown in FIGS. 36 and 37D may be configured to be formed as the first diffraction structure provided on the first region 51 constituting the diffractive portion 50. The first diffraction structure is configured so that the diffraction structure having an orbicular zone shape centered on the optical axis is provided on the reference surface. In addition, the first diffraction structure shown in FIGS. 36 and 37D is formed as the slope-applied multi-step diffraction structure, and is formed as a structure in which the direction of the slopes increases in the direction opposite to the direction of increasing the heights of the steps. The first diffraction structure is a structure in which, as described above in FIGS. 37A to 37D, one blazed structure is overlapped with the multi-step diffraction structure and the binary structure is further overlapped therewith. Further, in FIGS. 37A to 37D, the overlapping is performed on the equidistant multi-step diffraction structure, but may be performed on the non-equidistant multi-step diffraction structure in which the widths are formed not to be equivalent. In this case, the binary structure is formed as a non-equidistant binary structure corresponding to the widths of the steps of the multi-step diffraction structure. In other words, the width of the single period of the concave and convex portions in the binary structure are configured to coincide with the width of each step of the non-equidistant multi-step diffraction structure, and the widths of the concave portion and the convex portion thereof are the same in the single period.

In addition, the limit of the $\eta$ and $\delta$ in the double-slope structure is calculated with a simple manner on the basis of the above-mentioned normal slope. First, in FIGS. 29 to 34, in the case where $\eta=1$, the point at which the depth is optimized is not detected, and thus the depth set temporarily is used. Accordingly, the point is negligible in estimation of the relationship between $\eta$ and $\delta$. From this result, it can be regarded that, as to the effects of $\eta$ and $\delta$, those are almost independent respectively. First, considering the amount of change in the temperature characteristic efficiency of the CD, this strongly depends on the $\eta$, but scarcely depends on the $\delta$. As a result, similarly to the above-mentioned normal slope, the level capable of maintaining the amount of change of 10% satisfies the following condition: $\eta<1.11$. Next, the $\delta$ has no effect on the regular diffracted light and the adjacent order light in practice since the binary is excessively fine in this configuration. That is, only the blaze portion contributes to $\delta$. Accordingly, the following condition is satisfied: $\delta s<0.15$. When the heights of the slopes are the same, the following condition is also satisfied: $\delta=2\delta s<0.3$.

As described above, the first diffraction structure shown in FIG. 37D is able to reduce sufficiently the unwanted light of the BD by using the improved double-slope-applied configuration while keeping the CD efficiency high, is also able to reduce the unwanted distant signal, and is thus able to prevent the adverse effect at the time of the focus search. Further, by combining the improved double-slope-applied configuration with the improved step-width configuration, it is possible to reduce the efficiency of the unwanted light at the environmental change, and thus it is possible to reduce, in particular, the unwanted light of the DVD. The diffractive portion 50 and the objective lens 34 having the first diffraction structure as described above is configured to prevent the servo from becoming unstable due to an increase of the unwanted diffracted light, which is generated by the diffractive portion, caused by the change in temperature and wavelength. Accordingly, the diffractive portion 50 and the objective lens 34 prevents recording and reproducing characteristics from being deteriorated, thereby achieving favorable recording and reproducing characteristics, that is, thereby achieving three-wavelength compatibility with a simple and accessible configuration.

Multi-Period Slope Structure

Figure 38A:
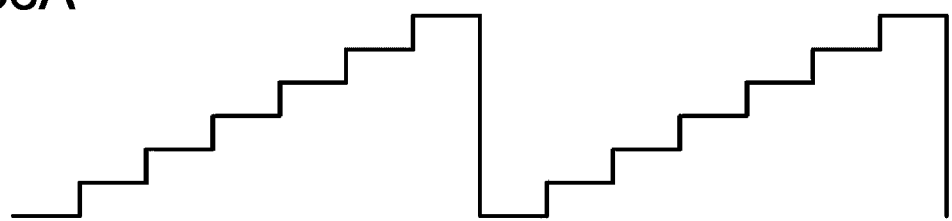
FIGS. 38A to 38C are diagrams illustrating an example of the improved slope-applied configuration with which the double-period blazed structure is overlapped, where
Figure 38B:
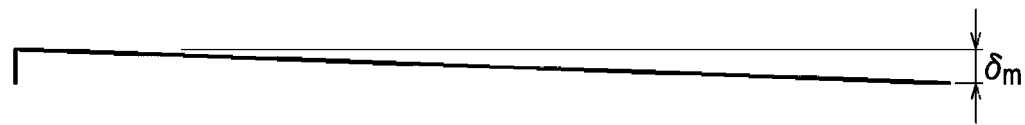
Figure 38C:
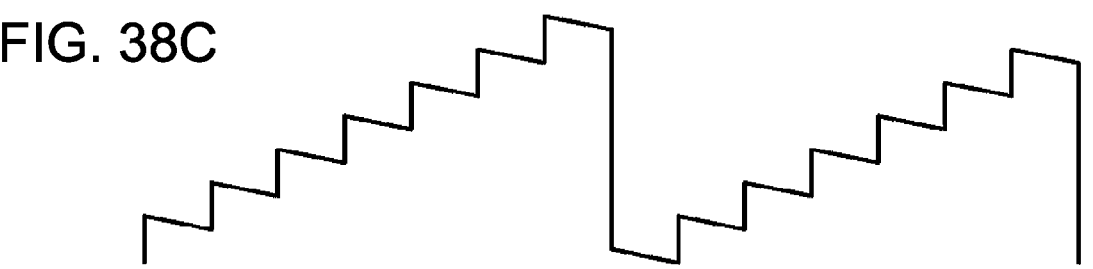
Figure 39A:
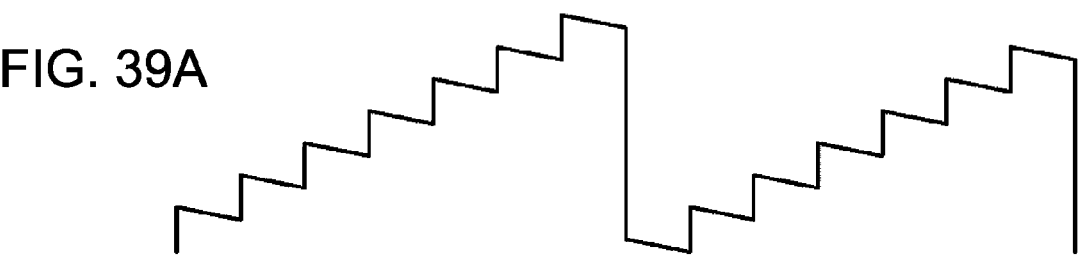
FIGS. 39A to 39C are diagrams illustrating an improved slope-combination-applied configuration as a yet another improved configuration, where
Figure 39B:
Figure 39C:
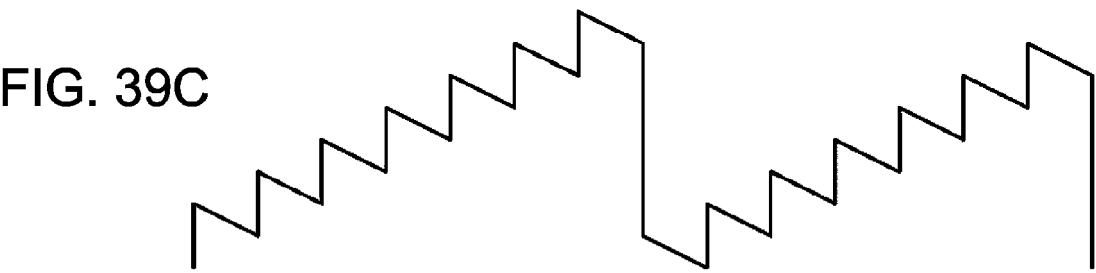

FIGS. 38A to 38C show the slope structure throughout multiple periods. This structure is formed as a structure in which the heights relative to x, for example, throughout two periods are added. That is, the double-period blazed structure shown in FIG. 38B is overlapped with the multi-step diffraction structure shown in FIG. 38A, and thus it is possible to obtain the slope-applied structure shown in FIG. 38C. The diffraction structure shown in FIGS. 38A to 38C is referred to as the multi-period improved slope-applied configuration. The effect at the time is that it is possible to reduce the unwanted adjacent signal of the BD without increasing the unwanted distant signal. Generally, when only the structure is used, the effect of reduction in the unwanted adjacent signal of BD is less, and thus the structure is used together with the general slope structure. This is shown in FIGS. 39A to 39C. That is, by overlapping the blazed structure, which has the same period as the multi-step diffraction structure shown in FIG. 39B, with the diffraction structure of FIG. 39A the same as the diffraction structure of FIG. 38C, it is possible to obtain the slope-combination-applied structure shown in FIG. 39C. The amount of slope at the time is defined by two parameters of the amount of slope $\delta m$ for multiple periods and the amount of slope $\delta s$ for a single period. For example, if the $\delta m$ is equal to 0.03, the $\delta s$ is equal to 0.06, the $\eta$ is equal to 1.09, and the depth is equal to 5090 nm, provided is the two unit shape shown in FIG. 40. Hereinafter, this is referred to as the "improved slope-combination-applied configuration". The efficiencies at the time are shown in the above-mentioned Tables 3 and 4. As the unwanted adjacent signal is reduced, the unwanted distant light is also reduced, and thus the problem of the unwanted distant light is further reduced. Further, in the case of the structure, the tendency of increasing the sum of both directions of the slopes in the direction opposite to the direction of increasing the steps is invariant.

Figure 40:
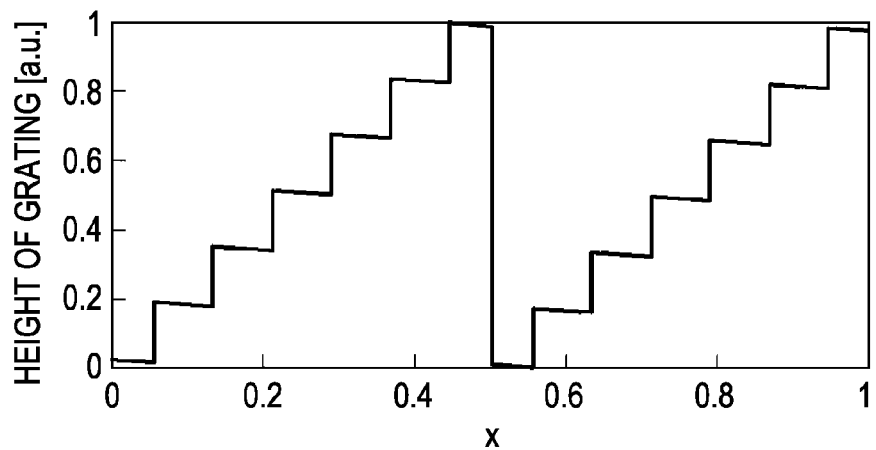
FIG. 40 is a diagram illustrating the improved slope-combination-applied configuration, which is shown in FIGS. 39A to 39C as a yet another improved configuration and illustrating a relationship between the height of the grating and the radial position of the diffraction structure during the single period in the improved slope-combination-applied configuration.

As described above, instead of the diffraction structure shown in the above-mentioned FIG. 8A and 37D, the diffraction structure of the improved slope-combination-applied configuration shown in FIGS. 39C and 40 may be configured to be formed as the first diffraction structure provided on the first region 51 constituting the diffractive portion 50. The first diffraction structure is configured so that the diffraction structure having an orbicular zone shape centered on the optical axis is provided on the reference surface. In addition, the first diffraction structure shown in FIGS. 39C and 40 is formed as the slope-applied multi-step diffraction structure, and is formed as a structure in which the direction of the slopes increases in the direction opposite to the direction of increasing the heights of the steps. In the first diffraction structure, as described above in FIGS. 38A to 40, the two blazed structures are overlapped with the multi-step diffraction structure. The two blazed structures include the blazed structure of the period the same as the period of the multi-step diffraction structure and the blazed structure of the period equal to the integer multiple of the period of the multi-step diffraction structure. Here, in the case where the values are set as follows, the following relational expression is satisfied: $0<\delta m \times m+\delta s<0.15$. That is, in the blazed structure of the integer multiple period, it is assumed that the integer is m. Assuming that the height of the multi-step diffraction structure is d0, the sum of the heights of the slopes applied by the blazed structure of the period equal to the single period of the multi-step diffraction structure is represented by d0×δs. Further, the sum of the heights of the slopes, which are applied by the blazed structure of the period equal to the integer multiple of the single period of the multi-step diffraction structure, is represented by d0×δm.

In addition, the limit of the η and δ in the slope-combination-applied structure is the same as that of the above-mentioned double-slope. That is, regarding η, similarly to the general slope, the following condition is established: η<1.11. Further, regarding δ, the structure of the period of m multiples is employed herein. This shape is a sawtooth wave, and thus the Fourier series expansion is performed, the following expression (5) is satisfied. This represents that, as compared with the sawtooth wave having a certain period T0, the T0 period component in the sawtooth wave having an m multiple period m×T0 is equal to the m multiple thereof. For this reason, in the case of the sawtooth wave of the m multiple period, in order to obtain the same unwanted light reduction effect as the case of the period T0, the 1/m depth is necessary. On the other hand, since the δs having one multiple period is considered similarly to the general slope, by adding the same component as the T0 of each sawtooth wave, the following condition is established: 0<δm×m+δs<0.15. In particular, in the case where δs=0, the following condition is satisfied: 0<δm<0.15/m.

$$f(x) = \sum_{a=1}^{\infty} \frac{\sin(ax)}{a} \quad (5)$$

Regarding Other Application Structures

As another application structure, there is a structure which is able selectively to adjust the efficiency and the unwanted light level by changing the amounts of the slopes of the several steps. For example, by tilting the slopes of only the first and seventh steps by δ of 0.1 and making the second to sixth steps horizontal, the design thereof can be made so that the above-mentioned unwanted distant light is remarkably reduced, and then the unwanted light of the DVD is suppressed to a certain extent. The reason is that, even when the amounts of slopes applied to the steps are equivalent, the unwanted light reduction effects of the respective steps are different from each other. As mentioned above, the unwanted distant light is generated in the "improved slope-applied configuration", and thus a method of reducing the unwanted distant light is considered. Even when the first and seventh steps are made to be substantially horizontal, the unwanted distant light is not reduced. On the other hand, when the second to sixth steps are made to be horizontal, all the unwanted distant light is reduced. That's why the structure is configured selectively to reduce the unwanted distant signal. Further, in the second and sixth steps, the first unwanted light tends to be generated more frequently, in the fourth step, the second unwanted light tends to be generated more frequently. Further, in the third and fifth steps, both are generated with the same frequency. By using this characteristic, it is possible to balance the respective unwanted light, and thus it is possible to perform more optimal design. For example, when the improved slope-applied configuration is intended to be further improved, the amounts of slopes of the second and sixth steps may be increased (1.25 times), and the amount of the slope of the fourth step may be reduced (0.5 times). In such a manner, it may be possible to reduce the high-temperature long-wavelength first unwanted light shown in FIG. 27.

Regarding Unit Period

Further, in each case of the BD, the DVD, and the CD, the level difference of around 7300 nm serving as an optical path difference of the integer multiple wavelength may be added for each period. With such a configuration, the unit period may be changed, and sometimes the unit period seems not to exist.

Relationship with Overlap Structure

As described above, it can be regarded that, in the slope-applied multi-step diffraction structures shown in FIGS. 8A to 8C and 23A to 23C and FIGS. 36 to 39C, the slope is overlapped with the multi-step diffraction structure. That is, in the slope-applied multi-step diffraction structure, since there is no particular restriction on the period itself of the applied slope, it can be inferred that the blaze diffraction structure in which BD:DVD:CD=0:0:0th order with a phase difference function equal to 0 is overlapped. In this method, the structure, which has the different phase difference function, is not overlapped, but the blaze, which does not have the phase difference function, is overlapped. Hence, it is possible effectively to improve the various problems in the configuration in which the structure having the phase difference function is overlapped.

Here, as the above-mentioned problems, the first to third problems are described. First, in the overlap structure having the different phase difference functions, it is theoretically difficult to avoid an increase in depth of the diffraction structure, and thus this tends to cause various problems. As the depth increases, the simulated amount of change in depth due to the changes in wavelength and temperature increases, and thus the environmental resistance is deteriorated. Further, a problem may also arise in that it is difficult to obtain the desirable efficiency because of the difficulty in formation. Second, when the structure having the different phase difference function is overlapped, the gap between the phases given by the above-mentioned phase shape and the diffraction grating increases. The gap increases more remarkably as the shape is more complicated, and thus the efficiency is theoretically lowered by that amount. Third, when the structure having the different phase difference function is overlapped, it is difficult to separate the shapes of the obtainable efficiency and phase difference function. For this reason, a large number of design processes is necessary in order to obtain the desirable values. The change according to the method has no influence on the design order, and thus it is easy to change the design.

In order to solve the above-mentioned problems, it is preferable that the phase difference function of approximately 0 should be given so as not to change the phase state macroscopically. Hence, in the case of the blaze, the absolute value of the order of BD should be 1 or less. In the case of the first order of BD, the height of the blaze satisfies the following expression: h=λ/(n−1). Thus, the height of the overlapped blaze for forming the above-mentioned slope-applied multi-step diffraction structure satisfies the following expression: h<λ/(n−1). Here, assuming that the total depth of the diffraction structure is d and the original depth of the overlapping target is d0, the following relationship is satisfied: d≅(1+δ/(s+1))d0. In addition, when the height h is represented in terms of the δ mentioned above, the following expression is satisfied: h=δd0≅δd/(1+δ/(s+1)).

Further, in the configuration of the above-mentioned diffraction structure, in order to achieve the object of reduction in unwanted adjacent signals, the blaze having the predetermined height is overlapped in the predetermined slope direction. In view of this point, the configuration is different from other configurations in which the slope is provided only for the efficiency. In other words, in the case where the diffraction structure is formed only to increase the efficiency in the BD, the slope direction is set to be the same direction as the multi-step structure serving as a base. However, the slope-applied multi-step diffraction structure has such a configuration in that the unwanted signal is reduced unless the slope direction is set to be opposite to the direction of the multi-step structure serving as a base. That is, in the first diffraction region 51 of the diffractive portion 50 constituting the objective lens according to the embodiment of the invention, it is necessary for the slope direction of the slope-applied multi-step diffraction structure to be an increasing direction opposite to the direction of increasing heights of the steps thereof.

Regarding Slope Relative to Other Orders

In the above description, the respective diffraction orders in the inner orbicular zone are set to satisfy the following relationship: (BD:DVD:CD)=(1:−2:−3), but the different orders may be selected. For example, the same effects can be obtained from the following settings: (BD:DVD:CD)=(1:−1:−2); (0:−1:−2); (0:−2:−3); (2:−1:−2); (1:−3:−4); and the like. The blaze of (2:1:1) may be overlapped with the respective orders, and the same thing may be performed. Therefore, it may be allowed to use the following settings: (3:0:−1); (2:0:−1); (2:−1:−2); (3:0:−1); (3:−2:−3); and the like. However, in any case, it is preferable that the direction of blaze should be a decreasing direction opposite to the direction of increasing the steps thereof. The reason is that the adjacent relationship between the adjacent order and the use order is the same for all the structures (if the relationship is strong, the unwanted light with positive orders is generated), and in this case, it is difficult to reduce the unwanted light of the BD unless the reversed blaze is applied.

Diffraction Structure of Real lens

Figure 41B:
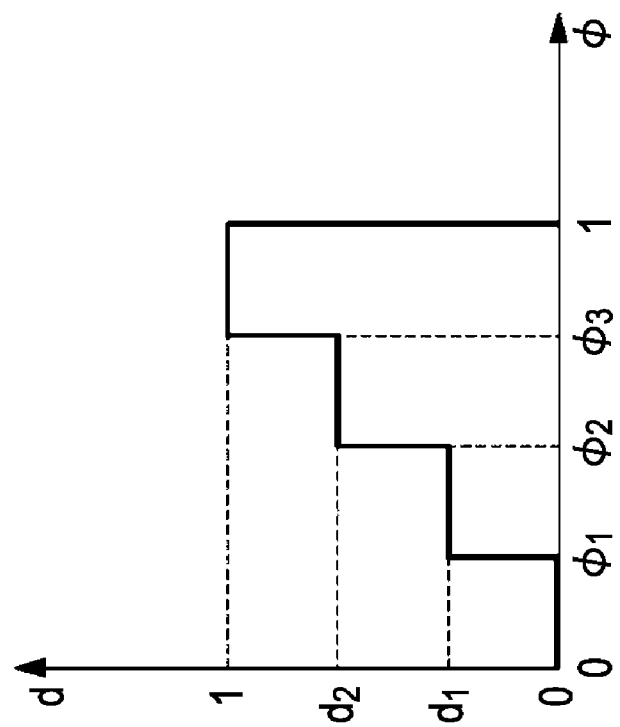
FIGS. 41A and 41B are diagrams illustrating a method of determining the depths of the steps and the radial positions at the boundaries between the steps of a diffraction structure in the improved configuration, and illustrating preliminary conversion.
Figure 41A:
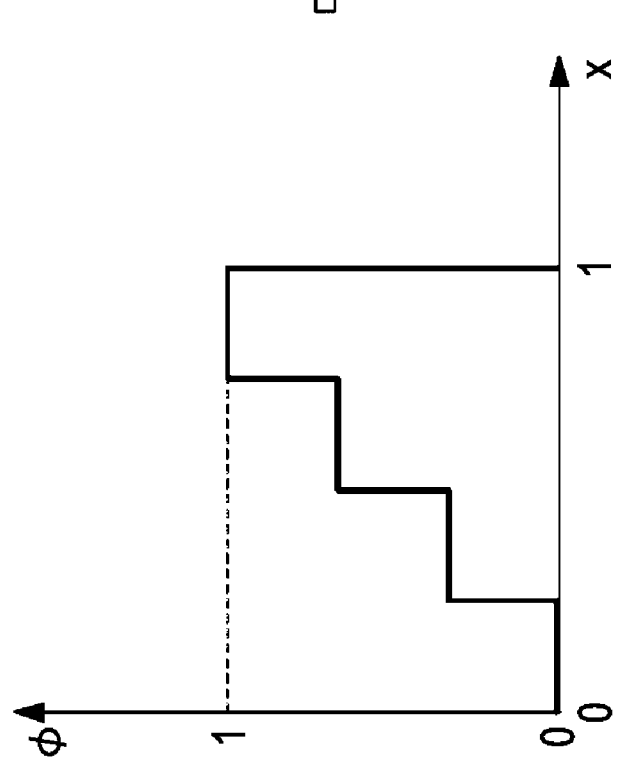

A method of transferring, for example, the basic diffraction structure of FIGS. 24A to 24D, which is designed and formed in the above-mentioned method, to a lens is described. First, in the shape of FIGS. 24A to 24D, x defined as the horizontal axis and the depth d defined as the vertical axis are directly converted into the phase φ defined as the horizontal axis and the depth d defined as the vertical axis, thereby holding the coordinates (φn, dn) of each node point. The reason is that the shape of FIGS. 24A to 24D represents the linear phase of φ=x and thus the horizontal axis may be practically changed into the phase. FIGS. 41A and 41B show the above-mentioned method. Specifically, FIG. 41A is a diagram corresponding to FIG. 24A, in which the horizontal axis represents the radial position x and the vertical axis represents the phase φ. In FIG. 41B, instead, the horizontal axis represents phase φ and the vertical axis represents the depth d while holding the coordinates of the tangent points.

Next, depending on the diffractive portion of the lens (hereinafter referred to as the "diffractive lens") provided with the diffractive portion, the phase difference function φ to be given is determined. The phase φ is represented, in terms of the phase difference function coefficient Ci, by the following expression (6).

$$\phi = k \sum_{i=1}^{j} \frac{C_i r^{2i}}{\lambda_0} \tag{6}$$

Here, the $\lambda_0$ represents the manufacture wavelength, the k represents the diffraction order, and the r represents the radial position of the lens. The φ represents the phase at the design wavelength $\lambda_0$, and thus it is completely the same as the phase which is given in terms of φ' and φ by the following expression (7). Here, l is an integer.

$$\phi' = \phi - l \tag{7}$$

Figure 42A:
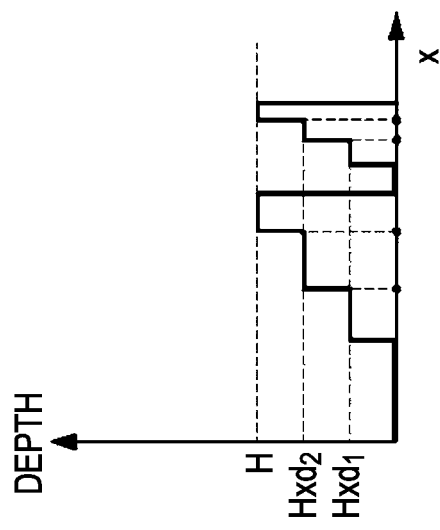
FIGS. 42A to 42C are diagrams illustrating a method of determining the depths of the steps and the radial positions at the boundaries between the steps of a diffraction structure in the improved configuration.
Figure 42B:
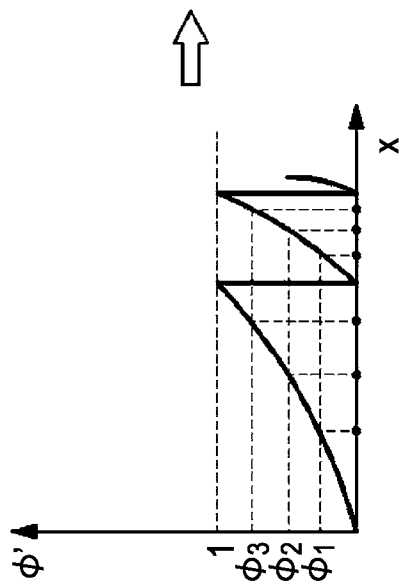
Figure 42C:
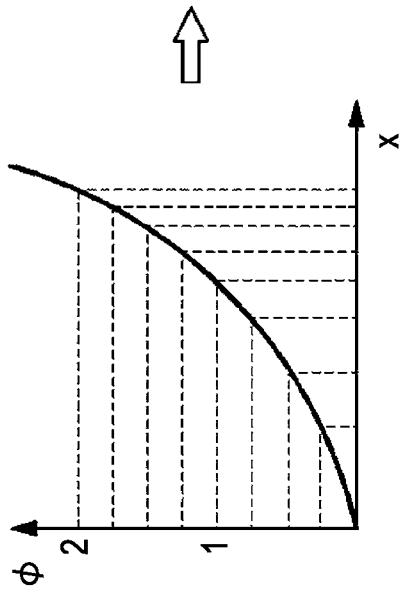

Accordingly, as shown in FIG. 42B, the respective phases are expressed by integers, and thereby it is possible to determine the boundaries of the respective periods. Next, it is possible to obtain the shape having the phases which are estimated in a way that the node points of the steps are found and collected as straight lines by using the coordinates (φn, dn) held in advance. FIGS. 42A to 42C show the sequential operations.

Further, in the real lens, generally the depth is corrected when the diffraction structure is formed. This is a method of adjusting the depth of the diffraction structure by a ray angle of the emergent ray, thereby performing the correction on the basis of the angle of the emergent ray with the first wavelength λ1 corresponding to the BD in the three-wavelength objective lens. Specifically, assuming that the depth of the diffraction structure of the general diffractive lens is d, the corrected depth is d', the emergent angle of the emergent ray exiting from the incident surface of BD is θ, and the refractive index of the lens at the wavelength of BD is n1, the following relationship (8) is established. If this is used reversely, it is possible to know whether or not the application is used.

$$d' = d \cdot (n_1 - 1)/(n_1 \cos \theta - 1) \tag{8}$$

Relationship with Phase of Real Lens

Specifically, the relationship with the phase of the real lens is described by exemplifying the case where (k1i, k2i, k3i)= (1, −2, −3). That is, the multi-step diffraction structure, in which the above-mentioned blaze and the like is not overlapped, is the multi-step diffraction structure formed on the lens on the basis of the phase difference function. However, such a configuration is described in detail. In the shape of the formed diffraction grating, the correction amount corresponding to the depth of the expression (8) is removed, and the positions of the start points of the first level, the fourth level, and the fifth level are collected in consideration of the amount of the integer multiple phase for each period. In such a manner, it is possible to estimate the original amount of phase. The reason is that it is not preferable that the positions of the start points of the first level and both ends of the fourth level are placed to be deviated as can be seen from the phase results of FIGS. 16A to 16H. Even if both ends of the fourth level are placed to be deviated, there is no great shift, and thus this deviation has less influence on the entirety, and has no influence on estimation. Further, generally the above-mentioned expression (6) can be sufficiently approximated to the j of 5 or so. Accordingly, as shown in FIGS. 43A to 43E, if there is a diffraction structure having at least three periods or so, the amount of phase is approximated to the j of 5 or so, and the amount of phase is estimated. In such a manner, it is possible to verify whether or not this method is applied.

The verification method of FIGS. 43A to 43E is described as follows. First, the formed diffraction structure is corrected by the expression (8). Therefore, by estimating the angle of the emergent ray, back calculation of the expression (8) is performed. Next, when the slopes of the steps of the multi-step shape are formed, the δ can be estimated from the amount of the slopes of the steps. Then, the amount of δ is removed, thereby making the depth constant as shown in the second diagram FIG. 43B. Next, in the second diagram FIG. 43B, the positions in the x direction are determined from the positions of the start points $R_{L1S}$, $R_{L4S}$, and $R_{L5S}$ of the first level, the fourth level, and the fifth level. Here, for example as shown in FIG. 43B, the positions are calculated as $x_1$, $x_4$, $x_5$, $x_1'$, $x_4'$, and $x_5'$.

Next, as shown in the third diagram FIG. 43C, the maximum amount of phase is set to 1, thereby determining the amounts of the phases so that the amounts of phases of the respective levels are set to (N−1)/7 at the Nth level start point, 0 at the first level start point, 3/7 at the fourth level start point, and 4/7 at the fifth level start point. The points are indicated by the white dots shown in FIGS. 43A to 43E.

Next, as shown in the fourth diagram FIG. 43D, in the m-th period, the amount of phase of m−1 is applied to the original phase difference function, and thus is added and restored thereto. In other words, the reverse operation of the remainder operation shown in FIGS. 42A to 42C is performed, and the integer multiple phases of the respective period are added, thereby progressing the operation as shown in FIGS. 43C and 43D. By collecting the phase points $\phi_{L1S}$, $\phi_{L4S}$, $\phi_{L5S}$, $\phi_{L1S}'$, $\phi_{L4S}'$, and $\phi_{L5S}'$ which are determined just before in FIG. 43D, it is possible to estimate the phase difference function $\phi(X)$. Further, the $\phi_{L1S}$ is 0 as described above, the $\phi_{L4S}$ is 3/7 as described above, and $\phi_{L5S}$ is 4/7 as described above. Further, the $\phi_{L1S}'$ is determined as 7/7 by the above-mentioned adding and restoring operation, the $\phi_{L4S}'$ is determined as 10/7 by the above-mentioned adding and restoring operation, and $\phi_{L5S}'$ is determined as 11/7 by the above-mentioned adding and restoring operation. Further, the amounts of phases $\phi_{L1S}$, $\phi_{L4S}$, $\phi_{L5S}$, $\phi_{L1S}'$, $\phi_{L4S}'$, and $\phi_{L5S}'$ after the completion of the adding and restoring operation are referred to as the estimated amounts of phases. Further, as described with reference to the expression (6), the corresponding phase difference function $\phi(X)$ satisfies the following relationship: $\phi(X)=C_1X^2+C_2X^4+C_3X^6+C_4X^8+C_5X^{10}\ldots$. From the positions $x_1$, $x_4$, $x_5$, $x_1'$, $x_4'$, and $x_5'$ arranged in the above-mentioned horizontal axis direction (the X direction) and the positions $\phi_{L1S}$, $\phi_{L4S}$, $\phi_{L5S}$, $\phi_{L1S}'$, $\phi_{L4S}'$, and $\phi_{L5S}'$ (the estimated phase amounts) arranged in the vertical axis direction, the $C_1$ to $C_5$ are determined in detail, thereby calculating the relational expression approximate to $\phi(X)$. As described above, the estimation is sufficiently performed at j of 5 or so, and therefore it is possible to perform the estimation when there are six or more white dots. Accordingly, it is possible to obtain three points (the start points of the first level, the fourth level, and the fifth level) in a single period, and therefore it is possible to perform the estimation when there are at least two or more periods. In the above description, the estimation is performed when there are two adjacent periods, but is more precise as the number of periods is larger.

Finally, as shown in the fifth diagram FIG. 43E, by checking the disassociation with the $\phi$ at the remaining second level start points, the third level start point, the sixth level start point, and the seventh level start point, it is possible to verify whether or not this method is used. In other words, similarly to the method of obtaining $x_1$, $x_4$, $x_5$ ... from the first, fourth, and fifth level start points indicated by the above-mentioned white dots in FIG. 43B, the positions $x_2$, $x_3$, $x_6$, $x_7$ ... arranged in the x direction is obtained from the second, third, sixth, and seventh level start points. In addition, as shown in FIG. 43E, the amounts of phases in the vertical direction at the intersection points between the curve representing the $\phi(X)$ and the positions $x_2$, $x_3$, $x_6$, and $x_7$ arranged in the horizontal axis direction (the X direction) are indicated by $\phi(x_2)$, $\phi(x_3)$, $\phi(x_6)$, and $\phi(x_7)$. On the other hand, the amounts of optical path difference phases, which are represented as the positions in the specific vertical direction at the second, third, sixth, seventh level start points indicated by the solid dots of FIG. 43B, are indicated by $\phi_2$, $\phi_3$, $\phi_6$, and $\phi_7$. The amount of phases are determined as $\phi_2$ of 1/7 at the second level start point, $\phi_3$ of 2/7 at the third level start point, $\phi_6$ of 5/7 at the sixth level start point, and $\phi_7$ of 6/7 at the seventh level start point. In addition, here the heights of the steps of FIG. 43B are equivalent, and when the heights are not equivalent, the heights are equal to the values obtained by dividing the phase in proportion to the values. By using the relationship between the amounts of optical path difference phases $\phi_2$, $\phi_3$, $\phi_6$, and $\phi_7$ and the $\phi(x_2)$, $\phi(x_3)$, $\phi(x_6)$, and $\phi(x_7)$ which can be obtained from the relational expression of $\phi(X)$, it is possible to verify whether or not a configuration uses this method. That is, as described in the "regarding unwanted signal reduction and change of diffraction structure shape" with reference to FIG. 16E, for example, the case where the pitch of the first level and the seventh level may be narrowed. In this case, the following relationship is established. That is, in such a case, the following relational expressions are established: $|\phi_2|>|\phi(x_2)|$, and $|\phi_7|<|\phi(x_7)|$. Moreover, by moving the third level start point toward the second level start point side, the flatness of the phase may be achieved. In this case, the following relational expression is satisfied: $|\phi_3|>|\phi(x_3)|$. Further, by moving the sixth level start point toward the seventh level start point side, the flatness of the phase may be achieved. In this case, the following relational expression is satisfied: $|\phi_6|<|\phi(x_6)|$. In other words, when at least one of the relational expression $|\phi_2|>|\phi(x_2)|$, the relational expression $|\phi_3|>|\phi(x_3)|$, the relational expression $|\phi_6|<|\phi(x_6)|$, and the relational expression $|\phi_7|<|\phi(x_7)|$, is satisfied, it may be said that the flatness can be improved. Accordingly, by satisfying at least one of the above-mentioned relational expressions, it is possible to obtain desirable signals regardless of environmental change such as changes in temperature and wavelength. As a result, it is possible to achieve favorable recording and reproducing characteristics.

Figure 44:
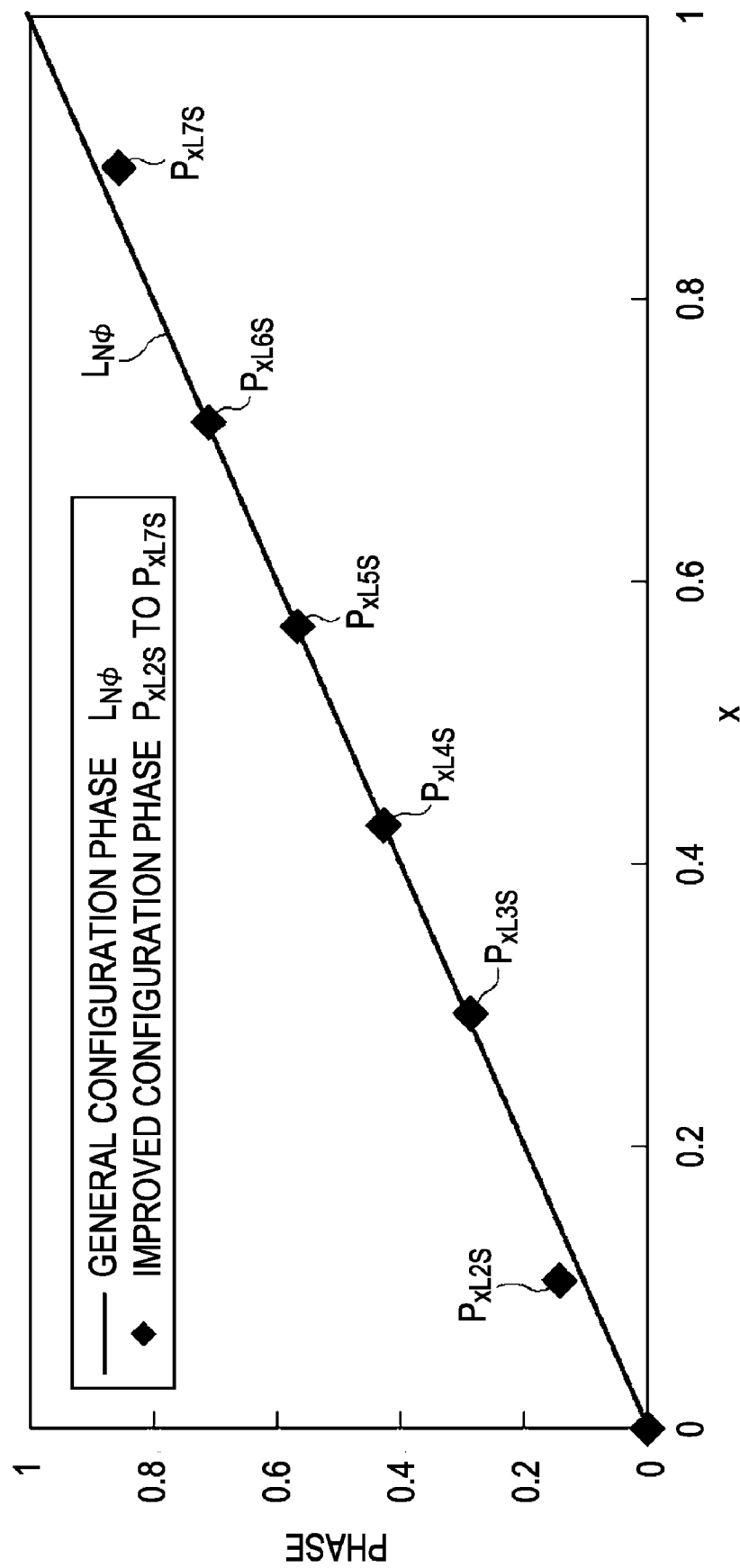
FIG. 44 is a diagram for comparing phase points at start points of the respective levels of the general configuration and the improved configuration.

Moreover, FIG. 44 shows the phases of the start steps, which can be obtained by the improved configuration, relative to the expected phases of $\phi$ which can be obtained by the general configuration. It can be seen from FIG. 44 that the phase $P_{XL2S}$ of the second level start point becomes larger than the estimated $\phi$. Further, the phase $P_{XL7S}$ of the seventh level start point becomes smaller than the estimated $\phi$. FIG. 44 corresponds to FIG. 16E. Further, as described above, such an improved method may be realized, as shown in FIGS. 16A to 16H, by moving the third level start point to the −x side and moving the sixth level start point to the +x side from the phase state. Hence, the phase $P_{XL3S}$ at the third level start point may be set to be larger than the estimated $\phi$, or the phase $P_{XL6S}$ at the sixth level start point may be set to be smaller than the estimated $\phi$. In such a manner, the method can be realized. Further, in the above description, in the relational expression $\phi(X)$ representing the relationship between the radial position and the amount of phase difference, points other than the second level, third level, sixth level, and seventh level start points are used, but the invention is not limited to this. That is, as described herein, when it is previously determined that the third level and the sixth level are not used for the improvement configuration, the relational expression $\phi(X)$ may be calculated on the basis of the points other than the second level and seventh level start points.

In the above description, the case where (k1$i$, k2$i$, k3$i$)=(1, −2, −3) is exemplified, but in the case of the other orders, the pitches are changed in accordance with the direction corresponding to the polarity. As the other orders, for example as described above, includes the combinations in which (k1$i$, k2$i$, k3$i$) is (1, −1, −2), (0, −1, −2), (0, −2, −3), and (2, −1, −2). The positive and negative polarities of the respective order combinations is defined by whether the unwanted adjacent diffraction order relative to the regular diffracted light order is positive or negative. If the regular diffraction order and the unwanted adjacent diffraction order at the first wavelength λ1 corresponding to BD are negative, the polarity is determined to be negative. In contrast, if the regular diffraction order and the unwanted adjacent diffraction order are positive, the polarity is determined to be positive. This means that the tendency can be drawn by referring to the phase states and the like in the general configuration formed in the equidistant multi-step shape. That is, in FIGS. 16A to 16H, focusing on the second wavelength λ2 corresponding to, particularly, the DVD, if the phase curve is lowered, it is possible substantially to planarize the entirety by reducing the pitch of both ends. For example, this is shown in FIGS. 16A to 16H. In contrast, if the curve is raised, it is possible substantially to planarize the entirety by increasing the pitch of the both ends on the contrary. Here, the raised curve means that, as the position of x is moved and changed from 0 to 1, the phase increases. In addition, the lowered curve means that, as the position of x is moved and changed from 0 to 1, the phase decreases. The tilt direction of the phase diagram represents the tilt (dEff/dD) of the efficiency to the depth of the regular light. As shown in FIGS. 9A to 9C, at the depth at which dEff/dD is equal to 0 in the case of the regular light, it is also equal to 0 in the case of the unwanted adjacent light. Hence, otherwise, the larger order of the diffracted adjacent light is changed by whether the dEff/dD of the regular light is positive or negative. For this reason, the positive and negative signs of the diffraction orders of the unwanted adjacent light correspond to the positive and negative signs of the increase and decrease in the pitch for improvement.

By summarizing the above-mentioned points, it would appear that, when the three-wavelength compatibility objective lens is formed, by satisfying the following expressions (9) and (10) or the following expression (11), or the following expressions (12) and (13), or the following expression (14), it is possible to avoid the influence of the unwanted light. The multi-step diffraction structure, in which the blaze of the diffraction structure of the first region 51 as the inner orbicular zone provided on the three-wavelength compatibility objective lens is not overlapped, is a multi-step diffraction structure having (N1−1) steps and N1 levels. In the expression, the k1$im$, k2$im$, and k3$im$ represent the same as the above-mentioned k1$i$, k2$i$, and k3$i$. Specifically, those represent the orders having the maximum diffraction efficiencies at the first to third wavelengths λ1, λ2, and λ3 in the diffraction structure of the first region 51. Further, the k1$is$ represents the order of the larger diffraction efficiency among the orders adjacent to the k1$im$. The k2$is$ represents the order of the larger diffraction efficiency among the orders adjacent to the k2$im$. The k3$is$ represents the order of the larger diffraction efficiency among the orders adjacent to the k3$im$. Further, in each expression, the $\phi_1(x_2)$ and $\phi_1(x_{N1})$ are calculated in the following order. The amount of optical path difference phase φi at the first wavelength λ1 due to the diffraction structure of the first region 51 is added to the integer multiple of the phase of each period in the multiple periods of the multi-step structure, and is restored, thereby obtaining the estimated amount of phase. By collecting the estimated amounts of phases at the positions of the start point of the levels other than the second level and the N1-th level of each period among the estimated amounts of phases to be obtained, the following relational expression, which is approximate to the amount of optical path difference phase $\phi_i(X)$ relative to the radial position X, is calculated: $\phi_i(X) = C_1 X_2 + C_2 X_4 + C_3 X_6 + C_4 X_8 + C_5 X_{10}$. The $\phi_i(x_2)$ and $\phi_i(x_{N1})$ are the values which can be obtained from the radial positions $x_2$ and $x_{N1}$ in the relational expression.

Specifically, the $\phi_i(x_2)$ is the value calculated by substituting the radial position $x_2$ at the start point of the second level for the X of the right term of the relational expression $\phi_i(X)$. The $\phi_i(x_{N1})$ is the value calculated by substituting the radial position $x_{N1}$ at the start point of the $N_1$-th level for the X of the right term of the relational expression $\phi_i(X)$. On the other hand, the $\phi_{i2}$ comparing with the $\phi_i(x_2)$ is the amount of optical path difference phase at the start point position of the second level. Further, the $\phi_{iN1}$ comparing with the $\phi_i(x_{N1})$ is the amount of optical path difference phase at the start point position of the $N_1$-th level.

$$k1im - k1is > 0 \tag{9}$$

$$|\phi_{i2}| < |\phi_i(x_2)| \tag{10}$$

$$|\phi_{iN1}| > |\phi_i(x_{N1})| \tag{11}$$

$$k1im - k1is < 0 \tag{12}$$

$$|\phi_{i2}| > ..\phi_i(x_2)| \tag{13}$$

$$|\phi_{iN1}| < |\phi_i(x_{N1})| \tag{14}$$

Configuration in Intermediate Orbicular Zone

Regarding the modification of the above-mentioned diffraction structure shape, the configuration is described by exemplifying the inner orbicular zone (the first region 51), but the method can be applied in the same manner to the intermediate orbicular zone (the second region 52). By applying the corresponding improved non-equidistant method or improved slope-applied method to the intermediate orbicular zone, the configuration is made to be resistant to environmental change, and the overall efficiency of the DVD increases. As a result, it is possible to reduce the unwanted signal relatively.

Statistics of Method of Suppressing Unwanted Diffracted Light Generated by Changes in Temperature and Wavelength The first region 51 formed as the predetermined diffraction structure by employing the above-mentioned method is able to reduce the adverse effect, which is difficult to be solved and is caused by the unwanted diffraction signal at the time of the environmental change, on the three-wavelength-compatible objective lens. Thereby, the objective lens 34 and the diffractive portion 50 having the first region 51 embodies the optical pickup which performs the recording and/reproducing on the plurality of types of optical discs including the double layer optical disc by using the single objective lens.

That is, the objective lens 34 according to the embodiment of the invention is configured to have the first to third regions 51, 52, and 53 and the like. Here, the first to third regions are formed to have diameters of apertures allowing the light beam with the wavelength λ1 to correspond to the first to third regions, the light beam with the wavelength λ2 to correspond to the first and second regions, and the light beam with the wavelength λ3 to correspond to the first region. In the first region 51, the diffraction structure is formed in an orbicular zone shape with a predetermined height. The diffraction structure is a structure in which the blazed structure with the height h is overlapped with a multi-step diffraction structure. A slope direction of the blazed structure is an increasing direction opposite to a direction of increasing heights of steps of the multi-step diffraction structure. The height h satisfies a relational expression of $h < (\lambda 1 / (n1 - 1))$. The multi-step diffraction structure is a non-equidistant multi-step diffraction structure that is different from an equidistant multi-step diffraction structure, in which widths of the steps in the period are equivalent and heights of the steps in the period are equivalent, in that the widths thereof are changed. The objective lens 34 enables the three-wavelength compatibility for appropriately collecting the corresponding light beams on the signal recording surface by using the single objective lens. Further, the objective lens 34 has resistance to the environmental change with the configuration of the non-equidistant multi-step diffraction structure in which the blaze is not overlapped. The lens is able to prevent the servo from becoming unstable due to an increase of the unwanted diffracted light, which is generated from the diffractive portion 50, caused by the change in temperature and wavelength. Further, in the objective lens 34, the blaze having the predetermined direction and height is formed, thereby increasing the efficiency of λ3 and reducing the unwanted light of λ1. As a result, it is possible to further stabilize the servo. With such a configuration, the objective lens 34 prevents the recording and reproducing characteristics, which are performed by the optical pickup 3 equipped with the lens, from being deteriorated, thereby obtaining favorable recording and reproducing characteristics.

At this time, for example, as described with reference to FIGS. 8A to 8C, 23A to 23C, and 38A to 38C, the number of the blazed structure, which is overlapped with the multi-step diffraction structure, may be one. Further, for example, as described with reference to FIGS. 37A to 37D, the single blazed structure and binary structure may be overlapped with the multi-step diffraction structure. In this case, as described in the above-mentioned section "double-slope structure", it is possible to prevent the unwanted distant signal from having the adverse effect during the focus search. Moreover, for example, as described with reference to FIGS. 39A to 39C, there may be provided two blazed structures, which are overlapped with the multi-step diffraction structure, including the blazed structure (FIG. 39B) having the same period as the multi-step diffraction structure and the blazed structure (FIG. 38B) having the period equal to the integer multiple of the period of the multi-step diffraction structure. In this case, as described with regard to the slope-combination-applied structure in the above-mentioned section "multi-period slope structure", by reducing the unwanted adjacent signal of λ1 without increasing the unwanted distant signal, it is possible further to stabilize the servo and prevent the adverse effect on the focus search.

Further, the first region 51 of the objective lens 34 is configured to have the following relationships: (k1$i$, k2$i$, k3$i$)=(1, −2, −3), (1, −1, −2), (0, −1, −2), (0, −2, −3), and (2, −1, −2). In addition, in the first region 51, the multi-step diffraction structure, with which the blaze is overlapped, is formed as the non-equidistant multi-step structure having the ($N_1$−1) level differences and the N1 levels. Then, in the case where k1$im$−k1$is$>0, the following relationship is satisfied: $|\phi_{i2}|<|\phi_i(x_2)|$ or $|\phi_{iN1}|>|\phi_i(x_{N1})|$. In addition, in the case where k1$im$"k1$is$<0 the following relationship is satisfied: $|\phi_{i2}|>|\phi_i(x_2)|$ or $|\phi_{iN1}|<|\phi_i(x_{N1})|$. The objective lens 34 is able to achieve the three-wavelength compatibility by appropriately collecting the corresponding light beams on the signal recording surface by using the single objective lens. Further, the objective lens 34 is configured to prevent the servo from becoming unstable due to an increase of the unwanted diffracted light, which is generated from the diffractive portion 50, caused by the changes in temperature and wavelength. With such a configuration, the objective lens 34 prevents the recording and reproducing characteristics, which are performed by the optical pickup 3 equipped with the lens, from being deteriorated, thereby obtaining favorable recording and reproducing characteristics.

Moreover, in the case of satisfying the following relationship: (k1$i$, k2$i$, k3$i$)=(+1, −2, −3), the following configuration is provided. The objective lens 34 has the first to third regions 51, 52, and 53. Here, the first to third regions are formed to have diameters of apertures allowing the light beam with the wavelength λ1 to correspond to the first to third regions, the light beam with the wavelength λ2 to correspond to the first and second regions, and the light beam with the wavelength λ3 to correspond to the first region. Further, the first region 51 satisfies the following relationship: (k1$i$, k2$i$, k3$i$)=(+1, −2, −3), in which the multi-step diffraction structure before the overlapping is formed as the non-equidistant multi-step structure having 6 level differences and 7 levels. In addition, at least one of the relational expression $|\phi_2|>|\phi(x_2)|$, the relational expression $|\phi_3|>|\phi(x_3)|$, the relational expression $|\phi_6|<|\phi(x_6)|$, and the relational expression $|\phi_7|<|\phi(x_7)|$ is satisfied. The objective lens 34 is able to achieve the three-wavelength compatibility by appropriately collecting the corresponding light beams on the signal recording surface by using the single objective lens. Further, the objective lens 34 is configured to prevent the servo from becoming unstable due to an increase of the unwanted diffracted light, which is generated from the diffractive portion 50, caused by the changes in temperature and wavelength. With such a configuration, the objective lens 34 prevents the recording and reproducing characteristics, which are performed by the optical pickup 3 equipped with the lens, from being deteriorated, thereby obtaining favorable recording and reproducing characteristics.

Further, in the case where the following relationship is satisfied: (k1$i$, k2$i$, k3$i$)=(+1, −2, −3), the following configuration is provided. First, the single blazed structure and binary structure may be overlapped with the multi-step diffraction structure. In this case, the period of the overlapped blazed structure is m times the period of the multi-step diffraction structure. In addition, assuming that the height of the multi-step diffraction structure is d0 and the sum of the heights of the slopes, which are given by the blazed structure in the single period of the multi-step diffraction structure, is d0×δ, the following relational expression is satisfied: 0<δ<0.15/m. Further, when the blazed structure and binary structure are overlapped with the multi-step diffraction structure, the period of the overlapped blazed structure is the same as the multi-step diffraction structure. In the case, assuming that the height of the multi-step diffraction structure is d0 and the sum of the heights of the slopes, which are given by the blazed structure in the single period of the multi-step diffraction structure, is d0×δ, the following relational expression is satisfied: 0<δ<0.3. Moreover, the two blazed structure, which has the period the same as the multi-step diffraction structure and the period equal to the integer multiple of the period thereof, may be overlapped with the multi-step diffraction structure. In this case, the integer multiple period of the blazed structure is m times the period of the multi-step diffraction structure. In this case, assuming that the height of the multi-step diffraction structure is d0, the sum of the heights of the slopes applied by the blazed structure of the period equal to the single period of the multi-step diffraction structure is represented by d0×δs. Further, the sum of the heights of the slopes, which are applied by the blazed structure of the period equal to the integer multiple of the single period of the multi-step diffraction structure, is represented by d0×δm. In this case, the following relational expression is satisfied: 0<δm×m+δs<0.15. In any case, as described in "regarding limitation of η and δ in slope structure", it is possible sufficiently to secure the efficiency of λ1, thereby achieving favorable recording and reproducing characteristics without reduction in the spot size and the like.

Further, in the case where (k1$i$, k2$i$, k3$i$)=(+1, −2, −3) and the superposition multi-step diffraction structure as the overlapping target is the multi-step structure having 6 level differences and 7 levels, the following configuration is provided. The ratio of the widths of the steps in the period is (7−5η)/2: η:η:η:η:η:(7−5η)/2 in order, and the following relationship is satisfied: 1<η<1.11. In this case, as described in "regarding limitation of η and δ in slope structure" the amount of change in efficiency at the time of the change in temperature of λ3 is reduced, thereby achieving favorable recording and reproducing characteristics.

6. Regarding Example of Diffractive Portion Used in Optical Pickup According to Embodiment of Invention (Modified Example 3)

Next, the exemplary configuration of the diffractive portion 50 used in the optical pickup 3 according to the embodiment of the invention will be described with reference to FIGS. 6A and 6B.

Figure 6A:
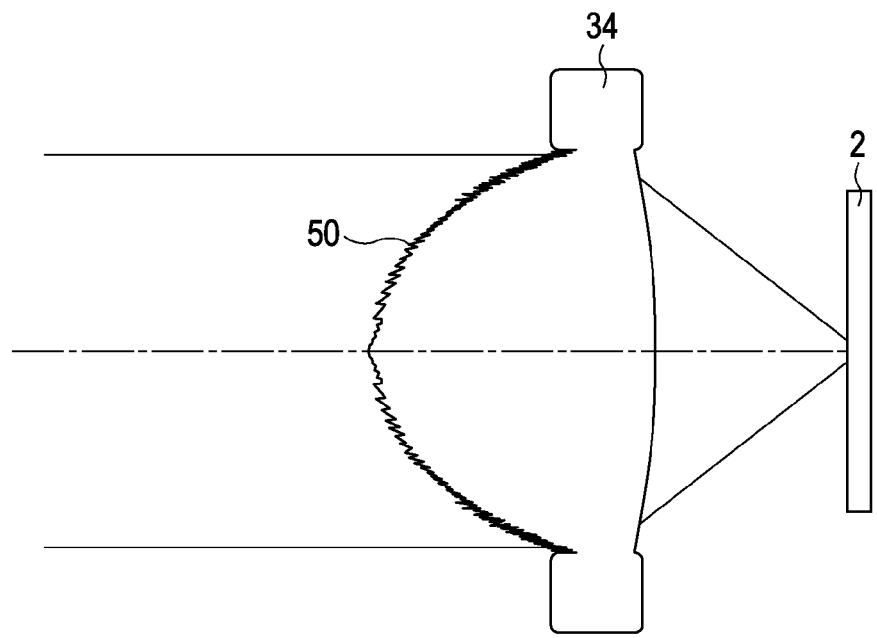
FIGS. 6A and 6B are diagrams illustrating examples of a light collecting optical device constituting the optical pickup shown in FIG. 2, the diagrams illustrating a modified example corresponding to FIGS. 4A and 4B, where

In the above description in Section 3, as shown in FIG. 6A, the diffractive portion 50 having the three regions 51, 52, and 53 is provided on the incident side surface of the objective lens 34, but the invention is not limited to this. The diffractive portion 50 may be provided on the emergent side surface of the objective lens 34. Moreover, the diffractive portion 50 having the first to third regions 51, 52, and 53 may be configured to be provided integrally on the incident side surface or the emergent side surface of an optical element separated from the objective lens.

Figure 6B:
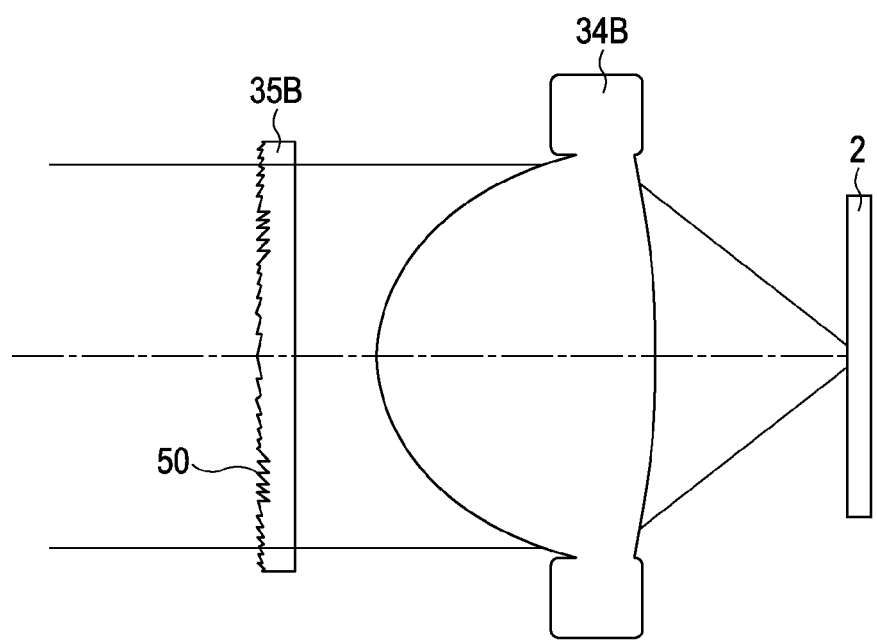

For example, as shown in FIG. 6B, there may be provided an objective lens 34B having a lens curved surface which is obtained by removing the diffractive portion 50 from the objective lens 34, and a diffraction optical element 35B provided on one surface of the diffractive portion 50 and disposed on the optical path common to the three wavelengths. Then, a light collecting optical device may be configured to include the objective lens 34B, the diffractive optical element 35B, and the like.

In the objective lens 34 shown in FIG. 6A, the surface shape is formed as a combination between the surface shape of the diffraction structure having the diffractive power function and the surface shape of the incident side surface having a refractive power function of the objective lens as reference. Meanwhile, as shown in FIG. 6B, when the separate diffraction optical element 35B is provided, the objective lens 34B itself has a surface shape having a refractive power function. In addition, the surface shape of a diffraction structure having a diffraction power function is formed on one surface of the diffraction optical element 35B.

The objective lens 34B and the diffraction optical element 35B such as shown in FIG. 6B function as a light collecting optical device in the same manner as the objective lens 34, and are used in the optical pickup 3, thereby reducing aberrations and the like and achieving the three-wavelength compatibility of the optical pickup. In addition, in the objective lens 34B and the diffractive optical element 35B, the number of components can be reduced, which enables simplification of the configuration and reduction in size, and thus high productivity and low cost can be achieved. Moreover, the diffraction structure may be configured to be complicated as compared with the case where it is provided integrally with the objective lens 34. Meanwhile, as shown in FIG. 6A described above, a single element (the objective lens 34) functions as a light collecting optical device to collect appropriately the light beams with three different wavelengths on the signal recording surfaces of the optical discs corresponding to the light beams so that no spherical aberration occurs. Thus, by providing the diffractive portion 50 integrally with the objective lens 34, it is possible to reduce the number of new optical components, and reduce the size of the configuration. Further, it should be that the diffractive portion 50 has formed an aberration correction diffraction structure for three-wavelength compatibility, which was difficult in the related art, on one surface thereof. Therefore, the diffractive portion 50 can be formed integrally with the objective lens 34 serving as a refraction element such as described above. In such a manner, it is possible to form a diffraction surface formed directly on a plastic lens, and thus the objective lens 34 having the diffractive portion 50 formed integrally therewith is formed of a plastic material, thereby achieving high productivity and low cost. Further, the modified example shown in FIGS. 6A and 6B is also applied to the objective lens 34C having the diffractive portion 70.

7. Regarding Another Example of Diffractive Portion Used in Optical Pickup According to Embodiment of Invention (Modified Example 4)

Next, the exemplary configuration of the diffractive portion 70 used in the optical pickup 3 according to the embodiment of the invention will be described with reference to FIGS. 7A and 7B.

Figure 7A:
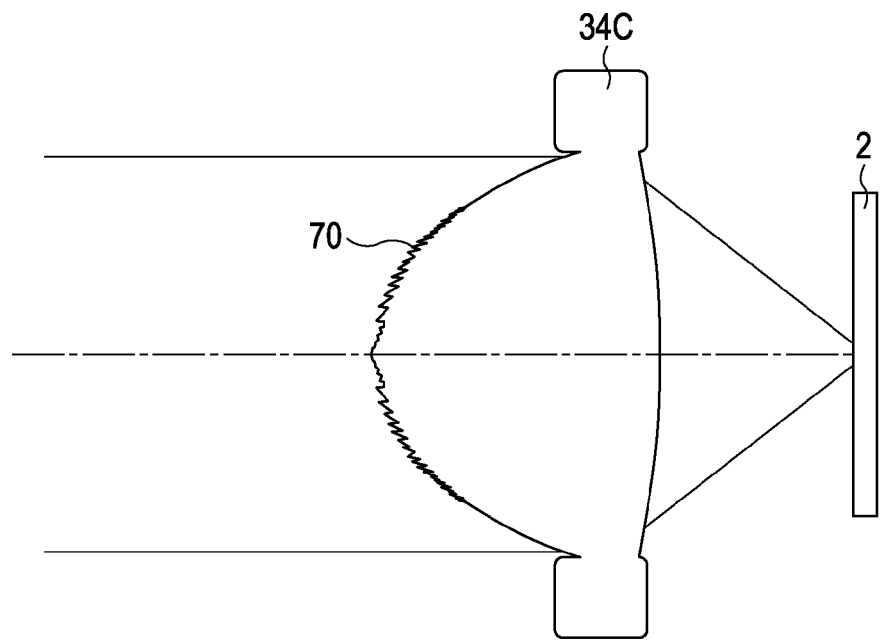
FIGS. 7A and 7B are diagrams illustrating examples of a light collecting optical device constituting the optical pickup shown in FIG. 2, the diagrams illustrating a modified example corresponding to FIGS. 5A and 5B, where

In the above description in Section 4, as shown in FIG. 7A, the diffractive portion 70 having the three regions 51, 52, and 73 is provided on the incident side surface of the objective lens 34C, but the invention is not limited to this. The diffractive portion 70 may be provided on the emergent side surface of the objective lens 34C. Moreover, the diffractive portion 70 having the first to third regions 51, 52, and 73 may be configured to be provided integrally on the incident side surface or the emergent side surface of an optical element separated from the objective lens. In this case, the objective lens takes the refraction operation of the third region 73, and the separate optical element takes the diffraction operation corresponding to the first and second regions 51 and 52.

Figure 7B:
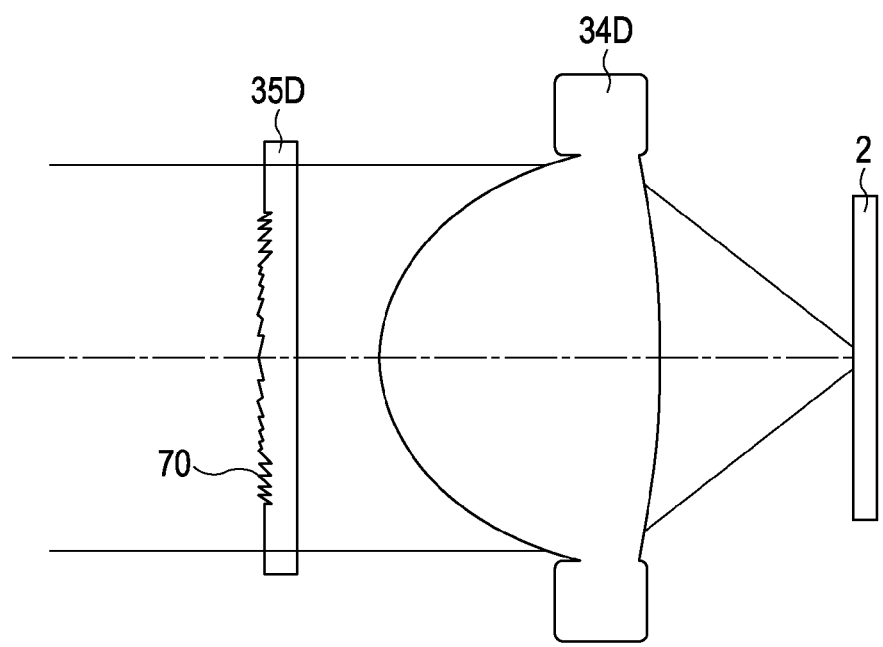

For example, as shown in FIG. 7B, there may be provided an objective lens 34D having a lens curved surface which is obtained by removing the diffractive portion 70 from the objective lens 34C, and a diffraction optical element 35D provided on one surface of the diffractive portion 70 and disposed on the optical path common to the three wavelengths. Then, a light collecting optical device may be configured to include the objective lens 34D, the diffractive optical element 35D, and the like.

In the objective lens 34C shown in FIG. 7A, the surface shape is formed as combination between the surface shape of the diffraction structure having the diffractive power function and the surface shape of the incident side surface having a refractive power function of the objective lens as reference. Meanwhile, as shown in FIG. 7B, when the separate diffraction optical element 35D is provided, the objective lens 34D itself has a surface shape having a refractive power function. In addition, the surface shape of a diffraction structure having a diffraction power function is formed on one surface of the diffraction optical element 35D.

The objective lens 34D and the diffraction optical element 35D such as shown in FIG. 7B function as a light collecting optical device in the same manner as the objective lens 34C, and are used in the optical pickup 3, thereby reducing aberrations and the like and achieving the three-wavelength compatibility of the optical pickup. In addition, in the objective lens 34D and the diffractive optical element 35D, the number of components can be reduced, which enables simplification of the configuration and reduction in size, and thus high productivity and low cost can be achieved. Moreover, the diffraction structure may be configured to be complicated as compared with the case where it is provided integrally with the objective lens 34C. Meanwhile, as shown in FIG. 7A described above, a single element (the objective lens 34C) functions as a light collecting optical device to collect appropriately the light beams with three different wavelengths on the signal recording surfaces of the optical discs corresponding to the light beams so that no spherical aberration occurs. Thus, by providing the diffractive portion 70 integrally with the objective lens 34C, it is possible to reduce the number of new optical components, and reduce the size of the configuration. Further, it should be that the diffractive portion 70 has formed an aberration correction diffraction structure for three-wavelength compatibility, which was difficult in the related art, on one surface thereof. Therefore, the diffractive portion 70 can be formed integrally with the objective lens 34C serving as a refraction element such as described above. In such a manner, it is possible to form a diffraction surface formed directly on a plastic lens, and thus the objective lens 34C having the diffractive portion 70 formed integrally therewith is formed of a plastic material, thereby achieving high productivity and low cost.

8. Regarding Optical Pickup According to Embodiment of Invention

The optical pickup 3 according to the embodiment of the invention is provided on one surface of the objective lens 34, and is able to provide the light beam of each wavelength with optimal diffraction efficiency and diffraction angle for each region by using the diffractive portion 50 having the first to third regions 51, 52, and 53. Further, the optical pickup 3 is provided on one surface of the objective lens 34C, and is able to provide the light beam of each wavelength with optimal diffraction efficiency and diffraction angle for each region by using the diffractive portion 70 having the first to third regions 51, 52, and 73. With such a configuration, the optical pickup 3 is able sufficiently to reduce spherical aberration on the signal recording surfaces of the three types of first to third optical discs 11, 12, and 13 having different formats such as the protective layer thickness or the like. Accordingly, the optical pickup 3 enables reading and writing of signals to and from a plurality of optical discs 11, 12, and 13, by using the light beams with three different wavelengths.

Further, the objective lens 34 or 34C having the diffractive portion 50 or 70 shown in FIG. 6A or 7A constituting the above-mentioned optical pickup 3 is able to function as a light collecting optical device for collecting the input light beams at predetermined positions. Likewise, the objective lens 34B or 34D or the diffractive optical element 35B or 35D having the diffractive portion 50 or 70 shown in FIG. 6B or 7B is able to function as a light collecting optical device for collecting the input light beams at predetermined positions. The light collecting optical device is applicable to an optical pickup that performs recording and/or reproducing of information signals by irradiating light beams onto three different types of optical discs, with the diffractive portion 50 or 70 provided on one surface of the objective lens 34 or 34C or the diffraction optical element 35B or 35D. In addition, when the light collecting optical device is used for the optical pickup, the device is able to collect appropriately the corresponding light beams on the signal recording surfaces of the three types of optical discs in a state where spherical aberration is sufficiently reduced. That is, the light collecting optical device is able to achieve three-wavelength compatibility of the optical pickup using the objective lens 34 common to the three wavelengths, or the objective lens 34B, 34C, or 34D.

Further, the objective lens 34B or 34D or the diffraction optical element 35B or 35D having the diffractive portion 50 or 70 described with reference to FIG. 6B or 7B may be configured to be provided, for example, integrally with an actuator. In order to improve precision of assembling to the lens holder of the actuator and facilitate assembling work, a light collecting optical unit may be configured in which the diffraction optical element and objective lens are formed as an integrated unit. For example, the light collecting optical unit may be configured by using spacers or the like to fix the diffraction optical element 35B and the objective lens 34B to the holder while setting the position, spacing, and optical axis. The configuration, in which the elements are integrally assembled to the objective lens driving mechanism, enables the light beams with first to third wavelengths to be appropriately collected on the signal recording surfaces of the respective optical discs with spherical aberration reduced, for example, even at the time of field shift, such as displacement in the tracking direction and the like.

Next, the optical paths of the light beams emitted from the first to third light source sections 31, 32, and 33 in the optical pickup 3 configured as described above will be described with reference to FIG. 2. Here, an example of the case where the objective lens 34 is used is described, but it is the same in the case where another objective lens 34C or the like is used. First, the optical path when the light beam with the first wavelength is emitted onto the first optical disc 11 to perform reading or writing of information will be described.

The disc type determination section 22, which determines that the type of the optical disc 2 is the first optical disc 11, causes the light beam with the first wavelength to be emitted from the first emission portion of the first light source section 31.

The light beam with the first wavelength emitted from the first emission portion is split into three beams by the first grating 39 for detection of tracking error signals and the like, and is incident to the second beam splitter 37. The light beam with the first wavelength that is incident to the second beam splitter 37 is reflected from a mirror surface 37a of the second beam splitter 37, and is output to the third beam splitter 38 side.

The light beam with the first wavelength that is incident to the third beam splitter 38 transmits a mirror surface 38a of the third beam splitter 38, is output to the collimator lens 42 side. The collimator lens 42 converts the divergent angle of the incident light beam so as to be substantially parallel light. Subsequently, the light beam is given a predetermined phase difference by the ¼ wave plate 43, reflected from the redirecting mirror 44, and output to the objective lens 34 side.

The light beam with the first wavelength that is incident to the objective lens 34 is diffracted with the first to third regions 51, 52, and 53 of the diffractive portion 50 provided on the incident side surface of the objective lens 34 so that a predetermined diffraction order of the light beam which has passed through each region is dominant as described above. In addition, the beam is also appropriately collected on the signal recording surface of the first optical disc 11 by refractive power of the lens curved surface of the objective lens 34. In this case, the light beam with the first wavelength is diffracted and refracted by the diffractive power and the refractive power so that the light beam transmitted through the regions 51, 52, and 53 is in a state where spherical aberration can be reduced, and thus the beam is appropriately collected. Further, the light beam with the first wavelength output from the objective lens 34 is not only in a state that a predetermined diffraction power is applied, but also in a state of aperture restriction.

The light beam collected on the first optical disc 11 is reflected from the signal recording surface, passes through the objective lens 34, the redirecting mirror 44, the ¼ wave plate 43, and the collimator lens 42, is reflected from the mirror face 38*a* of the third beam splitter 38, and is output to the optical detector 45 side.

The light beam split from the light beam on the outgoing path reflected from the third beam splitter 38 is collected on the photoreception surface of the optical detector 45 by the multi lens 46 and detected.

Next, a description is given as to the optical path when the light beam with the second wavelength is emitted onto the second optical disc 12 to perform reading or writing of information.

The disc type determination section 22 that has determined that the type of the optical disc 2 is the second optical disc 12 causes the light beam with the second wavelength to be emitted from the second emission portion of the second light source section 32.

The light beam with the second wavelength emitted from the second emission portion is split into three beams by the second grating 40 for detection of tracking error signals and the like, and is incident to the first beam splitter 36. The light beam with the second wavelength that is incident to the first beam splitter 36 transmits a mirror surface 36*a* of the first beam splitter 36, transmits the mirror surface 37*a* of the second beam splitter 37, and is output to the third beam splitter 38 side.

The light beam with the second wavelength that is incident to the third beam splitter 38 transmits the mirror surface 38*a* of the third beam splitter 38, and is output to the collimator lens 42 side. The collimator lens 42 converts the divergent angle of the incident light beam so as to be diffused light. Subsequently, the light beam is given a predetermined phase difference by the ¼ wave plate 43, reflected from the redirecting mirror 44, and output to the objective lens 34 side.

The light beam with the second wavelength that is incident to the objective lens 34 is diffracted with the first and second regions 51 and 52 of the diffractive portion 50 provided on the incident side surface of the objective lens 34 so that a predetermined diffraction order of the light beam which has passed through each region is dominant as described above. In addition, the beam is also appropriately collected on the signal recording surface of the second optical disc 12 by refractive power of the lens curved surface of the objective lens 34. In this case, the light beam with the second wavelength is diffracted and refracted by the diffractive power and the refractive power so that the light beam transmitted through the first and second regions 51 and 52 is in a state where spherical aberration can be reduced, and thus the beam is appropriately collected. Further, the diffracted light, which is generated by passing the light beam with the second wavelength through the third region 53, is in a state of being not appropriately collected on the signal recording surface of the second optical disc 12 due to the effects of flaring, that is, in a state where the effects of aperture restriction are appropriately obtained.

The returning optical path of the light beam reflected from the signal recording surface of the second optical disc 12 is the same as the light beam with the first wavelength, and a description thereof will be omitted.

Next, a description is given as to the optical path when the light beam with the third wavelength is emitted onto the third optical disc 13 to perform reading or writing of information.

The disc type determination section 22, which determines that the type of the optical disc 2 is the third optical disc 13, causes the light beam with the third wavelength to be emitted from the third emission portion of the third light source section 33.

The light beam with the third wavelength emitted from the third emission portion is split into three beams by the third grating 41 for detection of tracking error signals and the like, and is incident to the first beam splitter 36. The light beam with the third wavelength that is incident to the first beam splitter 36 is reflected from the mirror surface 36*a* of the first beam splitter 36, transmits the mirror surface 37*a* of the second beam splitter 37, and is output to the third beam splitter 38 side.

The light beam with the third wavelength that is incident to the third beam splitter 38 transmits the mirror surface 38*a* of the third beam splitter 38, is output to the collimator lens 42 side. The collimator lens 42 converts the divergent angle of the incident light beam so as to be diffused light. Subsequently, the light beam is given a predetermined phase difference by the ¼ wave plate 43, reflected from the redirecting mirror 44, and output to the objective lens 34 side.

The light beam with the third wavelength that is incident to the objective lens 34 is diffracted with the first region 51 of the diffractive portion 50 provided on the incident side surface of the objective lens 34 so that a predetermined diffraction order of the light beam which has passed through each region is dominant as described above. In addition, the beam is also appropriately collected on the signal recording surface of the third optical disc 13 by refractive power of the lens curved surface of the objective lens 34. In this case, the light beam with the third wavelength is diffracted and refracted by the diffractive power and the refractive power so that the light beam transmitted through the first region 51 is in a state where spherical aberration can be reduced, and thus the beam is appropriately collected. Further, the diffracted light, which is generated by passing the light beam with the third wavelength through the second and third regions 52 and 53, is in a state of being not appropriately collected on the signal recording surface of the third optical disc 13 due to the effects of flaring, that is, in a state where the effects of aperture restriction are appropriately obtained.

The returning optical path of the light beam reflected from the signal recording surface of the third optical disc 13 is the same as the light beam with the first wavelength, and a description thereof will be omitted.

Further, a configuration is described here in which the light beams with second and third wavelengths have the positions of the second and third emission portions adjusted so that the light beam, the divergent angle of which is converted by the collimator lens 42 and which is incident to the objective lens is in a diffused state relative to substantially parallel light. However, the invention is not limited to this. That is, a configuration may be made in which the light beam is incident to the objective lens 34 by providing an element which has wavelength selectivity and converts the divergent angle, or by providing a mechanism for driving the collimator lens 42 in the optical axis direction in a diffused or converged state.

Further, here, a configuration is made in which the light beam with the first wavelength is incident to the objective lens 34 in a state of substantially parallel light, and the light beams with second and third wavelengths are incident to the objective lens 34 in a state of diffused light, the invention is not limited to this configuration. For example, a configuration may be made in which the light beams with first to third wavelengths are all incident to the objective lens 34 in a state of parallel light, or any one or all of the light beams with first to third wavelengths are incident to the objective lens 34 in a state of diffused light or converged light.

The optical pickup 3 according to the embodiment of the invention includes the first to third emission portions, which emit the light beams with first to third wavelengths, the objective lens 34, and the diffractive portion 50 which is provided on one surface of the objective lens 34 serving as an optical element disposed on the outgoing optical path of the light beams with first to third wavelengths. In addition, the diffractive portion 50 has the first to third regions 51, 52, and 53 or 73. The first and second regions 51 and 52 have the different diffraction structures which are formed in an orbicular zone shape so as to have a predetermined depth. Further, the first and second regions 51 and 52 are configured to have the first and second diffraction structure which diffracts the light beam of each wavelength so that the diffracted light of a predetermined diffraction order of (k1i, k2i, k3i, k1m, or k2m) described above is dominant. Further, as described above, the third regions 53 and 73 have the predetermined diffraction function or the refraction function and the aperture restriction function. With such a particular configuration, the optical pickup 3 is able to collect appropriately the respective light beams, which correspond to the three types of the respective optical discs using different wavelengths, on the signal recording surface thereof by using a common single objective lens. Accordingly, the optical pickup 3 is able to achieve the three-wavelength compatibility without complicating the configuration by using a common objective lens 34, thereby enabling recording and/or reproducing of information signals on the respective optical discs.

That is, the optical pickup 3 according to the embodiment of the invention obtains optimal diffraction efficiency and diffraction angle with the diffractive portion 50 or 70 provided on one surface within the optical path of the light beams with first to third wavelengths, thereby enabling reading and recording of a signal by using light beams with different wavelengths. Therefore, the optical pickup 3 is able to have the three-wavelength compatibility among the plurality of types of optical discs 11, 12, and 13, in which an optical component such as the objective lens 34 can be used as a common component. As a result, the optical pickup 3 is able to achieve simplification of the configuration and reduction in size by reducing the number of components, and thus it is possible to achieve high productivity and low cost.

Further, in the optical pickup 3, as shown in FIG. 8A, the first region 51 as the inner orbicular zone is a structure in which the blazed structure is overlapped with the multi-step diffraction structure. Further, as shown in FIG. 8B, the multi-step diffraction structure has a diffraction structure in which the widths of the steps are changed so that the phase has flatness relative to the equidistant shape. Accordingly, as described in Section 5, with the improved step-width configuration, the optical pickup 3 is able to prevent the servo from becoming unstable by suppressing the occurrence of the unwanted diffracted light at the time of the environmental change. Moreover, with the improved slope-applied configuration, the optical pickup 3 is able to achieve reduction in the unwanted light of λ1 by increasing the efficiency of λ3. The optical pickup 3 is able to achieve favorable recording and reproducing characteristics regardless of the changes in temperature and wavelength. That is, the optical pickup 3 according to the embodiment of the invention has the objective lens 34 and the first to third regions 51, 52, and 53. By forming the distinctive first region 51 as the inner orbicular zone, it is possible to achieve favorable recording and reproducing characteristics regardless of the changes in temperature and wavelength. This point is the same as described above in the section "statistics of method of suppressing unwanted diffracted light generated by changes in temperature and wavelength". The optical pickup 3 is able to achieve three-wavelength compatibility of the optical pickup using three types of wavelengths for three types of optical discs and a common objective lens 34, thereby enabling recording and/or reproducing of information signals on the respective optical discs.

As described above, the optical pickup 3 according to the embodiment of the invention includes the diffractive portion 50 or 70 provided on one surface of the optical elements such as the objective lenses 34 and 34C and the diffractive optical elements 35B and 35D disposed on the optical path between the emission portion, which emits the light beam, and the signal recording surface of the optical disc. The optical pickup 3 is able to collect appropriately the respective light beams, which correspond to the three types of the respective optical discs using different wavelengths, on the signal recording surface thereof through the diffractive portion 50 or 70 by using a common single objective lens. Accordingly, the optical pickup 3 is able to achieve the three-wavelength compatibility without complicating the configuration by using a common objective lens 34, thereby enabling recording and/or reproducing of information signals on the respective optical discs.

Further, in the above description, with the optical pickup 3, the configuration is made in which the first emission portion is provided in the first light source section 31, the second emission portion is provided in the second light source section 32, and the third emission portion is provided in the third light source section 33, but the invention is not limited to this configuration. For example, the light source section having two emission portions from among the first to third emission portions, and the light source section having the remaining emission portion may be provided so as to be disposed at different positions.

9. Regarding Another Optical Pickup According to Embodiment of Invention

Figure 45:
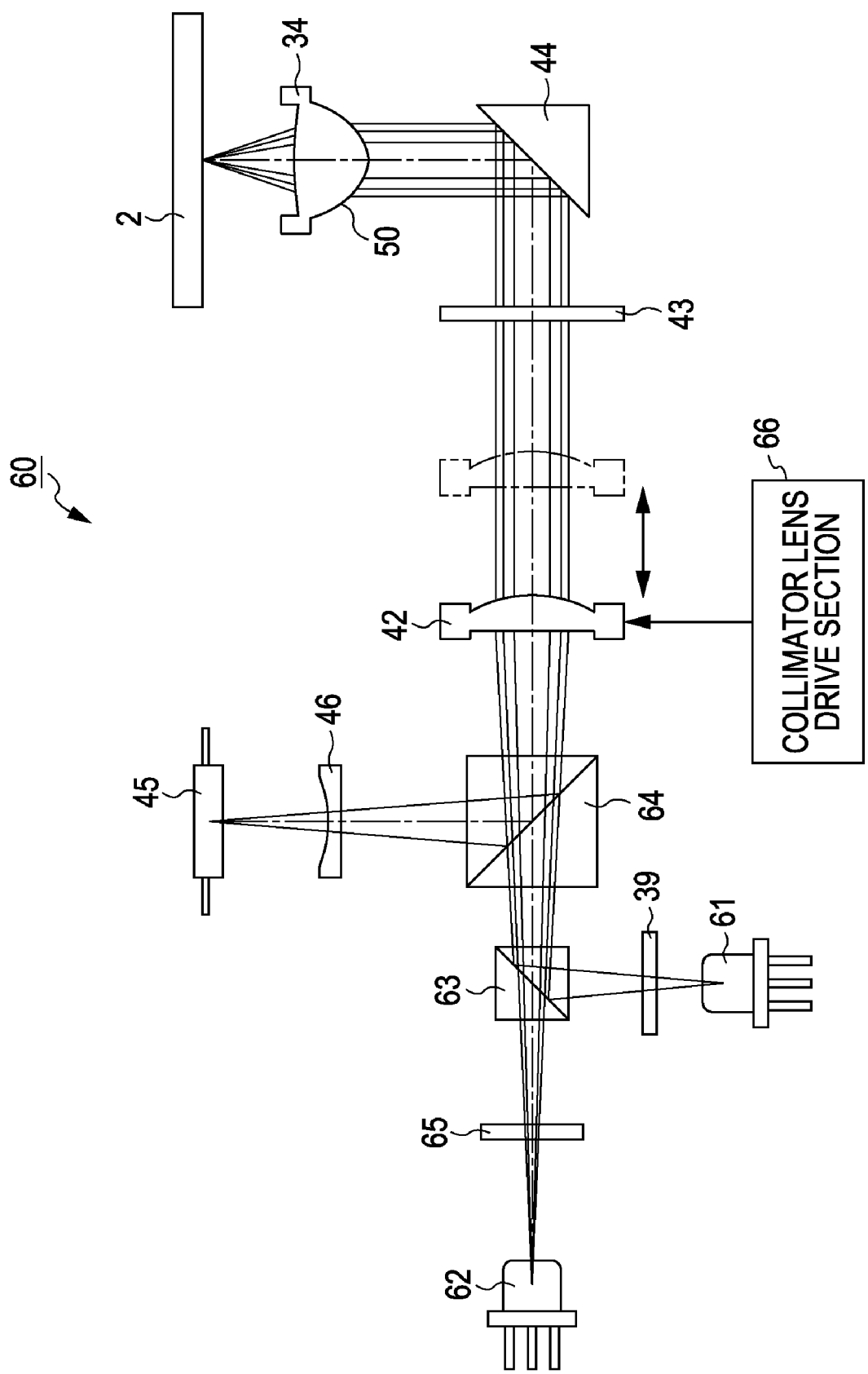
FIG. 45 is a ray-tracing diagram illustrating another example of an optical system of an optical pickup according to an embodiment of the invention.

Next, a description is given as to an optical pickup 60, shown in FIG. 45, which includes a light source section having a first emission portion and a light source section having second and third emission portions. Note that, in the following description, the same parts as those in the optical pickup 3 are represented by the same reference numerals, and descriptions thereof will be omitted.

As shown in FIG. 45, the optical pickup 60 according to the embodiment of the invention includes a first light source section 61 having a first emission portion configured to emit a light beam with a first wavelength. Further, the optical pickup 60 includes a second light source section 62 having a second emission portion configured to emit a light beam with a second wavelength and a third emission portion configured to emit a light beam with a third wavelength. Further, the optical pickup 60 includes an objective lens 34 serving as a light collecting optical device to collect the light beams emitted from the first to third emission portions on the signal recording surface of the optical disc 2. Further, the description has been given as to the optical pickup 60 which uses the objective lens 34 having the diffractive portion 50 as the light collecting optical device, but the invention is not limited to this. That is, instead, the light collecting optical device having the objective lens 34B and the diffraction optical element 35B such as shown in FIG. 6B may be provided. Further, the light collecting optical device having the objective lens 34C with the diffractive portion 70 such as shown in FIG. 5A and 5B may be provided. Moreover, the light collecting optical device having the objective lens 34D and the diffractive optical element 35D such as shown in FIG. 7B may be provided. In any case where any light collecting optical device is applied to the optical pickup 60, the later-described effects are brought, and simultaneously the effects of the above-mentioned objective lenses and diffractive portions are provided.

Further, the optical pickup 60 also includes a beam splitter 63 serving as an optical path synthesizing section. The beam splitter 63 synthesizes the optical path of the light beam with the first wavelength emitted from the first emission portion of the first light source section 61 and the optical path of the light beams with second and third wavelengths emitted from the second and third emission portions of the second light source section 62. Further, the optical pickup 60 has a beam splitter 64 having the same function as the third beam splitter 38.

Moreover, the optical pickup 60 also includes a first grating 39, and a wavelength-dependent grating 65 provided between the second light source section 62 and the beam splitter 63. The grating 65 has wavelength dependency by which the light beams with second and third wavelengths emitted from the second and third emission portions are respectively diffracted into three beams for detection of tracking error signals and the like.

Further, the optical pickup 60 also includes a collimator lens 42, a ¼ wave plate 43, a redirecting mirror 44, a optical detector 45, a multi lens 46, and a collimator lens drive section 66 driving the collimator lens 42 in the optical axis direction. The collimator lens drive section 66 drives the collimator lens 42 in the optical axis direction, thereby adjusting the divergent angle of the light beam having passed through the collimator lens 42, as described above. Accordingly, the collimator lens drive section 66 makes each light beam incident to the objective lens 34 in a desired state, so spherical aberration can be reduced, and flaring can be performed. Further, the collimator lens drive section 66 enables recording and/or reproducing on any signal recording surface when the loaded optical disc is a so-called multilayer optical disc having a plurality of signal recording surfaces.

The optical pickup 60 configured as described above is the same as the optical pickup 3 in view of the functions of the respective optical components except for those mentioned above. The optical pickup 60 is the same as the optical pickup 3 in view of the optical path of the light beams with first to third wavelengths emitted from the first to third emission portions except for those described above. That is, the optical pickup 60 is the same as the optical pickup 3 if the optical paths of the light beams with the respective wavelengths are already synthesized by the beam splitter 64, and thus detailed descriptions thereof will be omitted.

The optical pickup 60 according to the embodiment of the invention includes the first to third emission portions, which emit the light beams with first to third wavelengths, the objective lens 34, and the diffractive portion 50 which is provided on one surface of the objective lens 34 serving as an optical element disposed on the outgoing optical path of the light beams with first to third wavelengths. In addition, the diffractive portion 50 has the first to third regions 51, 52, and 53 or 73. The first region 51 has a structure in which the blazed structure is overlapped with the multi-step diffraction structure as shown in FIG. 8A. Further, as shown in FIG. 8B, the multi-step diffraction structure has a diffraction structure in which the widths of the steps are changed so that the phase has flatness relative to the equidistant shape. Accordingly, as described in Section 5, with the improved step-width configuration, the optical pickup 60 is able to prevent the servo from becoming unstable by suppressing the occurrence of the unwanted diffracted light at the time of environmental change. Moreover, with the improved slope-applied configuration, the optical pickup 60 is able to achieve reduction in the unwanted light of $\lambda 1$ by increasing the efficiency of $\lambda 3$. The optical pickup 60 is able to achieve favorable recording and reproducing characteristics regardless of changes in temperature and wavelength. With such distinctive configurations, the optical pickup 60 having the above-mentioned several distinctive configurations is able to collect appropriately the respective light beams, which correspond to the three types of the respective optical discs using different wavelengths, on the signal recording surface thereof by using a common single objective lens. Accordingly, the optical pickup 60 is able to achieve the three-wavelength compatibility without complicating the configuration by using a common objective lens 34, thereby enabling recording and/or reproducing of information signals on the respective optical discs. Further, the optical pickup 60 is able to achieve the three-wavelength compatibility by appropriately collecting the corresponding light beams on the signal recording surface by using the common objective lens 34. Further, the optical pickup 60 has resistance to environmental change. With such a configuration, the lens is able to prevent the servo from becoming unstable due to an increase of the unwanted diffracted light, which is generated from the diffractive portion 50, caused by the change in temperature and wavelength. With such a configuration, the optical pickup 60 prevents the recording and reproducing characteristics from being deteriorated, thereby obtaining favorable recording and reproducing characteristics. Further, otherwise, the optical pickup 60 has the same effects as the above-mentioned optical pickup 3.

Moreover, the optical pickup 60 is configured so that the second and third emission portions are disposed in the common light source section 62, thereby achieving simplification of the configuration and reduction in size. Further, the optical pickup according to the embodiment of the invention may be configured so that the first to third emission portions is disposed in the light source section at substantially the same position. With such a configuration, further simplification of the configuration and reduction in size are achieved.

The optical disc apparatus 1 according to the embodiment of the invention includes a driving section holding and rotationally driving an optical disc arbitrarily selected from the first to third optical discs, and an optical pickup performing recording and/or reproducing of information signals by selectively irradiating a plurality of light beams of different wavelengths with respect to the optical disc being rotationally driven by the driving section. The optical pickup 3 or 60 is used as the optical pickup that records and/or reproduces the information signal by selectively illuminating a plurality of light beams with the different wavelengths on the optical discs which are driven to be rotated. The optical disc apparatus 1 is able to collect appropriately the light beams, which correspond to the three types of the optical discs using the different wavelengths, on the signal recording surface through the diffractive portion, which is provided on one surface of the optical element in the optical paths of the light beams with the respective wavelengths, by using the single common objective lens. Accordingly, the optical disc apparatus 1 achieves the three-wavelength compatibility without complicating the configuration, and simultaneously achieves favorable recording and reproducing characteristics regardless of changes in temperature and wavelength. As described above, the optical disc apparatus 1 is able to achieve simplification of the configuration and reduction in size, and is able to obtain favorable recording and reproducing characteristics.

The present application contains subject matter related to that disclosed in Japanese Priority Patent Application JP 2009-145725 filed in the Japan Patent Office on Jun. 18, 2009 and Japanese Priority Patent Application JP 2009-279557 filed in the Japan Patent Office on Dec. 9, 2009 and Japanese Priority Patent Application JP 2009-290431 filed in the Japan Patent Office on Dec. 22, 2009, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An objective lens configured to collect light beams with at least three wavelengths λ1, λ2, and λ3, which satisfy a relationship of λ1<λ2<λ3, on signal recording surfaces of compatible optical discs corresponding to respective wavelengths, the objective lens comprising:
    a diffractive portion that has a predetermined diffraction structure formed on an incident side surface,
    wherein the diffractive portion has
        a first region that is provided in an innermost peripheral portion so as to diffract the light beams,
        a second region that is provided outside the first region so as to diffract the light beams, and
        a third region that is provided outside the second region,
    wherein the first to third regions are formed to have diameters of apertures allowing a light beam with the wavelength λ1 to correspond to the first to third regions, a light beam with the wavelength λ2 to correspond to the first and second regions, and a light beam with the wavelength λ3 to correspond to the first region, and
    wherein in the first region, a diffraction structure is formed in an orbicular zone shape with a predetermined height,
    wherein the diffraction structure of the first region is a periodic structure in which structures having a unit period are successively formed in a radial direction of the orbicular zone, and a structure in which a blazed structure with a height h is overlapped with a multi-step diffraction structure,
    wherein a slope direction of the blazed structure is an increasing direction opposite to a direction of increasing heights of steps of the multi-step diffraction structure,
    wherein the height h satisfies a relational expression of h<(λ1/(n1−1)), where n1 is a refractive index of a constituent material of the objective lens at the wavelength λ1, and
    wherein the multi-step diffraction structure is a non-equidistant multi-step diffraction structure that is different from an equidistant multi-step diffraction structure, in which widths of the steps in the period are equivalent and heights of the steps in the period are equivalent, in that the widths thereof are changed;
    wherein the diffraction structure of the first region is a structure in which one blazed structure is overlapped with the multi-step diffraction structure and a binary structure is further overlapped therewith, and
    wherein the binary structure is a non-equidistant binary structure corresponding to the widths of the steps of the non-equidistant multi-step diffraction structure.

2. The objective lens according to claim 1, wherein a number of the blazed structure overlapped with the multi-step diffraction structure of the first region is one.

3. The objective lens according to claim 2,
    wherein when orders of incident light beams diffracted in a direction of an optical axis are defined as positive orders, the diffraction structure of the first region diffracts the incident light beams so that (k1$i$, k2$i$, k3$i$)=(+1, −2, −3), where k1$i$, k2$i$, and k3$i$ are orders having maximum diffraction efficiencies at the wavelengths λ1, λ2, and λ3, respectively, and
    wherein a period of the overlapped blazed structure is m times a period of the multi-step diffraction structure, where m is an integer, and
    wherein assuming that a height of the multi-step diffraction structure is d0 and a sum of heights of slopes, which are given by the blazed structure in a single period of the multi-step diffraction structure, is d0×δ, a relational expression of 0<δ<0.15/m is satisfied.

4. The objective lens according to claim 3, wherein the multi-step diffraction structure is a multi-step structure having 6 level differences and 7 levels, a ratio of the changed widths of the steps in the period is (7−5η)/2:η:η:η:η:η:(7−5η)/2 in order, and a relational expression of 1<η<1.11 is satisfied.

5. The objective lens according to claim 1,
    wherein when the orders of the incident light beams diffracted in a direction of an optical axis are defined as positive orders, the diffraction structure of the first region diffracts the incident light beams so that (k1$i$, k2$i$, k3$i$)=(+1, −2, −3), where k1$i$, k2$i$, and k3$i$ are orders having maximum diffraction efficiencies at the wavelengths λ1, λ2, and λ3, respectively, and
    wherein a period of the overlapped blazed structure is equal to a period of the multi-step diffraction structure,
    wherein assuming that a height of the multi-step diffraction structure is d0 and a sum of heights of slopes, which are given by the blazed structure in a single period of the multi-step diffraction structure, is d0×δ, a relational expression of 0<δ<0.3 is satisfied.

6. The objective lens according to claim 5, wherein the multi-step diffraction structure is a multi-step structure having 6 level differences and 7 levels, a ratio of the changed widths of the steps is (7−5η)/2:η:η:η:η:η:(7−5η)/2 in order, and a relational expression of 1<η<1.11 is satisfied.

7. An objective lens configured to collect light beams with at least three wavelengths λ1, λ2, and λ3, which satisfy a relationship of λ1<λ2<λ3, on signal recording surfaces of compatible optical discs corresponding to respective wavelengths, the objective lens comprising:
    a diffractive portion that has a predetermined diffraction structure formed on an incident side surface,
    wherein the diffractive portion has
        a first region that is provided in an innermost peripheral portion so as to diffract the light beams,
        a second region that is provided outside the first region so as to diffract the light beams, and
        a third region that is provided outside the second region,
    wherein the first to third regions are formed to have diameters of apertures allowing a light beam with the wavelength λ1 to correspond to the first to third regions, a light beam with the wavelength λ2 to correspond to the first and second regions, and a light beam with the wavelength λ3 to correspond to the first region, and
    wherein in the first region, a diffraction structure is formed in an orbicular zone shape with a predetermined height,
    wherein the diffraction structure of the first region is a periodic structure in which structures having a unit period are successively formed in a radial direction of the orbicular zone, and a structure in which a blazed structure with a height h is overlapped with a multi-step diffraction structure,
    wherein a slope direction of the blazed structure is an increasing direction opposite to a direction of increasing heights of steps of the multi-step diffraction structure,
    wherein the height h satisfies a relational expression of h<(λ1/(n1−1)), where n1 is a refractive index of a constituent material of the objective lens at the wavelength λ1, and
    wherein the multi-step diffraction structure is a non-equidistant multi-step diffraction structure that is different from an equidistant multi-step diffraction structure, in which widths of the steps in the period are equivalent and heights of the steps in the period are equivalent, in that the widths thereof are changed;

wherein the diffraction structure of the first region is a structure in which one blazed structure is overlapped with the multi-step diffraction structure and a binary structure is further overlapped therewith, wherein the binary structure is a non-equidistant binary structure corresponding to the widths of the steps of the non-equidistant multi-step diffraction structure; and wherein a number of the blazed structures overlapped with the multi-step diffraction structure of the first region is two: one is a blazed structure having a period equal to the period of the multi-step diffraction structure, and the other is a blazed structure having a period equal to the integer multiple of the period of the multi-step diffraction structure.

8. The objective lens according to claim 7, wherein when orders of incident light beams diffracted in a direction of an optical axis are defined as positive orders, the diffraction structure of the first region diffracts the incident light beams so that (k1$i$, k2$i$, k3$i$)=(+1, −2, −3), where k1$i$, k2$i$, and k3$i$ are orders having maximum diffraction efficiencies at the wavelengths $\lambda 1$, $\lambda 2$, and $\lambda 3$, respectively, and wherein in the blazed structure having the period equal to the integer multiple thereof, the integer multiple is m, and wherein assuming that a height of the multi-step diffraction structure is d0, a first sum of heights of slopes, which are given by the blazed structure having the period equal to the period of the multi-step diffraction structure in a single period thereof, is d0×δs, and a second sum of heights of slopes, which are given by the blazed structure having the period equal to the integer multiple of the period of the multi-step diffraction structure in the single period thereof, is d0×δm, a relational expression of 0<δm×m+δs<0.15 is satisfied.

9. The objective lens according to claim 8, wherein the multi-step diffraction structure is a multi-step structure having 6 level differences and 7 levels, a ratio of the changed widths of the steps is (7−5η)/2:η:η:η:η:η:(7−5η)/2 in order, and a relational expression of 1<η<1.11 is satisfied.

10. An optical pickup comprising:

an objective lens to which light beams with the at least three wavelengths $\lambda 1$, $\lambda 2$, and $\lambda 3$ satisfying a relationship of $\lambda 1 < \lambda 2 < \lambda 3$ are incident; and a diffractive portion that is provided on one side of an optical element or the objective lens disposed in optical paths of the light beams with the three wavelengths $\lambda 1$, $\lambda 2$, and $\lambda 3$ so as to collect the light beams with the three wavelengths $\lambda 1$, $\lambda 2$, and $\lambda 3$ through the objective lens on signal recording surfaces of compatible optical discs corresponding to respective wavelengths, wherein the diffractive portion has a first region that is provided in an innermost peripheral portion so as to diffract the light beams, a second region that is provided outside the first region so as to diffract the light beams, and a third region that is provided outside the second region, wherein the first to third regions are formed to have diameters of apertures allowing a light beam with the wavelength $\lambda 1$ to correspond to the first to third regions, a light beam with the wavelength $\lambda 2$ to correspond to the first and second regions, and a light beam with the wavelength $\lambda 3$ to correspond to the first region, and wherein in the first region, a diffraction structure is formed in an orbicular zone shape with a predetermined height, wherein the diffraction structure of the first region is a periodic structure in which structures having a unit period are successively formed in a radial direction of the orbicular zone, and a structure in which a blazed structure with a height h is overlapped with a multi-step diffraction structure, wherein a slope direction of the blazed structure is an increasing direction opposite to a direction of increasing heights of steps of the multi-step diffraction structure, wherein the height h satisfies a relational expression of h<($\lambda 1$/(n1−1)), where n1 is a refractive index of a constituent material of the objective lens at the wavelength $\lambda 1$, and wherein the multi-step diffraction structure is a non-equidistant multi-step diffraction structure that is different from an equidistant multi-step diffraction structure, in which widths of the steps in the period are equivalent and heights of the steps in the period are equivalent, in that the widths thereof are changed, wherein the diffraction structure of the first region is a structure in which one blazed structure is overlapped with the multi-step diffraction structure and a binary structure is further overlapped therewith, and wherein the binary structure is a non-equidistant binary structure corresponding to the widths of the steps of the non-equidistant multi-step diffraction structure.

11. An optical disc apparatus comprising:

an optical pickup that records and/or reproduces an information signal by selectively illuminating a plurality of light beams with different wavelengths on a plurality of types of optical discs which are driven to be rotated, wherein the optical pickup includes an objective lens to which light beams with at least three wavelengths $\lambda 1$, $\lambda 2$, and $\lambda 3$ satisfying a relationship of $\lambda 1 < \lambda 2 < \lambda 3$ are incident, and a diffractive portion that is provided on one side of an optical element or the objective lens disposed in optical paths of the light beams with the three wavelengths $\lambda 1$, $\lambda 2$, and $\lambda 3$ so as to collect the light beams with the three wavelengths $\lambda 1$, $\lambda 2$, and $\lambda 3$ through the objective lens on signal recording surfaces of compatible optical discs corresponding to the respective wavelengths, wherein the diffractive portion has a first region that is provided in an innermost peripheral portion so as to diffract the light beams, a second region that is provided outside the first region so as to diffract the light beams, and a third region that is provided outside the second region, wherein the first to third regions are formed to have diameters of apertures allowing the light beam with the wavelength $\lambda 1$ to correspond to the first to third regions, the light beam with the wavelength $\lambda 2$ to correspond to the first and second regions, and the light beam with the wavelength $\lambda 3$ to correspond to the first region, and wherein in the first region, a diffraction structure is formed in an orbicular zone shape with a predetermined height, wherein the diffraction structure of the first region is a periodic structure in which structures having a unit period are successively formed in a radial direction of the orbicular zone, and a structure in which a blazed structure with a height h is overlapped with a multi-step diffraction structure, wherein a slope direction of the blazed structure is an increasing direction opposite to a direction of increasing heights of steps of the multi-step diffraction structure, wherein the height h satisfies a relational expression of $h<(\lambda 1/(n1-1))$, where $n1$ is a refractive index of a constituent material of the objective lens at the wavelength $\lambda 1$, and wherein the multi-step diffraction structure is a non-equidistant multi-step diffraction structure that is different from an equidistant multi-step diffraction structure, in which widths of the steps in the period are equivalent and heights of the steps in the period are equivalent, in that the widths thereof are changed, wherein a number of the blazed structures overlapped with the multi-step diffraction structure of the first region is two: one is a blazed structure having a period equal to the period of the multi-step diffraction structure, and the other is a blazed structure having a period equal to the integer multiple of the period of the multi-step diffraction structure.

* * * * *